(12) United States Patent
Ikai

(10) Patent No.: US 10,116,932 B2
(45) Date of Patent: Oct. 30, 2018

(54) IMAGE FILTER DEVICE, DECODING DEVICE, ENCODING DEVICE, AND DATA STRUCTURE

(75) Inventor: Tomohiro Ikai, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 877 days.

(21) Appl. No.: 13/992,432

(22) PCT Filed: Dec. 14, 2011

(86) PCT No.: PCT/JP2011/078882
§ 371 (c)(1),
(2), (4) Date: Jun. 7, 2013

(87) PCT Pub. No.: WO2012/081609
PCT Pub. Date: Jun. 21, 2012

(65) Prior Publication Data
US 2013/0251051 A1     Sep. 26, 2013

(30) Foreign Application Priority Data

Dec. 14, 2010    (JP) ................................. 2010-278499

(51) Int. Cl.
*H04N 7/12*         (2006.01)
*H04N 19/80*        (2014.01)
(Continued)

(52) U.S. Cl.
CPC ....... *H04N 19/0089* (2013.01); *H04N 19/117* (2014.11); *H04N 19/167* (2014.11);
(Continued)

(58) Field of Classification Search
CPC .. H04N 19/0089; H04N 19/167; H04N 19/82; H04N 19/176; H04N 19/117; H04N 19/593; H04N 19/85; H04N 19/80
See application file for complete search history.

(56) References Cited

U.S. PATENT DOCUMENTS

| | | | |
|---|---|---|---|
| 2005/0078750 A1* | 4/2005 | Shen .................... | H04N 19/159 375/240.12 |
| 2007/0064792 A1* | 3/2007 | Chiu ........................ | G06T 5/20 375/240.03 |

(Continued)

FOREIGN PATENT DOCUMENTS

| | | |
|---|---|---|
| JP | 2005-123732 A1 | 5/2005 |
| WO | 2008/084745 A1 | 7/2008 |
| WO | 2011/013580 A1 | 2/2011 |

OTHER PUBLICATIONS

Official Communication issued in International Patent Application No. PCT/JP2011/078882, dated Mar. 19, 2012.
(Continued)

*Primary Examiner* — Joseph G Ustaris
*Assistant Examiner* — Jill D Sechser
(74) *Attorney, Agent, or Firm* — Keating & Bennett, LLP

(57) ABSTRACT

A loop filter (16) includes a filter processing unit (162c) configured to generate an output image by acting on an input image made up of a plurality of unit regions, and a reference region setting unit (162b) configured to reduce a reference region to be referenced by the filter processing unit (162c) for calculating a pixel value of each target pixel to a size according to a position of this target pixel in a unit region including this target pixel.

4 Claims, 30 Drawing Sheets

(51) Int. Cl.
*H04N 19/176* (2014.01)
*H04N 19/117* (2014.01)
*H04N 19/167* (2014.01)
H04N 19/593 (2014.01)
H04N 19/82 (2014.01)

(52) U.S. Cl.
CPC ......... *H04N 19/176* (2014.11); *H04N 19/593* (2014.11); *H04N 19/82* (2014.11)

(56) References Cited

U.S. PATENT DOCUMENTS

| | | | |
|---|---|---|---|
| 2007/0098086 A1* | 5/2007 | Bhaskaran | H04N 19/80 375/240.27 |
| 2007/0248274 A1* | 10/2007 | Govindaswamy | G06T 9/005 382/240 |
| 2010/0021071 A1 | 1/2010 | Wittmann et al. | |
| 2012/0039383 A1* | 2/2012 | Huang | H04N 19/176 375/240.02 |
| 2012/0121188 A1 | 5/2012 | Kenji | |

OTHER PUBLICATIONS

"Test Model under Consideration JCTVC-B205 Draft 007", Joint Collaborative Team on Video Coding (JCT-VC) of ITU-T SG16 WP3 and ISO/IEC FTC1/SC29/WG11, 2nd meeting, Geneva, CH, Jul. 2010, 10 pages.

"Series H: Audiovisual and Multimedia Systems Infrastructure of audiovisual services—Coding of moving video, Advanced video coding for generic audiovisual services", Telecommunication Standardization Sector of ITU, H. 264, Geneva, Mar. 2009, 670 pages.

\* cited by examiner

|  |  | R |  |  |
|---|---|---|---|---|
| a0 | a1 | a2 | a3 | a4 |
| a5 | a6 | a7 | a8 | a9 |
| a10 | a11 | a12 | a11 | a10 |
| a9 | a8 | a7 | a6 | a5 |
| a4 | a3 | a2 | a1 | a0 |

(b)

|  |  | R |  |  |
|---|---|---|---|---|
| a0 | a1 | a2 | a3 | a4 |
| a5 | a6 | a7 | a8 | a9 |
| a10 | a11 | a12 | a11 | a10 |

FIG. 15

| INTRA-ALFU Y COORDINATE (yy) | INTRA-LCU Y COORDINATE (y) | NORMALIZED INTRA-LCU Y COORDINATE (yr) | UPWARD REFERABLE RANGE MaxDDupper | FIRST DOWNWARD REFERABLE RANGE MaxDDlower1 | SECOND DOWNWARD REFERABLE RANGE MaxDDlower2 |
|---|---|---|---|---|---|
| 0 | 0 − Ly | (0 − Ly)%LLCU | 0 | LLCU − 1 | LLCU + Ly − Ddf − 1 |
| 1 | 1 − Ly | (1 − Ly)%LLCU | 1 | LLCU − 2 | LLCU + Ly − Ddf − 2 |
| 2 | 2 − Ly | (2 − Ly)%LLCU | 2 | LLCU − 3 | LLCU + Ly − Ddf − 3 |
| 3 | 3 − Ly | (3 − Ly)%LLCU | 3 | LLCU − 4 | LLCU + Ly − Ddf − 4 |
| ⋮ | ⋮ | ⋮ | ⋮ | ⋮ | ⋮ |
| LLCU − 4 | LLCU − 4 − Ly | (LLCU − 4 − Ly)%LLCU | LLCU − 4 | 3 | Ly − Ddf − 3 |
| LLCU − 3 | LLCU − 3 − Ly | (LLCU − 3 − Ly)%LLCU | LLCU − 3 | 2 | Ly − Ddf − 2 |
| LLCU − 2 | LLCU − 2 − Ly | (LLCU − 2 − Ly)%LLCU | LLCU − 2 | 1 | Ly − Ddf − 1 |
| LLCU − 1 | LLCU − 1 − Ly | (LLCU − 1 − Ly)%LLCU | LLCU − 1 | 0 | Ly − Ddf |

FIG. 16

| INTRA-LCU Y COORDINATE (y) | UPWARD REFERABLE RANGE MaxDDupper_1 | FIRST DOWNWARD REFERABLE RANGE MaxDDlower1_1 |
|---|---|---|
| 0 | 0 (= y) | 31 (= LLCU − y +1) |
| 1 | 1 | 30 |
| 2 | 2 | 29 |
| 3 | 3 | 28 |
| 4 | 4 | 27 |
| ⋮ | ⋮ | ⋮ |
| 26 | 26 | 5 |
| 27 | 27 | 4 |
| 28 | 28 | 3 |
| 29 | 29 | 2 |
| 30 | 30 | 1 |
| 31 | 31 | 0 |

FIG. 17

| INTRA-ALFU Y COORDINATE (yy) | INTRA-LCU Y COORDINATE (y) | NORMALIZED INTRA-LCU Y COORDINATE (yr) | UPWARD REFERABLE RANGE MaxDDupper | FIRST DOWNWARD REFERABLE RANGE MaxDDlower1 | SECOND DOWNWARD REFERABLE RANGE MaxDDlower2 |
|---|---|---|---|---|---|
| 0 (=yy) | -8 (=yy-Ly) | 24 (=LLCU-Ly+yy) | 0 (=yy) | 31 (=LLCU-yy-1) | 39-Ddf (=LLCU-yy+Ly-1) |
| 1 | -7 | 25 | 1 | 30 | 38-Ddf |
| 2 | -6 | 26 | 2 | 29 | 37-Ddf |
| 3 | -5 | 27 | 3 | 28 | 36-Ddf |
| 4 | -4 | 28 | 4 | 27 | 35-Ddf |
| 5 | -3 | 29 | 5 | 26 | 34-Ddf |
| 6 | -2 | 30 | 6 | 25 | 33-Ddf |
| 7 | -1 | 31 | 7 | 24 | 32-Ddf |
| 8 | 0 | 0 (=-Ly+yy) | 8 | 23 | 31-Ddf |
| 9 | 1 | 1 | 9 | 22 | 30-Ddf |
| 10 | 2 | 2 | 10 | 21 | 29-Ddf |
| 11 | 3 | 3 | 11 | 20 | 28-Ddf |
| ⋮ | ⋮ | ⋮ | ⋮ | ⋮ | ⋮ |
| 25 | 17 | 17 | 25 | 6 | 14-Ddf |
| 26 | 18 | 18 | 26 | 5 | 13-Ddf |
| 27 | 19 | 19 | 27 | 4 | 12-Ddf |
| 28 | 20 | 20 | 28 | 3 | 11-Ddf |
| 29 | 21 | 21 | 29 | 2 | 10-Ddf |
| 30 | 22 | 22 | 30 | 1 | 9-Ddf |
| 31 | 23 | 23 | 31 | 0 | 8-Ddf |

FIG. 18

| NORMALIZED INTRA-LCU Y COORDINATE (yr) | UPWARD REFERABLE RANGE MaxDDupper_2 | FIRST DOWNWARD REFERABLE RANGE MaxDDlower1_2 | SECOND DOWNWARD REFERABLE RANGE MaxDDlower2_2 |
|---|---|---|---|
| 0 (=y) | 8 (= Ly+y) | 23 (=LLCU−Ly−y−1) | 31−Ddf (=LLCU−Ddf−y−1) |
| 1 | 9 | 22 | 30−Ddf |
| 2 | 10 | 21 | 29−Ddf |
| ⋮ | ⋮ | ⋮ | ⋮ |
| 20 | 28 | 3 | 11−Ddf |
| 21 | 29 | 2 | 10−Ddf |
| 22 | 30 | 1 | 9−Ddf |
| 23 | 31 | 0 | 8−Ddf |
| 24 (=LLCU−Ly) | 0 (=Ly+y−LLCU) | 31 (=2×LLCU−Ly−y−1) | 39−Ddf (=2×LLCU−Ddf−y−1) |
| 25 | 1 | 30 | 38−Ddf |
| 26 | 2 | 29 | 37−Ddf |
| 27 | 3 | 28 | 36−Ddf |
| 28 | 4 | 27 | 35−Ddf |
| 29 | 5 | 26 | 34−Ddf |
| 30 | 6 | 25 | 33−Ddf |
| 31 | 7 | 24 | 32−Ddf |

IMAGE FILTER DEVICE, DECODING DEVICE, ENCODING DEVICE, AND DATA STRUCTURE

TECHNICAL FIELD

The present invention relates to an image filter device configured to perform filtering of an image, also relates to an encoding device and a decoding device which include such an image filter device, and also relates to a data structure of encoded data to be decoded by such a decoding device.

BACKGROUND ART

In order to effectively transmit or record a moving image, there have been employed a moving image encoding device (encoding device) configured to generate encoded data by encoding the moving image, and a moving image decoding device (decoding device) configured to generate a decoded image by decoding this encoded data. Examples of a specific moving image coding system include H.264/MPEG-4.AVC (NPL 1), a system employed by KTA software which is codec for joint development in VCEG (Video Coding Expert Group), and a system (NPL 2) to be employed by TMuC (Test Model under Consideration) software which is a succeeding codec.

With such a coding system, an image (picture) making up a moving image is managed by a layered structure made up of slices to be obtained by dividing an image, the maximum coding increment (LCU: Largest Coding Unit) to be obtained by dividing a slice, and coding increment (CU: Coding Unit) to be obtained by dividing a largest coding unit, a block and a partition to be obtained by dividing a coding unit, and in many cases, encoding is performed with a block as the minimum unit.

Also, with such a coding system, in general, a predicted image is generated based on a local decoded image to be obtained by encoding/decoding an input image, and a difference image (may also referred to as residual image or predicted residual) between this predicted image and an input image is encoded. Also, as a method for generating a predicted image, there has been known a method called inter-frame prediction (inter prediction) and intra-screen prediction (intra prediction).

With inter prediction, motion compensation using a motion vector is applied to a reference image within a reference frame (decoded image) of which the entire frame has been decoded, and accordingly, a predicted image within a prediction target frame is generated for each prediction unit. On the other hand, with intra prediction, based on a local decoded image within the same frame, a predicted image in this frame is sequentially generated.

With NPL 2, an adaptive loop filter (ALF: Adaptive Loop Filter) (hereinafter, also simply referred to as "adaptive filter") configured to perform filter processing on a decoded image for each coding unit has been disclosed. This adaptive filter determines a filter coefficient where error between a decoded image subjected to filtering and the original image becomes the minimum, for each slice on a decoded image, and subjects each coding unit included in this slice to filtering based on this filter coefficient. An encoding device and a decoding device which include such an adaptive filter can improve precision of a predicted image to be generated by referencing an image subjected to filtering by improving image quality of an encoded/decoded image using filtering, and accordingly, coding efficiency can be improved.

Also, the adaptive filter disclosed in NPL 2 can realize increase in speed of filter processing by performing filter processing with reference to a pixel value transferred to local memory which is local memory in which a target coding unit which is a processing target and an image in the vicinity thereof can be stored which can be accessed at high speed from frame memory of which the access speed is low which is frame memory in which pixel values of the entire frame can be stored.

CITATION LIST

Non Patent Literature

NPL 1: "Recommendation ITU-T H.264", Telecommunication Standardization Sector of ITU, 03/2009 (disclosed in March, 2009)

NPL 2: "Test Model under Consideration JCTVC-B205 draft007", Joint Collaborative Team on Video Coding (JCT-VC) of ITU-T SG16 WP3 and ISO/IEC JTC1/SC29WG11, 2nd Meeting: Geneva, CH, 07/2010 (disclosed in July, 2010)

SUMMARY OF INVENTION

Technical Problem

However, an adaptive filter according to the related art disclosed in NPL 2 references a pixel value other than a target coding unit (a pixel value of a pixel in the vicinity of a target coding unit) in addition to a pixel value within a target coding unit at the time of performing filter processing on a target coding unit, and accordingly, this causes a problem wherein the amount of data to be transferred from the frame memory to the local memory increases. Description will specifically be made regarding this point with reference to FIG. 29.

FIG. 29 illustrates, with an adaptive filter according to the related art, in the event that the size of a target coding unit CU is 8×8 pixels, a reference region R with five taps to be set according to a position of a target pixel, and a reference block RA which is a summation group of the reference region R regarding each target pixel included in a target coding unit. The reference block RA is a group of pixels to be referenced by the adaptive filter according to the related art for generating an image subjected to filtering regarding a target coding unit. In the case of the example in FIG. 29, the adaptive filter according to the related art has to reference each pixel value included in the reference block RA with 12×12 pixels for generating an image subjected to filtering regarding a target coding unit with 8×8 pixels. In this manner, the adaptive filter according to the related art references, at the time of performing filter processing regarding a target coding unit, a pixel value in the vicinity of a target coding unit in addition to a pixel value within a target coding unit, and accordingly, this causes a problem wherein the amount of data to be transferred from the frame memory to the local memory increases.

On the other hand, in order to reduce the amount of data to be transferred, for example, it can be conceived to decrease the size of a reference region, but in this case, prediction precision of a predicted image to be calculated with an image subjected to filtering decreases, and accordingly, this causes a problem wherein coding efficiency decreases.

The present invention has been made in the light of the above problems, and its object is to realize an image filter device whereby throughput and processing time can be reduced by reducing the amount of data to be transferred at the time of adaptive filter processing while maintaining high coding efficiency.

Solution to Problem

In order to solve the above-mentioned problems, an image filter device according to the present invention including: filter means configured to generate an output image by acting on an input image made up of a plurality of unit regions; and reference region modifying means configured to reduce a reference region to be referenced for the filter means calculating a pixel value of each target pixel to a size according to a position of this target pixel in a unit region including this target pixel.

In the event that the image filter device is employed for a decoding device configured to decode encoded data to generate a decoded image, or an encoding device configured to encode an image to be encoded to generate encoded data, a predicted image with high prediction precision can be generated with reference to an output image of the image filter device, and accordingly, coding efficiency is improved.

Also, according to the image filter device configured as described above, a reference region to be referenced for the filter means calculating a pixel value of each target pixel is reduced to a size according to a position of this target pixel in a unit region including this target pixel, and accordingly, the number of pixels to be referenced for generating an output image can be reduced while maintaining high coding efficiency. Accordingly, according to the image filter device configured as described above, the amount of data to be transferred at the time of filter processing can be reduced while maintaining high coding efficiency.

Note that the unit region mentioned here may be, for example, the largest coding unit LCU, or may be a coding unit CU to be obtained by dividing the largest coding unit LCU, or may be another region.

Also, an image filter device according to the present invention including: filter means configured to generate an output image for each unit region by acting on an input image made up of a plurality of unit regions; and smoothing means configured to smooth a pixel value of a pixel where of the unit regions, distance from at least one of two edges on the upstream side in processing order is equal to or shorter than DB; with the filter means acting on a target unit region after the smoothing means act on two edges on the upstream side of a target unit region before acting on two edges on the upstream side of the next unit region in processing order.

Also, an image filter device according to the present invention including: smoothing means configured to smooth a pixel value of a pixel positioned near at least one of two edges on the upstream side in processing order of each unit region regarding a decoded image to be obtained by adding a predicted image to be generated for each unit region and a residual image; calculating means including first filter means configured to act on an output image from the smoothing means, second filter means configured to act on the predicted image, and third filter means configured to act on the residual image, configured to add and output output images from the first to third filter means; and reference region setting means configured to set a reference region which the first to third filter means reference for calculating a pixel value of each target pixel, and to set the number of pixels in the vertical direction of a reference region to 1.

According to the image filter device, an output image is generated with reference to a decoded image, predicted image, and a residual image subjected to smoothing processing by the smoothing means. Accordingly, a decoding device including the image filter device, and an encoding device including the image filter device generate a predicted image with reference to an output image of the image filter device, and accordingly, coding efficiency is improved. Also, the number of pixels in the vertical direction of the reference region is set to 1, and accordingly, the throughput of filter processing and the amount of data to be transferred are reduced.

Also, an image filter device according to the present invention including: filter means configured to generate an output image by acting on an input image made up of one or a plurality of slices; filter means configured to calculate a pixel value of a target pixel in the output image from each pixel value of the input image in a reference region set in the vicinity of this target pixel; and target pixel restricting means configured to restrict a position of a target pixel to a position where the entire reference region including this target pixel is included in a slice including this target pixel.

According to the image filter device, an output image in a target slice is generated with reference to a pixel value alone within a target slice. In other words, an output image in a target slice is generated without referencing a pixel outside the target slice. Accordingly, according to the above-mentioned configuration, throughput for generating an output image is reduced. Also, according to the configuration, filter processing can be performed without awaiting until each pixel in the next slice in processing order which is a slice adjacent to a target slice can be referenced, and accordingly, processing time is reduced.

Advantageous Effects of Invention

As described above, a filter device according to the present invention includes: filter means configured to generate an output image by acting on an input image made up of a plurality of unit regions; and reference region modifying means configured to reduce a reference region to be referenced for the filter means calculating a pixel value of each target pixel to a size according to a position of this target pixel in a unit region including this target pixel.

According to the image filter device configured as described above, the amount of data to be transferred at the time of filter processing can be reduced while maintaining high coding efficiency.

BRIEF DESCRIPTION OF DRAWINGS

FIG. 6 is a diagram for describing processing by an adaptive filter including a loop filter according to the first embodiment of the present invention, (a) illustrates an example of a reference region to be set by the adaptive filter, and (b) illustrates another example of a reference region to be set by the adaptive filter.

FIG. 15 is for describing processing by the adaptive filter according to the first embodiment of the present invention, and is a table illustrating a specific example of an intra-ALFU Y coordinate, an intra-LCU Y coordinate, a normalized intra-LCU Y coordinate, an upward referable range, a first downward referable range, and a second downward referable range.

FIG. 16 is for describing processing by the adaptive filter according to the first embodiment of the present invention, and is a table illustrating a specific example of an intra-LCU Y coordinate, an upward referable range, and a first downward referable range.

FIG. 17 is for describing processing by the adaptive filter according to the first embodiment of the present invention, and is a table illustrating a specific example of an intra-ALFU Y coordinate, an intra-LCU Y coordinate, a normalized intra-LCU Y coordinate, an upward referable range, a first downward referable range, and a second downward referable range.

FIG. 18 is for describing processing by the adaptive filter according to the first embodiment of the present invention, and is a table illustrating a specific example of a normalized intra-LCU Y coordinate, an upward referable range, a first downward referable range, and a second downward referable range.

DESCRIPTION OF EMBODIMENTS

Description regarding an embodiment of a decoding device and an encoding device according to the present invention based on drawings is as follows. Note that the decoding device according to the present embodiment is for decoding a moving image from encoded data. Accordingly, hereinafter, this will be referred to as "moving image decoding device". Also, the encoding device according to the present embodiment is for generating encoded data by encoding a moving image. Accordingly, hereinafter, this will be referred to as "moving image encoding device".

However, the application range of the present invention is not restricted to this. Specifically, as apparent from the following description, features of the present invention are realized without assuming multiple frames. That is to say, the present invention can be applied to decoding devices in general and encoding devices in general regardless of whether to take a moving image as a target or a still image as a target.

(Configuration of Encoded Data #1)

Prior to description of a moving image decoding device 1 according to the present embodiment, a structure of encoded data #1 to be generated by a moving image encoding device 2 according to the present embodiment and to be decoded by the moving image decoding device 1 will be described with reference to FIG. 2. The encoded data #1 includes a layered structure made up of a sequence layer, a GOP (Group Of Picture) layer, a picture layer, a slice layer, and a largest coding unit (LCU: Largest Coding Unit) layer.

Figure 2:
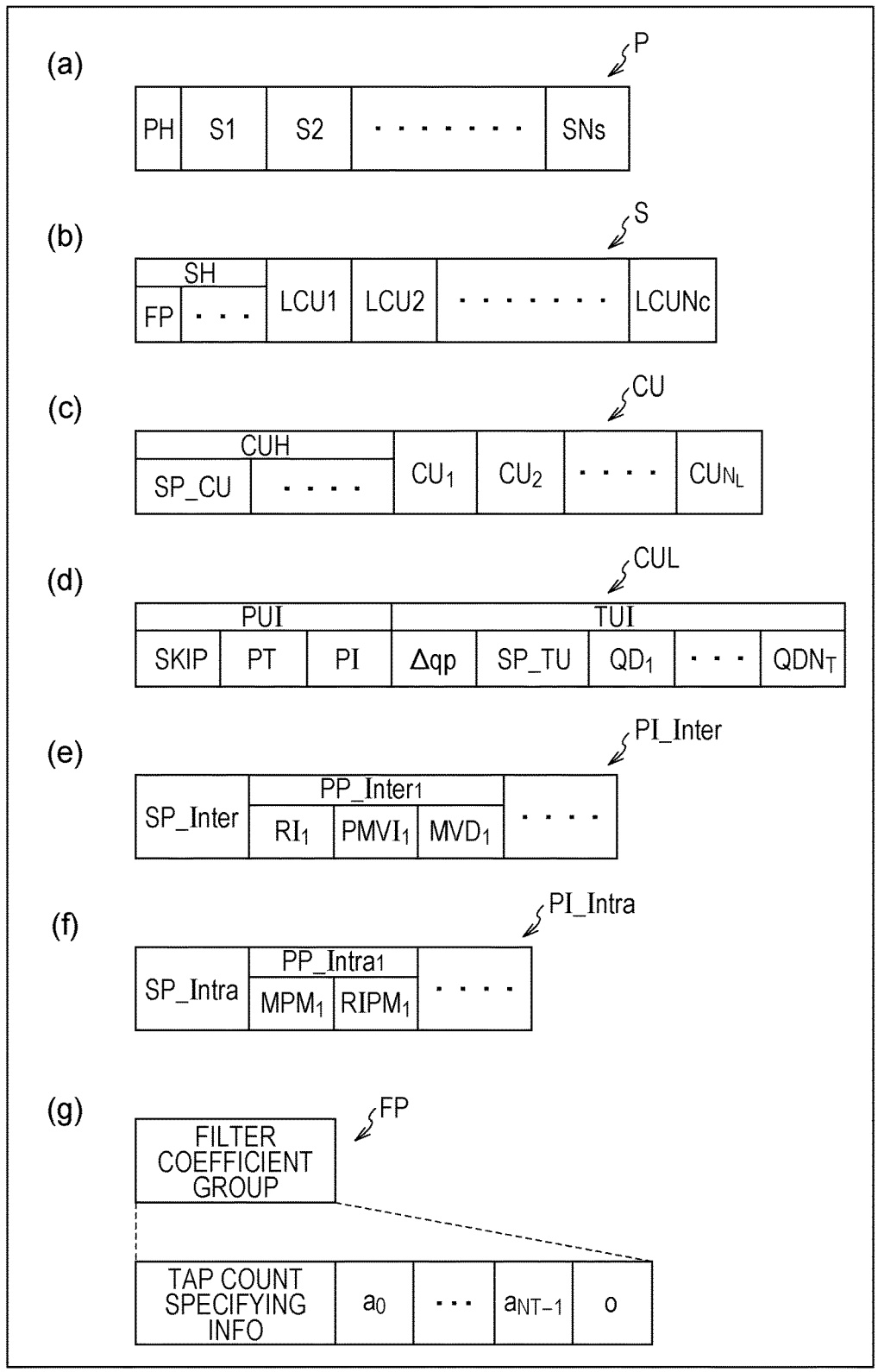
FIG. 2 is a diagram illustrating a data structure of encoded data to be generated by the moving image encoding device according to the first embodiment of the present invention and to be referenced by the moving image decoding device according to the first embodiment of the present invention. (a) illustrates a configuration of a picture layer of encoded data, (b) illustrates a configuration of a slice layer included in the picture layer, (c) illustrates a configuration of each CU making up an LCU layer included in the slice layer, (d) illustrates a configuration of a leaf CU included in the CU layer, (e) illustrates a configuration of inter prediction information regarding the leaf CU, (f) illustrates a configuration of intra prediction information regarding the leaf CU, and (g) illustrates a configuration of a filter parameter included in a slice header.

A structure of layers of the picture layer and thereafter in the encoded data #1 is illustrated in FIG. 2. (a) to (f) in FIG. 2 are diagrams illustrating a structure of a picture layer P, a slice layer S, an LCU layer LCU, a leaf CU (referred to as CUL in (d) in FIG. 2) included in the LCU, inter prediction information PI_Inter which is prediction information PI regarding an inter prediction (inter-frame prediction) partition, and intra prediction information PI_Intra which is prediction information PI regarding an intra prediction (intra-screen prediction) partition, respectively.

(Picture Layer)

The picture layer P is a group of data to be referenced by the moving image decoding device 1 for decoding a target picture which is a picture to be processed. The picture layer P includes, as illustrated in (a) in FIG. 2, a picture header PH, and slice layers S1 to SNs (Ns is a total number of slice layers included in the picture layer P).

The picture header PH includes an encoding parameter group to be referenced by the moving image decoding device 1 for determining a decoding method of a target picture. For example, encoding mode information (entropy_coding_mode_flag) which indicates a mode of variable length coding to be used by the moving image encoding device 2 at the time of encoding is an example of encoding parameters included in the picture header PH.

(Slice Layer)

The slice layers S included in the picture layer P are a group of data to be referenced by the moving image decoding device 1 for decoding a target slice which is a slice to be processed. The slice layer S includes, as illustrated in (b) in FIG. 2, a slice header SH, and LCU layers LCU1 to LCUNc (Nc is a total number of LCUs included in the slice S).

The slice header SH includes a encoding parameter group to be referenced by the moving image decoding device 1 for determining a decoding method of a target slice. Slice type specifying information (slice_type) for specifying a slice type is an example of the encoding parameters included in the slice header SH.

Examples of a slice type that can be specified with the slice type specifying information include (1) I slice using intra prediction alone at the time of encoding, (2) single directional prediction at the time of encoding, or P slice using intra prediction, and (3) uni prediction or bi prediction at the time of encoding, or B slice using intra prediction.

Also, the slice header SH includes filter parameters FP to be referenced by the adaptive filter included in the moving image decoding device 1. Note that a configuration of the filter parameters FP will be described later, and accordingly, description thereof will be omitted here.

(LCU Layer)

The LCU layers LCU included in the slice layer S are a group of data to be referenced by the moving image decoding device 1 for decoding a target LCU which is an LCU to be processed.

The LCU layer LCU is made up of multiple coding units (CU: Coding unit) to be obtained by hierarchically dividing this LCU into quadtree division. In other words, the LCU layer LCU is, of a layered structure recursively including multiple CUs, a coding unit equivalent to the uppermost. The CUs included in the LCU layer LCU has, as illustrated in (c) in FIG. 2, a CU header CUH, and a layered structure recursively including multiple CUs to be obtained by quadtree division of this CU.

The size of each CU excluding its LCU is a vertically and horizontally half of the size of a CU to which this CU directly belongs (i.e., CU of one hierarchy higher order of this CU), and the size that each CU can take depends on the size and hierarchical depth of the LCU included in a sequence parameter set SPS of the encoded data #1. For example, in the event that the size of the LCU is 128×128 pixels, and the maximum hierarchical depth is 5, CUs in hierarchies equal to or lower than this LCU can take five types of sizes, that is, any of 128×128 pixels, 64×64 pixels, 32×32 pixels, 16×16 pixels, and 8×8 pixels. Also, a CU which is not further divided will be referred to as a leaf CU.

(CU Header)

The CU header CUH includes an encoding parameter to be referenced by the moving image decoding device 1 for determining a method for decoding a target CU. Specifically, as illustrated in (c) in FIG. 2, there is included a CU division flag SP_CU for specifying whether to further divide the target CU four ways to lower-order. In the event that the CU division flag SP_CU is 0, that is, in the event that the CU is not further divided, this CU is a leaf CU.

(Leaf CU)

The CU that is not further divided (leaf of CU) is treated as a prediction unit (PU: Prediction Unit) and a transform unit (TU: Transform Unit).

As illustrated in (d) in FIG. 2, a leaf CU (referred to as CUL in (d) in FIG. 2) includes (1) PU information PUI to be referenced at the time of a predicted image being generated by the moving image decoding device 1, and (2) TU information TUI to be referenced at the time of residual data being decoded by the moving image decoding device 1.

A skip flag SKIP is a flag that indicates whether or not a skip mode is applied to a target PU, and in the event that the value of the skip flag SKIP is 1, that is, in the event that the skip mode has been applied to the target leaf, the PU information PUI and TU information TUI in the leaf CU thereof are omitted. Note that the skip flag SKIP is omitted in the I slice.

The PU information PUI includes, as illustrated in (d) in FIG. 2, the skip flag SKIP, prediction type information PT, and prediction information PI. The prediction type information PT is information for specifying whether to use intra prediction or inter prediction as a prediction image generating method regard a target leaf CU (target PU). The prediction information PI is made up of intra prediction information PI_Intra or inter prediction information PI_Inter according to which prediction procedure the prediction type information PT specifies. Hereinafter, a PU to which intra prediction is applied will also be referred to as an intra PU, and a PU to which inter prediction is applied will also be referred to as an inter PU.

The PU information PUI includes the shape, size, and information specifying a position within a target PU, of each partition included in a target PU. The partition mentioned here is a single or multiple not overlapped regions which make up a target leaf CU, and generation of a predicted image is performed with a partition as a unit.

The TU information TUI includes, as illustrated in (d) in FIG. 2, a quantization parameter difference Δqp (tu_qp_delta) for specifying the size of a quantization step, TU division information SP_TU for specifying a division pattern for each block of a target leaf CU (target TU), and quantized predicted residual QD1 to QDNT (NT is a total number of blocks included in the target TU).

The quantization parameter difference Δqp is difference qp−qp' between a quantization parameter qp in the target TU, and a quantization parameter qp' in a TU encoded immediately before the TU thereof.

The TU division information SP_TU is specifically the shape, size, and information specifying a position within the target TU of each block included in the target TU. Each TU can take a size from 64×64 pixels to 2×2 pixels, for example. The block mentioned here is a single or multiple not overlapped regions which make up the target leaf CU, and encoding/decoding of predicted residual is performed with a block as a unit.

Each quantized predicted residual QD is encoded data generated by the moving image encoding device 2 subjecting a target block which is a block to be processed to the following processes 1 to 3. Process 1: A predicted residual obtained by subtracting a predicted image from an image to be encoded is subjected to DCT transform (Discrete Cosine Transform). Process 2: A DCT coefficient obtained in Process 1 is subjected to quantization. Process 3: The DCT coefficient subjected to quantization in Process 2 is subjected to variable length encoding. The above-mentioned quantization parameter qp represents the size of a quantization step QP used at the time of the moving image encoding device 2 subjecting the DCT coefficient to quantization ($QP=2^{qp/6}$).

(Inter Prediction Information PI_Inter)

The inter prediction information PI_Inter includes encoding parameters to be referenced at the time of the moving image decoding device 1 generating an inter predicted image by inter prediction. As illustrated in (e) in FIG. 2, the inter prediction information PI_Inter includes inter PU division information SP_Inter for specifying a division pattern for each partition of the target PU, and inter prediction parameters PP_Inter1 to PP_InterNe (Ne is a total number of inter prediction partitions included in the target PU) regarding the partitions.

The inter PU division information SP_Inter is specifically the shape, size, and information specifying a position within the target PU of each inter prediction partition included in the target PU (inter PU).

The inter PU can be divided into eight types of partitions in total of four symmetric divisions (symmetric splittings) of 2N×2N pixels, 2N×N pixels, N×2N pixels, and N×N pixels, and four asymmetric divisions (asymmetric splittings) of 2N×nU pixels, 2N×nD pixels, nL×2N pixels, and nR×2N pixels. A specific value of N is stipulated with the size of a CU to which this PU belongs, and specific values of nU, nD, nL, and nR are determined according to the value of N. For example, the inter PU of 128×128 pixels can be divided into inter prediction partitions of 128×128 pixels, 128×64 pixels, 64×128 pixels, 64×64 pixels, 128×32 pixels, 128×96 pixels, 32×128 pixels, or 96×128 pixels.

(Inter Prediction Parameters PP_Inter)

The inter prediction parameters PP_Inter include, as illustrated in (e) in FIG. 2, a reference image index RI, an estimated motion vector index PMVI, and a motion vector residual MVD.

The motion vector residual MVD is encoded data generated by the moving image encoding device 2 executing the following processes 4 to 6. Process 4: An encoded/decoded local decoded image (more accurately, image obtained by subjecting an encoded/decoded local decoded image to deblocking and adaptive filter processing), and a motion vector my for a target partition is derived with reference to the selected encoded/decoded local decoded image (hereinafter, also referred to as "reference image"). Process 5: An estimating method is selected, an estimated value (hereinafter, also referred to as "estimated motion vector") pmv of the motion vector my to be assigned to the target partition is derived using the selected estimating method. Process 6: The motion vector residual MVD obtained by subtracting the estimated motion vector pmv derived in Process 5 from the motion vector my derived in Process 4 is encoded.

The reference image index RI is for specifying an encoded/decoded local decoded image (reference image) selected in Process 4, and the above-mentioned estimated motion vector index PMVI is for specifying the estimating method selected in Process 5. Examples of the estimating method that can be selected in Process 5 include (1) With a local decoded image being encoded/decoded (more accurately, image to be obtained by subjecting a decoded region of a local decoded image being encoded/decoded to deblocking and adaptive filter processing), a method wherein median of a motion vector assigned to a partition adjacent to the target partition (hereinafter, also referred to as "adjacent partition") is taken as the estimated motion vector pmv, and (2) With an encoded/decoded local decoded image, a method wherein a motion vector assigned to a partition which occupies the same position as with the target partition (often referred to as "colocate partition") is taken as the estimated motion vector pmv.

Note that prediction parameters PP regarding a partition where uni prediction is performed include, as illustrated in (e) in FIG. 2, each of the reference image index RI, estimated motion vector index PMVI, and motion vector residual MVD one at a time, but prediction parameters PP regarding a partition where bi prediction (weighted prediction) is performed include two reference image indexes RI1 and RI2, two estimated motion vector indexes PMVI1 and PMVI2, and two motion vector residuals MVD1 and MVD2.

(Intra Prediction Information PI_Intra)

The intra prediction information PI_Intra includes encoding parameters to be referenced at the time of the moving image decoding device 1 generating an intra predicted image by intra prediction. As illustrated in (f) in FIG. 2, the intra prediction information PI_Intra includes intra PU division information SP_Intra for specifying a division pattern for the partitions of the target PU (intra PU), and intra prediction parameters PP_Intra1 to PP_IntraNa (Na is a total number of intra prediction partitions included in the target PU) regarding the partitions.

The intra PU division information SP_Intra is specifically the shape, size, and information specifying a position within the target PU of each intra prediction partition included in the target PU. The intra PU division information SP_Intra includes an intra division flag (intra_split_flag) for specifying whether to divide the target PU into partitions. In the event that the intra division flag is 1, the target PU is symmetrically divided into four partitions, and in the event that the intra division flag is 0, the target PU is treated as one partition without being divided. Accordingly, if we say that the size of the target PU is 2N×2N pixels, the intra prediction partition obtains any size of 2N×2N pixels (without division) and N×N pixels (four divisions) (here, $N=2^n$, n is an optional integer equal to or greater than 1). For example, an intra PU of 128×128 pixels can be divided into intra prediction partitions of 128×128 pixels and 64×64 pixels.

(Intra Prediction Parameters PP_Intra)

The intra prediction parameters PP_Intra include, as illustrated in (f) in FIG. 2, an estimation flag MPM, and a residual prediction mode index RIPM. The intra prediction parameters PP_Intra are parameters for specifying an intra prediction procedure (prediction mode) regarding the partitions.

The estimation flag MPM is a flag that indicates whether a prediction mode estimated based on a prediction mode assigned to a partition in the vicinity of the target partition which is a processing target agrees with the prediction mode regarding this target partition. Examples of the partition in the vicinity of the target partition include a partition adjacent to the upper edge of the target partition, and a partition adjacent to the left edge of the target partition.

The residual prediction mode index RIPM is an index to be included in the intra prediction parameters PP_Intra in the event that the estimated prediction mode differs from the prediction mode regarding the target partition, and is an index for specifying a prediction mode to be assigned to this target partition.

(Filter Parameters FP)

As described above, the slice header SH includes the filter parameters FP to be referenced by the adaptive filter included in the moving image decoding device 1. The filter parameters FP include, as illustrated in (g) in FIG. 2, a filter coefficient group. The filter coefficient group includes (1) tap count specification information for specifying the number of taps of the filter, (2) filter coefficients $a_0$ to $a_{NT-1}$ (NT is a total number of filter coefficients included in the filter coefficient group), and (3) offset o.

(Moving Image Decoding Device 1)

Hereinafter, the moving image decoding device 1 according to the present embodiment will be described with reference to FIG. 1 to FIG. 19. The moving image decoding device 1 is a decoding device which includes H.264/MPEG-4.AVC, technology employed by KTA software which is a codec for joint development in VCEG (Video Coding Expert Group), and technology employed by TMuC (Test Model under Consideration) software which is a succeeding codec thereof at a portion thereof.

Figure 3:
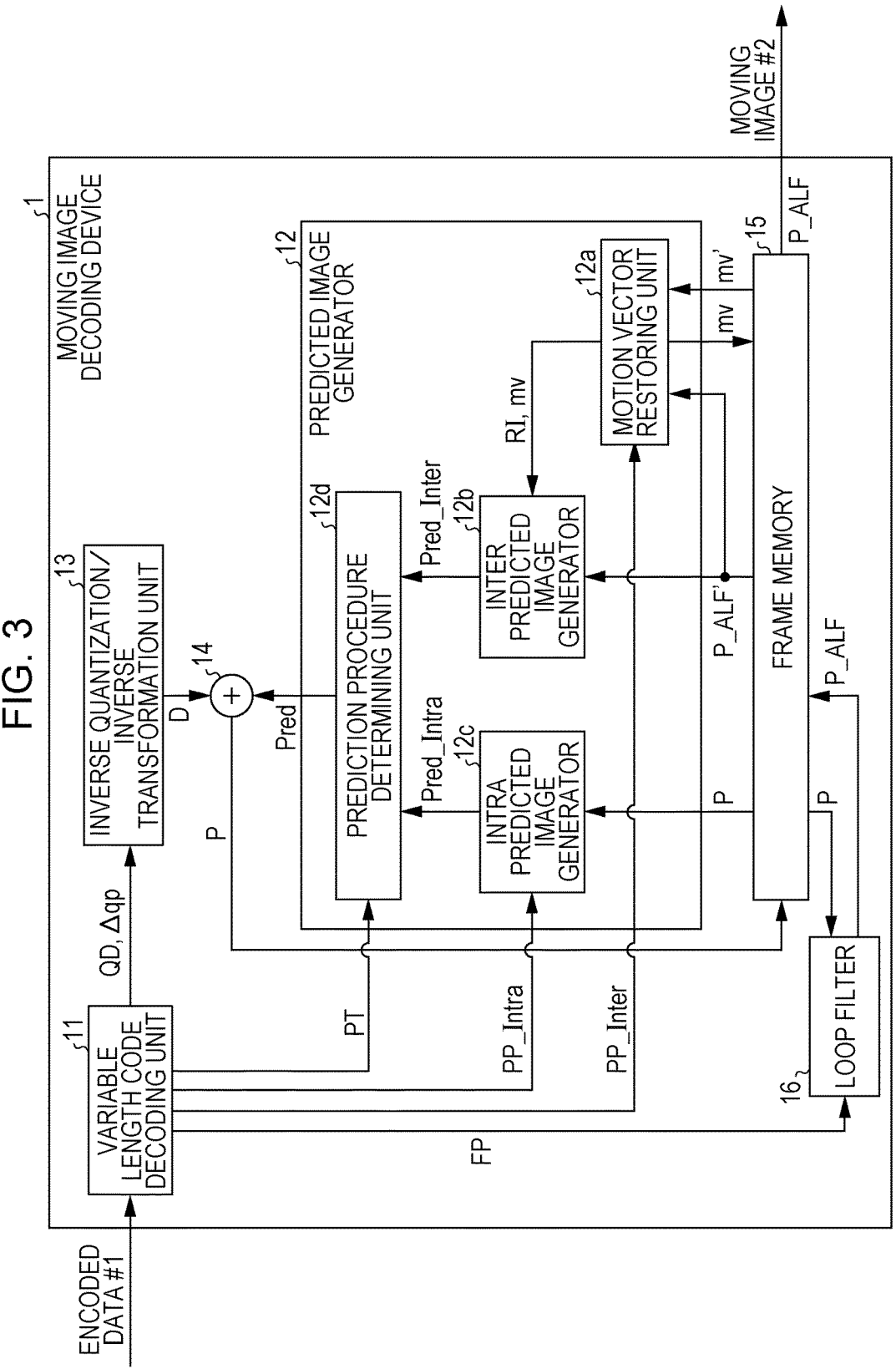
FIG. 3 is a block diagram illustrating a configuration of the moving image decoding device according to the first embodiment of the present invention.

FIG. 3 is a block diagram illustrating the configuration of the moving image decoding device 1. As illustrated in FIG. 3, the moving image decoding device 1 includes a variable length code decoding unit 11, a predicted image generator 12, an inverse quantization/inverse transformation unit 13, an adder 14, frame memory 15, and a loop filter 16. Also, as illustrated in FIG. 3, the predicted image generator 12 includes a motion vector restoring unit 12a, an inter predicted image generator 12b, an intra predicted image generator 12c, and a prediction procedure determining unit 12d. The moving image decoding device 1 is a device configured to generate a moving image #2 by decoding encoded data #1.

(Variable Length Code Decoding Unit 11)

The variable length code decoding unit 11 decodes prediction parameters PP regarding the partitions from the encoded data #1 to supply these to the predicted image generator 12. Specifically, the variable length code decoding unit 11 decodes, with regard to an inter prediction partition, the inter prediction parameters PP_Inter including the reference image index RI, estimated motion vector index PMVI, and motion vector residual MVD from the encoded data #1, and supplies these to the motion vector restoring unit 12a. On the other hand, the variable length code decoding unit 11 decodes, with regard to an intra prediction partition, the intra prediction parameters PP_Intra including the estimation flag MPM, residual index RIPM, and additional index AI from the encoded data #1, and supplies these to the intra predicted image generator 12c.

Also, the variable length code decoding unit 11 decodes the prediction type information PT regarding each of the partitions from the encoded data #1, and supplies this to the prediction procedure determining unit 12d. Further, the variable length code decoding unit 11 decodes the quantization prediction residual QD regarding each of the blocks, and the quantization parameter difference Δqp regarding the TU including the block thereof from the encoded data #1, and supplies these to the inverse quantization/inverse transformation unit 13. Also, the variable length code decoding unit 11 decodes the filter parameters FP from the encoded data #1, and supplies this to the loop filter 16.

(Predicted Image Generator 12)

The predicted image generator 12 identifies whether each partition is an inter prediction partition to be subjected to inter prediction or an intra prediction partition to be subjected to intra prediction based on the prediction type information PT regarding each partition. In the case of the former, the predicted image generator 12 generates an inter predicted image Pred_Inter, and also supplies the generated inter predicted image Pred_Inter to the adder 14 as a predicted image Pred, and in the case of the latter, generates an intra predicted image Pred_Intra, and also supplies the generated intra predicted image Pred_Intra to the adder 14. Note that, in the event that the skip mode has been applied to the PU to be processed, the predicted image generator 12 omits decoding of another parameter belonging to this PU.
(Motion Vector Restoring Unit 12*a*)

The motion vector restoring unit 12*a* restores the motion vector my regarding each inter prediction partition from the motion vector residual MVD regarding the partition thereof, and a decoded motion vector mv' regarding another partition. Specifically, (1) In accordance with an estimation method specified by the estimated motion vector index PMVI, the estimated motion vector pmv is derived from the decoded motion vector mv', and (2) The motion vector my is obtained by adding the derived estimated motion vector pmv and motion vector residual MVD. Note that the decoded motion vector mv' regarding another partition can be read out from the frame memory 15. The motion vector restoring unit 12*a* supplies the restored motion vector my to the inter predicted image generator 12*b* along with the corresponding reference image index RI.
(Inter Predicted Image Generator 12*b*)

The inter predicted image generator 12*b* generates a motion compensation image mc regarding each inter prediction partition by inter-frame prediction. Specifically, the inter predicted image generator 12*b* generates a motion compensation image mc from an adaptive-filtered decoded image P_ALF' specified by the reference image index RI supplied from the same motion vector restoring unit 12*a* using the motion vector my supplied form the motion vector restoring unit 12*a*. Here, the adaptive-filtered decoded image P_ALF' is an image to be obtained by subjecting a decoded image where the entire frame has already been completed to filter processing by the loop filter 16, and the inter predicted image generator 12*b* can read out the pixel value of each pixel which makes up the adaptive-filtered decoded image P_ALF' from the frame memory 15. The motion compensation image mc generated by the inter predicted image generator 12*b* is supplied to the prediction procedure determining unit 12*d* as the inter predicted image Pred_Inter.
(Intra Predicted Image Generator 12*c*)

The intra predicted image generator 12*c* generates a predicted image Pred_Intra regarding each intra prediction partition. Specifically, first, the intra predicted image generator 12*c* identifies a prediction mode based on the intra prediction parameters PP_Intra supplied from the variable length code decoding unit 11, and assigns the identified prediction mode to the target partition, for example, in raster scan order.

Here, identification of a prediction mode based on the intra prediction parameters PP_Intra can be performed as follows. (1) The estimation flag MPM is decoded, and in the event that this estimation flag MPM indicates that the prediction mode regarding the target partition which is a processing target agrees with the prediction mode assigned to a partition in the vicinity of this target partition, the prediction mode assigned to a partition in the vicinity of this target partition is assigned to the target partition. (2) On the other hand, in the event that this estimation flag MPM indicates that the prediction mode regarding the target partition which is a processing target does not agree with the prediction mode assigned to a partition in the vicinity of this target partition, the residual mode index RIPM is decoded, and a prediction mode that this residual prediction mode index RIPM indicates is assigned to the target partition.

The intra predicted image generator 12*c* generates a predicted image Pred_Intra from the (local) decoded image P by intra-screen prediction in accordance with a prediction procedure that the prediction mode assigned to the target partition indicates. The intra predicted image Pred_Intra generated by the intra predicted image generator 12*c* is supplied to the prediction procedure determining unit 12*d*. Note that an arrangement may be made wherein the intra predicted image generator 12*c* generates a predicted image Pred_Intra from the adaptive-filtered decoded image P_ALF by intra-screen prediction.
(Prediction Procedure Determining Unit 12*d*)

The prediction procedure determining unit 12*d* determines, based on the prediction type information PT regarding a PU to which each partition belongs, whether each partition is an inter prediction partition to be subjected to inter prediction or an intra prediction partition to be subjected to intra prediction. In the case of the former, the prediction procedure determining unit 12*d* supplies the inter predicted image Pred_Inter generated at the inter predicted image generator 12*b* to the adder 14 as a predicted image Pred, and in the case of the latter, the prediction procedure determining unit 12*d* supplies the intra predicted image Pred_Intra generated at the intra predicted image generator 12*c* to the adder 14 as a predicted image Pred.
(Inverse Quantization/Inverse Transformation Unit 13)

The inverse quantization/inverse transformation unit 13 (1) subjects the quantization prediction residual QD to inverse quantization, (2) subjects a DCT coefficient obtained by inverse quantization to inverse DCT (Discrete Cosine Transform) transform, and (3) supplies a prediction residual D obtained by inverse DCT transform to the adder 14. Note that, at the time of subjecting the quantization prediction residual QD to inverse quantization, the inverse quantization/inverse transformation unit 13 derives a quantization step QP from the quantization parameter difference $\Delta qp$ supplied from the variable length code decoding unit 11. The quantization parameter qp can be derived by adding the quantization parameter difference $\Delta qp$ to the quantization parameter qp' regarding a TU which has been subjected to inverse quantization/inverse DCT transform immediately before, the quantization step QP can be derived from the quantization step qp by $QP=2^{qp/6}$, for example. Also, generation of the prediction residual D by the inverse quantization/inverse transformation unit 13 is performed with a TU or a block divided from a TU as a unit.
(Adder 14)

The adder 14 generates a decoded image P by adding the predicted image Pred supplied from the predicted image generator 12 and the prediction residual D supplied from the inverse quantization/inverse transformation unit 13. The generated decoded image P is stored in the frame memory 15.
(Loop Filter 16)

The loop filter 16 has (1) a function as a deblocking filter (DF: Deblocking Filter) configured to perform smoothing (deblocking) of an image in the vicinity of a block boundary or a partition boundary in the decoded image P, and (2) a function as an adaptive filter (ALF: Adaptive Loop Filter) configured to perform adaptive filter processing on an image on which the deblocking filter acts, using the filter parameters FP.

Figure 1:
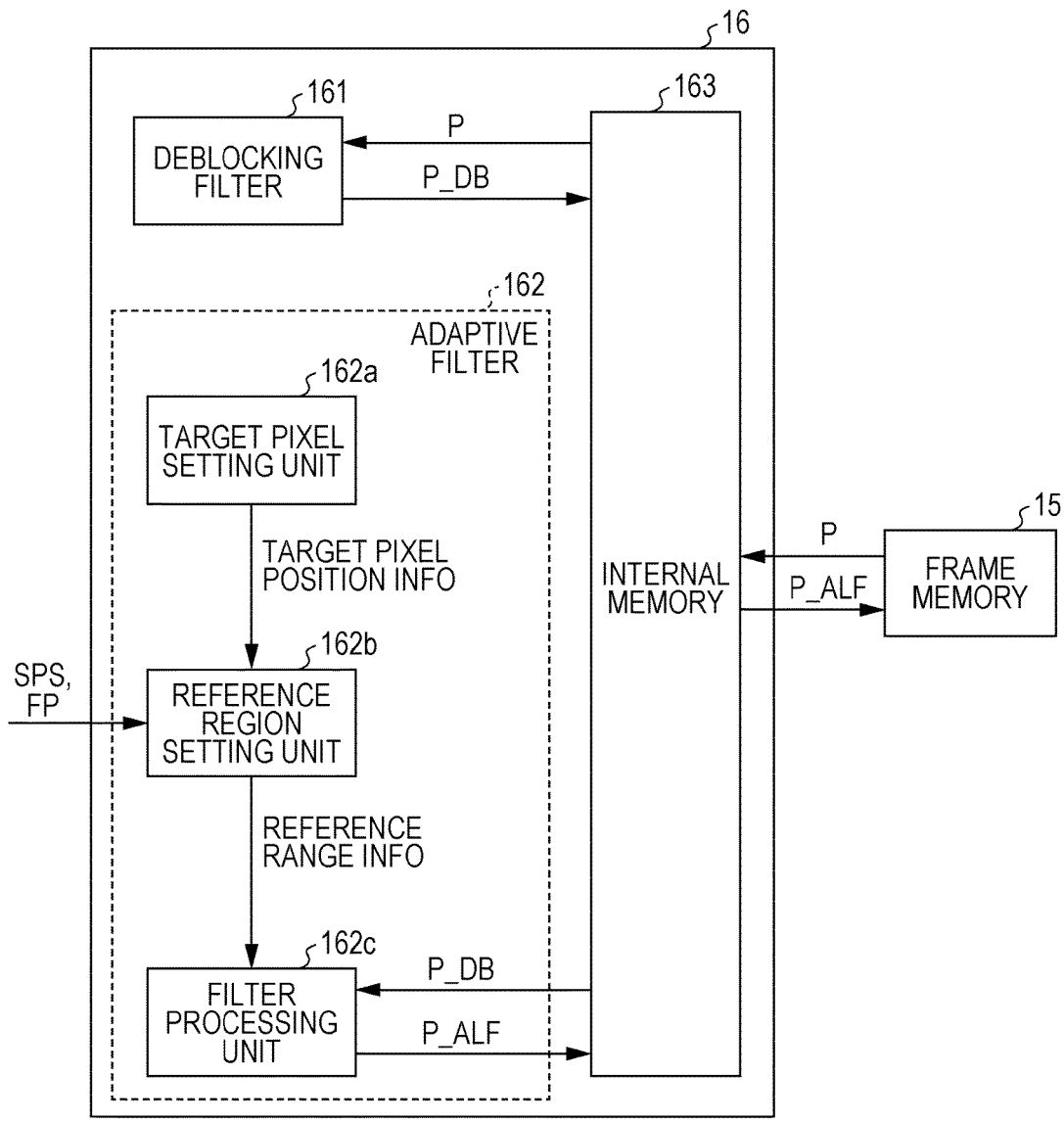
FIG. 1 is a block diagram illustrating a configuration of an adaptive filter including a moving image decoding device according to a first embodiment of the present invention.

FIG. 1 is a block diagram illustrating the configuration of the loop filter 16. As illustrated in FIG. 1, the loop filter 16 includes a deblocking filter 161, an adaptive filter 162, and internal memory 163.
(Deblocking Filter 161)

The deblocking filter 161 generates a deblocked decoded image P_DB by performing smoothing of an image in a region in the vicinity of a block boundary or a partition boundary in the decoded image P.

Figure 4:
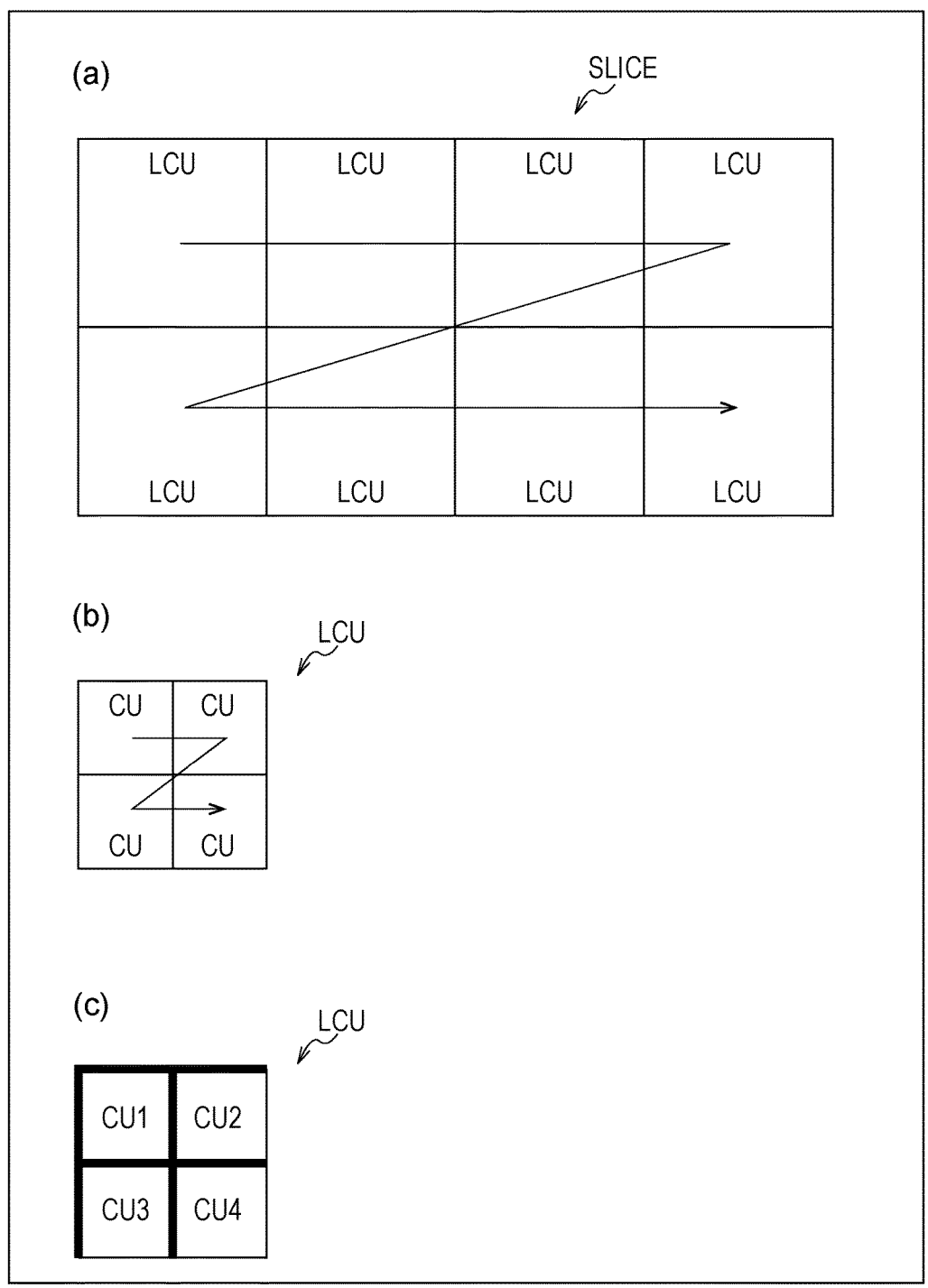
FIG. 4 is a diagram for describing deblocking processing by a deblocking filter which a loop filter according to the first embodiment of the present invention has, (a) illustrates processing order for multiple LCUs included in a slice, (b) illustrates processing order for multiple CUs included in the LCU, (c) illustrates a border (thick solid line) of deblocking completion at a point-in-time when deblocking regarding an LCU made up of multiple CUs is completed, and a border (thin solid line) of deblocking incompletion.

The deblocking filter 161 performs deblocking on the decoded image P in the target slice in raster scan order for each LCU as illustrated in (a) in FIG. 4. Also, in the event that the target LCU includes multiple CUs, as illustrated in (b) in FIG. 4, the deblocking filter 161 performs deblocking in raster scan order for each CU included in the target LCU. Also, regarding the target CU, the deblocking filter 161 first performs deblocking on a boundary on the left side of the target CU, and then performs deblocking on a boundary on the upper side of the target CU.

(c) in FIG. 4 is a diagram illustrating a case where the deblocking filter 161 acts on the target LCU including four CUs (CU1 to 4). In (c) in FIG. 4, deblocking by the deblocking filter 161 has been applied to boundaries indicated by a thick solid line, and deblocking has not been applied to boundaries indicated by a thin solid line even at the time of deblocking regarding the target LCU being ended. Note that, of the boundaries indicated by the thin solid lines, deblocking is performed on the boundary of the right edge of the target LCU at the time of performing deblocking on an LCU adjacent to the right side of the target LCU, and deblocking is performed on the boundary of the lower edge of the target LCU at the time of performing deblocking on an LCU adjacent to the lower edge of the target LCU.

In this manner, even at the time of deblocking being performed on the target LCU, deblocking has not been performed on the boundaries of the right edge and lower edge of the target LCU, which serves a point for understanding at least one aspect of the present invention.

Hereinafter, prior to specific description regarding configuration of the units of the loop filter 16, processing by the loop filter 16 will be schematically described. The loop filter 16 performs one of the following two processing examples (processing example 1, processing example 2).

Processing Example 1

With the present processing example, the loop filter 16 performs deblocking in increments of LCUs, and performs adaptive filter processing for each first filter processing unit. Note that the first filter processing unit in the present processing example is set so as to have the same size and same position as with the target LCU as illustrated in (a) in FIG. 5. Also, with the following description, the first filter processing unit will also be referred to as ALFU1.

Figure 5:
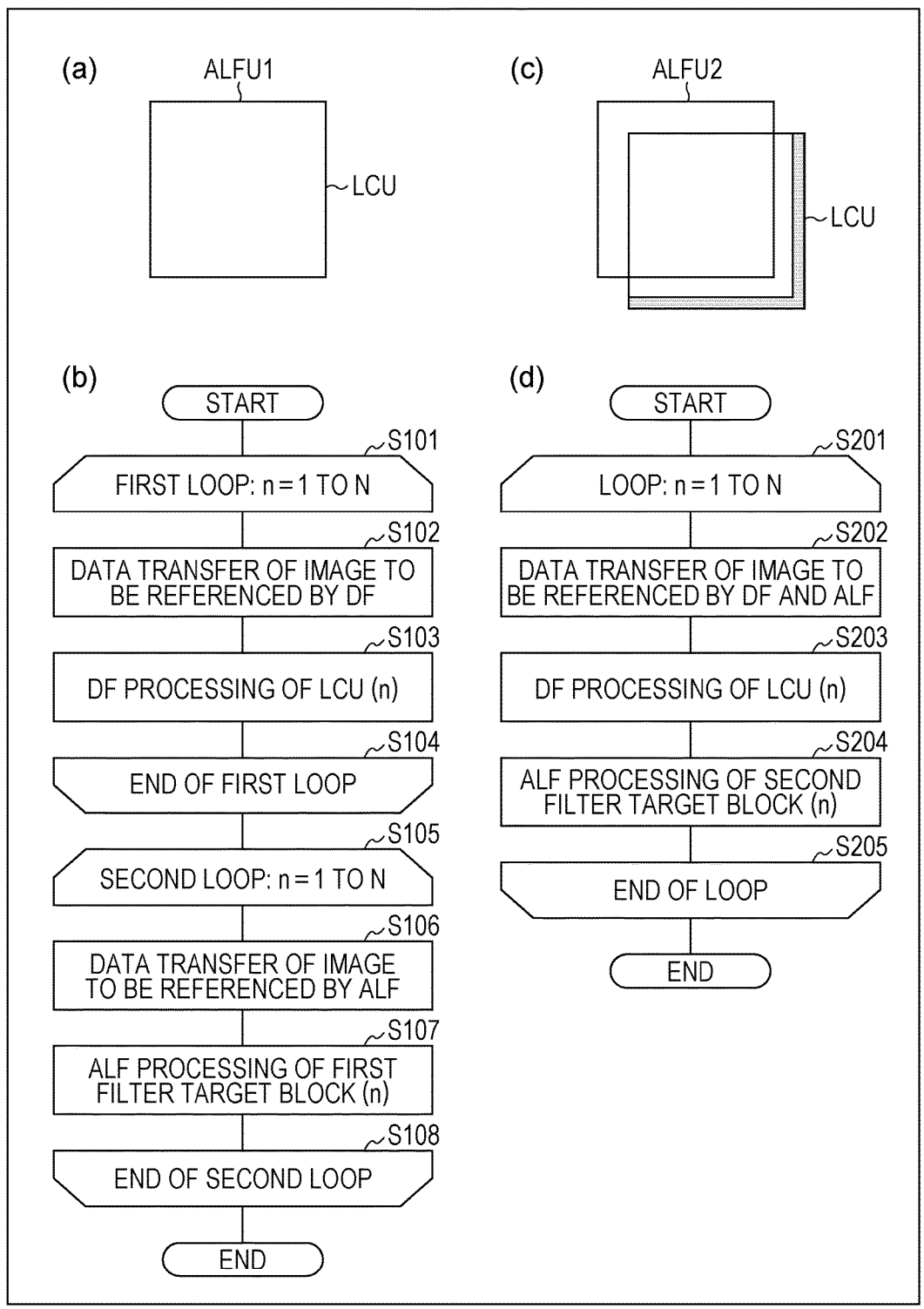
FIG. 5 is a diagram for describing processing by a loop filter according to the first embodiment of the present invention, (a) illustrates a first filter processing unit ALFU1 to be set regarding a target LCU in a first processing example, (b) illustrates a flowchart of the first processing example, (c) illustrates a second filter processing unit ALFU2 to be set regarding a target LCU in a second processing example, and (b) illustrates a flowchart of the second processing example.

(b) in FIG. 5 is a flowchart illustrating a flow of processing in the present processing example. The loop filter 16 performs the following processing in the present processing example.

(Step S101)

The loop filter 16 initializes the value of a loop variable n to 1, and starts first loop processing wherein with regard to n that satisfying $1 \leq n \leq N$, an increment value of the loop variable n for each loop is taken as 1. Here, N indicates a total number of LCUs included in a slice to be processed. Note that, hereinafter, the n'th LCU will also be referred to as LCU(n).

(Step S102)

The loop filter 16 obtains, of the pixel values of the decoded image P stored in the frame memory 15, a pixel value to be referenced by the deblocking filter 161 for performing deblocking regarding the LCU(n) from the frame memory 15, and stores this in the internal memory 163.

(Step S103)

Next, the loop filter 16 generates a deblocked image P_DB regarding the LCU(n) by performing deblocking regarding the LCU(n) in the decoded image P stored in the internal memory 163 using the deblocking filter 161, and stores the generated deblocked image P_DB in the internal memory 163.

(Step S104)

This step is termination of the first loop processing.

(Step S105)

Next, the loop filter 16 initializes the value of a loop variable n to 1, and starts second loop processing wherein with regard to n that satisfying $1 \leq n \leq N$, an increment value of the loop variable n for each loop is taken as 1. Here, N indicates a total number of ALFU1s included in a slice to be processed, and is the same as the total number of LCUs. Note that, hereinafter, the n'th first filter processing unit ALFU1 will also be referred to as ALFU1(n).

(Step S106)

The loop filter 16 obtains, of the pixel values of the deblocked decoded image P_DB stored in the frame memory 15, a pixel value to be referenced by the adaptive filter 162 for performing adaptive filter processing regarding the ALFU1(n) from the frame memory 15, and stores this in the internal memory 163.

(Step S107)

Next, the loop filter 16 generates a filtered image P_ALF regarding the ALFU1(n) by performing adaptive filter processing regarding the ALFU1(n) in the deblocked decoded image P_DB stored in the internal memory 163 using the adaptive filter 162, and stores the generated filtered image P_ALF in the internal memory 163.

(Step S108)

This step is termination of the second loop.

The above is the flow of the processing in the processing example 1. Note that the filtered image P_ALF stored in the internal memory 163 by the adaptive filter 162 is transferred to and stored in the frame memory 15.

In this manner, with the present processing example, deblocking is performed previously on all of the LCUs included in the target slice, and adaptive filter processing is then performed. Accordingly, with the present processing example, the loop filter 16 performs transfer of data from the frame memory 15 to the internal memory 163 twice regarding each n (step S102 and step S106).

Processing Example 2

With the present processing example, the loop filter 16 performs deblocking in increments of LCUs, and performs adaptive filter processing for each second filter processing unit. Note that the second filter processing unit in the present processing example is set so as to have the same size as with the target LCU and so as to have a position different from the target LCU as illustrated in (c) in FIG. 5. Also, the second filter processing unit regarding the target LCU is set so as not to be overlapped with a region where deblocking has not been performed regarding the target LCU (shaded portion in (c) in FIG. 5). Also, with the following description, the second filter processing unit will also be referred to as ALFU2.

(d) in FIG. 5 is a flowchart illustrating a flow of processing in the present processing example. The loop filter 16 performs the following processing in the present processing example.

(Step S201)

The loop filter 16 initializes the value of a loop variable n to 1, and starts loop processing wherein with regard to n that satisfying 1≤n≤N, an increment value of the loop variable n for each loop is taken as 1. Here, as described above, N indicates a total number of LCUs included in a slice to be processed. Note that, hereinafter, the n'th second filter processing unit ALFU2 will also be referred to as ALFU2(n).

(Step S202)

The loop filter 16 obtains, of the pixel values of the decoded image P stored in the frame memory 15, a pixel value to be referenced for performing deblocking regarding the LCU(n) and adaptive filter processing regarding the ALFU2(n) from the frame memory 15, and stores this in the internal memory 163.

(Step S203)

Next, the loop filter 16 generates a deblocked image P_DB regarding the LCU(n) by performing deblocking regarding the LCU(n) in the decoded image P stored in the internal memory 163 using the deblocking filter 161, and stores the generated deblocked image P_DB in the internal memory 163.

(Step S204)

Next, the loop filter 16 generates a filtered image P_ALF regarding the ALFU2(n) by performing adaptive filter processing regarding the ALFU2(n) in the deblocked decoded image P_DB stored in the internal memory 163 using the adaptive filter 162, and stores the generated filtered image P_ALF in the internal memory 163.

(Step S205)

This step is termination of the loop.

The above is the flow of the processing in the processing example 2. Note that the filtered image P_ALF stored in the internal memory 163 by the adaptive filter 162 is transferred to and stored in the frame memory 15.

In this manner, with the present processing example, after deblocking is performed on the LCU(n) included in the target slice, and adaptive filter processing in the ALFU2(n) corresponding to the LCU(n) is performed. Accordingly, with the present processing example, it is sufficient that the loop filter 16 performs transfer of data from the frame memory 15 to the internal memory 163 once regarding each n (step S202).

(Adaptive Filter 162)

Hereinafter, the configuration of the adaptive filter 162 included in the loop filter 16 will be described with reference to FIG. 1. As illustrated in FIG. 1, the adaptive filter 162 includes a target pixel setting unit 162a, a reference region setting unit 162b, and a filter processing unit 162c.

The target pixel setting unit 162a sets the pixels included in the filter processing unit ALFU to as the target pixel in raster scan order. Target pixel position information that indicates the position of the target pixel set by the target pixel setting unit 162a is supplied to the reference region setting unit 162b. The reference region R is set for each target pixel by the reference region setting unit 162b, and a pixel value is calculated by the filter processing unit 162c for each target pixel.

The reference region setting unit 162b sets a filter reference region R (also simply referred to as reference region R) in the vicinity of the target pixel based on the position of the target pixel within the filter processing unit ALFU or the position of the target pixel within the target LCU. Here, the filter reference region R is determined depending on at least one of (1) tap information included in the filter parameters FP, (2) width Ddf in the Y direction of a region where deblocking by the deblocking filter 161 has not been completed in the target LCU, (3) length LLCUy in the Y direction of the target LCU, and (4) an absolute value Ly of deviation in the Y direction between the target LCU and target ALFU. Note that the length LLCUy in the Y direction of the target LCU may be expressed as height LcuHeight of the LCU. Note that the LLCUy (LcuHeight) is derived with the following expression using a logarithmic value Log 2MaxCUSize of the LCU size.

LcuHeight=(1<<Log 2MaxCUSize)

The reference region setting unit 162b sets the reference region R so as to satisfy at least one restraint of restraints A to E listed below.

Restraint A: In the case that the Y coordinate within the LCU of the target pixel is less than a predetermined threshold Lupper1, an upward reference range Dupper is restricted to the number of pixels equal to or smaller than the Y coordinate within the LCU of the target pixel.

The upward reference range Dupper mentioned here specifies distance along the Y axis between the target pixel and a pixel within the reference region R which is a pixel adjacent to the upper edge of the reference region R (this will be applied to the following). Also, let us say that the upward reference range Dupper is represented with a pixel as a unit (this will be applied to the following).

Also, as the predetermined threshold Lupper1, a fixed value such as 4 or 8 or the like may be employed, or a variable value may be employed (this will be applied to the following). Also, the upward reference range Dupper in the event that the Y coordinate within the LCU of the target pixel is less than the predetermined threshold Lupper1 may be set so as to depend on the Y coordinate within the LCU of the target pixel, or may be set to, for example, 0 without depending on the Y coordinate within the LCU of the target pixel.

In more general, the restraint A may also be expressed as a restraint for restricting, when distance DU between the upstream edge of the LCU including the target pixel, and this target pixel is less than a predetermined threshold, a position of the upstream edge of the reference region R regarding this target pixel so that distance with this target pixel is equal to or shorter than the DU.

Note that the above-mentioned "upstream edge" specifies any one of the upper edge and left edge when the processing is performed in raster scan order, and specifies any one of the lower edge and right edge when the processing is performed in inverse order of raster scan. Also, the above-mentioned "downstream edge" specifies any one of the lower edge and right edge when the processing is performed in raster scan order, and specifies any one of the upper edge and left edge when the processing is performed in inverse order of raster scan (this will be applied to the following).

Also, with the following description, "the downstream side of the downstream edge" specifies, when the processing is performed in raster scan order, any one of "the lower side of the lower edge", and "the right side of the right edge", and specifies, when the processing is performed in inverse order of raster scan, any one of "the upper side of the upper edge", and "the left side of the left edge". Also, with the following description, "the upstream side of the downstream edge" specifies, when the processing is performed in raster scan order, any one of "the upper side of the lower edge", and "the left side of the right edge", and specifies, when the processing is performed in inverse order of raster scan, any one of "the lower side of the upper edge", and "the right side of the left edge".

Restraint B: In the case that the Y coordinate within the LCU of the target pixel is equal to or greater than a predetermined threshold LLCUy−Llower1, a downward reference range Dlower is restricted to the number of pixels equal to or smaller than LLCUy−(Y coordinate within the LCU of the target pixel)−1.

The downward reference range Dlower mentioned here specifies distance along the Y axis between the target pixel and a pixel within the reference region R which is a pixel adjacent to the lower edge of the reference region R (this will be applied to the following). Also, let us say that the downward reference range Dlower is represented with a pixel as a unit (this will be applied to the following).

Also, the downward reference range Dlower in the event that the Y coordinate within the LCU of the target pixel is equal to or greater than the predetermined threshold LLCUy−Llower1 may be set so as to depend on the Y coordinate within the LCU of the target pixel, or may be set to, for example, 0 without depending on the Y coordinate within the LCU of the target pixel.

In more general, the restraint B may also be expressed as a restraint for restricting, when distance DL between the downstream edge of the LCU including the target pixel, and this target pixel is less than a predetermined threshold, a position of the downstream edge of the reference region regarding this target pixel so that distance with this target pixel is equal to or shorter than the DL.

Restraint C: In the case that the normalized Y coordinate within the LCU of the target pixel is equal to or greater than a predetermined threshold Lupper2, the upward reference range Dupper is restricted to the number of pixels equal to or smaller than Ly+(normalized Y coordinate within the LCU of the target pixel)−LLCUy.

A boundary of the Lupper2 indicated with the predetermined threshold will be called virtual boundary line (Virtual Boundary Line). The position of the virtual boundary line will be referred to as VBLine.

The normalized Y coordinate within the LCU mentioned here is defined with (Y coordinate within the LCU) % LLCUy in which a symbol "%" that represents remainder operation is used, and takes a value equal to or greater than 0 (this will be applied to the following). Also, the Y coordinate within the LCU=(Y coordinate of the target pixel) % LLCUy, and consequently, the normalized Y coordinate within the LCU is the same as (Y coordinate % LLCUy) using the Y coordinate of the target pixel. Also, in the event that the position of the target pixel is expressed with the upper left coordinates (xC, yC) of a block including the target pixel and relative coordinates (x, y) from the upper left coordinates of the block, normalized Y coordinate yr within the LCU is represented with (yC+y) % LcuHeight.

Also, the predetermined threshold Lupper2 has to be a value equal to or smaller than LLCUy−Ly (this will be applied to the following). If we say that Ly=4, the position of the virtual boundary line in the restraint C VBLine (=LcuHeight−Ly) becomes LcuHeight−4. If we say that Ly=3, the VBLine becomes LcuHeight−3. Also, the upward reference range Dupper in the event that the normalized Y coordinate within the LCU of the target pixel is equal to or greater than the predetermined threshold Lupper2 may be set so as to depend on the Y coordinate within the LCU of the target pixel, or may be set to, for example, 0 without depending on the Y coordinate within the LCU of the target pixel.

In more general, the restraint C may also be expressed as a restraint for restricting, when the target pixel is positioned on the downstream side of the downstream edge of the ALFU corresponding to the CLU including this target pixel (equal to or lower than the virtual boundary line VBLine), the position of the upstream edge of the reference region R regarding the target pixel so that distance with this target pixel becomes equal to or shorter than distance between this target pixel and the upstream edge of the output unit thereof (virtual boundary line VBLine). In this case, the reference region R is restricted so as not to include a pixel on the upper side than the virtual boundary line VBLine. That is to say, a pixel alone of which the Y coordinate is equal to or lower than the virtual boundary line VBLine is referenced.

Restraint D: In the case that the normalized Y coordinate within the LCU of the target pixel is less than a predetermined threshold Llower2, the downward reference range Dlower is restricted to the number of pixels equal to or smaller than LLCUy−Ddf−(normalized Y coordinate within the LCU of the target pixel)−1.

Here, the downward reference range Dlower in the event that the normalized Y coordinate within the LCU of the target pixel is less than the predetermined threshold Llower2 may be set so as to depend on the Y coordinate within the LCU of the target pixel, or may be set to, for example, 0 without depending on the Y coordinate within the LCU of the target pixel. Also, the threshold Llower2 has to be a value equal to or greater than LLCU y−Ly.

In more general, the restraint D may also be expressed as a restraint for restricting, when the target pixel is positioned on the upstream side of the downstream edge of the ALFU corresponding to the CLU including this target pixel, the position of the downstream edge of the reference region R regarding the target pixel so that distance with this target pixel becomes equal to or shorter than distance to be obtained by subtracting Ddf from distance between this target pixel and the downstream edge of this LCU.

Restraint E: In the case that the normalized Y coordinate within the LCU of the target pixel is less than a predetermined threshold Llower3, the downward reference range Dlower is restricted to the number of pixels equal to or smaller than LLCUy−Ly−(normalized Y coordinate within the LCU of the target pixel)−1. A boundary of Lupper3 indicated with a predetermined threshold will also be called a virtual boundary line (Virtual Boundary Line).

Here, the threshold Llower3 has to be a value equal to or greater than LLCUy−Ly. Now, if we say that Ly=4, a position of the virtual boundary line VBLine (=LcuHeight−Ly) in the restraint E becomes LcuHeight−4. If we say that Ly=3, the VBLine becomes LcuHeight−3.

In more general, the restraint E may also be expressed as a restraint for restricting, when the target pixel is positioned on the upstream side of the downstream edge of the ALFU corresponding to the CLU including this target pixel (upper side than the virtual boundary line VBLine), the position of the downstream edge of the reference region R regarding this target pixel so that distance with this target pixel becomes equal to or shorter than distance between this target pixel and the downstream edge of the output unit thereof (virtual boundary line VBLine). In this case, the reference region R is restricted so as not to include a pixel below the virtual boundary line VBLine. That is to say, a pixel alone of which the Y coordinate is above the virtual boundary line VBLine is referenced.

(Filter Processing Unit 162*c*)

The filter processing unit 162*c* calculates the pixel value of the target pixel of the adaptive-filtered decoded image P_ALF (also referred to as "image after filtering") with reference to the pixel value of a pixel included in the reference region R set regarding this target pixel by the reference region setting unit 162*b* which is a pixel value of the deblocked decoded image P_DB (also referred to as "image before filtering"). The generated adaptive-filtered decoded image P_ALF is stored once in the internal memory 163, and then transferred to the frame memory 15.

If we represent the pixel value of the target pixel in the adaptive-filtered decoded image P_ALF as SF(x', y'), and represent a pixel value of the deblocked decoded image P_DB in the filter reference range as S(x, y), the filter processing unit 162c calculates the pixel value SF(x', y') using the following Expression (1).

[Mathematical Expression 1]

$$S_F(x', y') = \left( \sum_{(i,j) \in R} a(i, j) \times S(x+i, y+j) \right) + o \quad (1)$$

Now, the coordinates (x, y) may be the same as the coordinates (x', y'), or may be different coordinates as long as these have correspondence of one on one. Also, a(i, j) represents of filter coefficients included in the filter parameters FP, a filter coefficient to be multiplied on a pixel value S(x+i, y+j) of an image before filtering, and o represents offset included in the filter parameters FP.

Also, R represents a region to be referenced for calculating the pixel value of the target pixel, and is set by the reference region setting unit 162b. (a) in FIG. 6 illustrates an allocation example of filter coefficients to the pixels included in the reference region R of 5×5 taps set by the reference region setting unit 162b. In (a) in FIG. 6, a shaded pixel indicates the target pixel S(x', y'). As illustrated in (a) in FIG. 6, each filter coefficient can be configured so as to be allocated to each pixel included in the filter reference region R so as to have a rotational symmetry property of 180 degrees. Specifically, aI(i, j) in Expression (1) can be configured such as aI(−3, −3)=aI(3, 3)=a0, aI(−2, −3)=aI(2, 3)=a1, . . . , using the filter coefficients a0 to a12 included in the filter parameters FP so as to satisfy aI(i, j)=aI(−i, −j). (b) in FIG. 6 illustrates an allocation example of the filter coefficients to the pixels included in the reference region R of 5 (horizontal direction)×3 (vertical direction) taps set by the reference region setting unit 162b.

(Flow of Adaptive Filter Processing)

Figure 7:
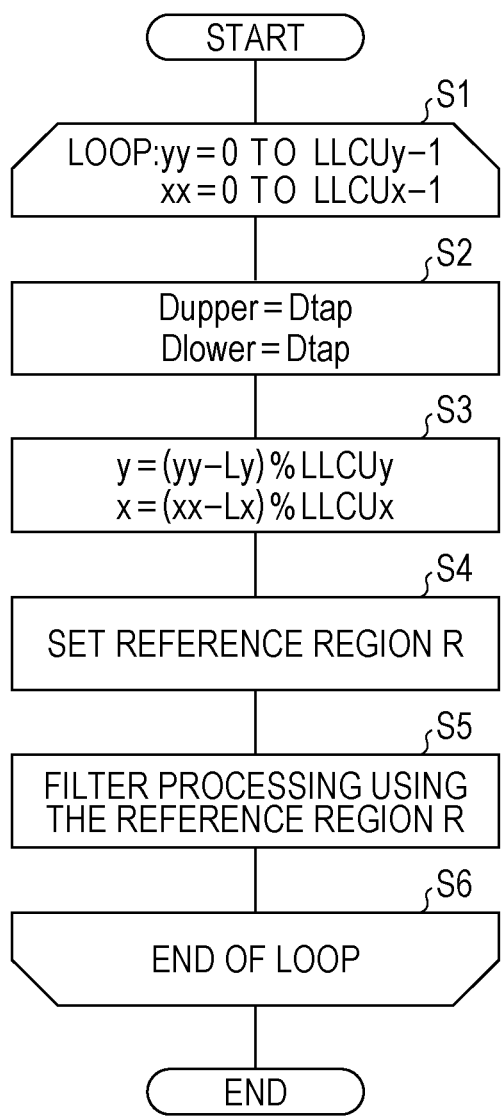
FIG. 7 is a flowchart illustrating a flow of processing for generating a decoded image subjected to adaptive filtering by the adaptive filter according to the first embodiment of the present invention.
Figure 8:
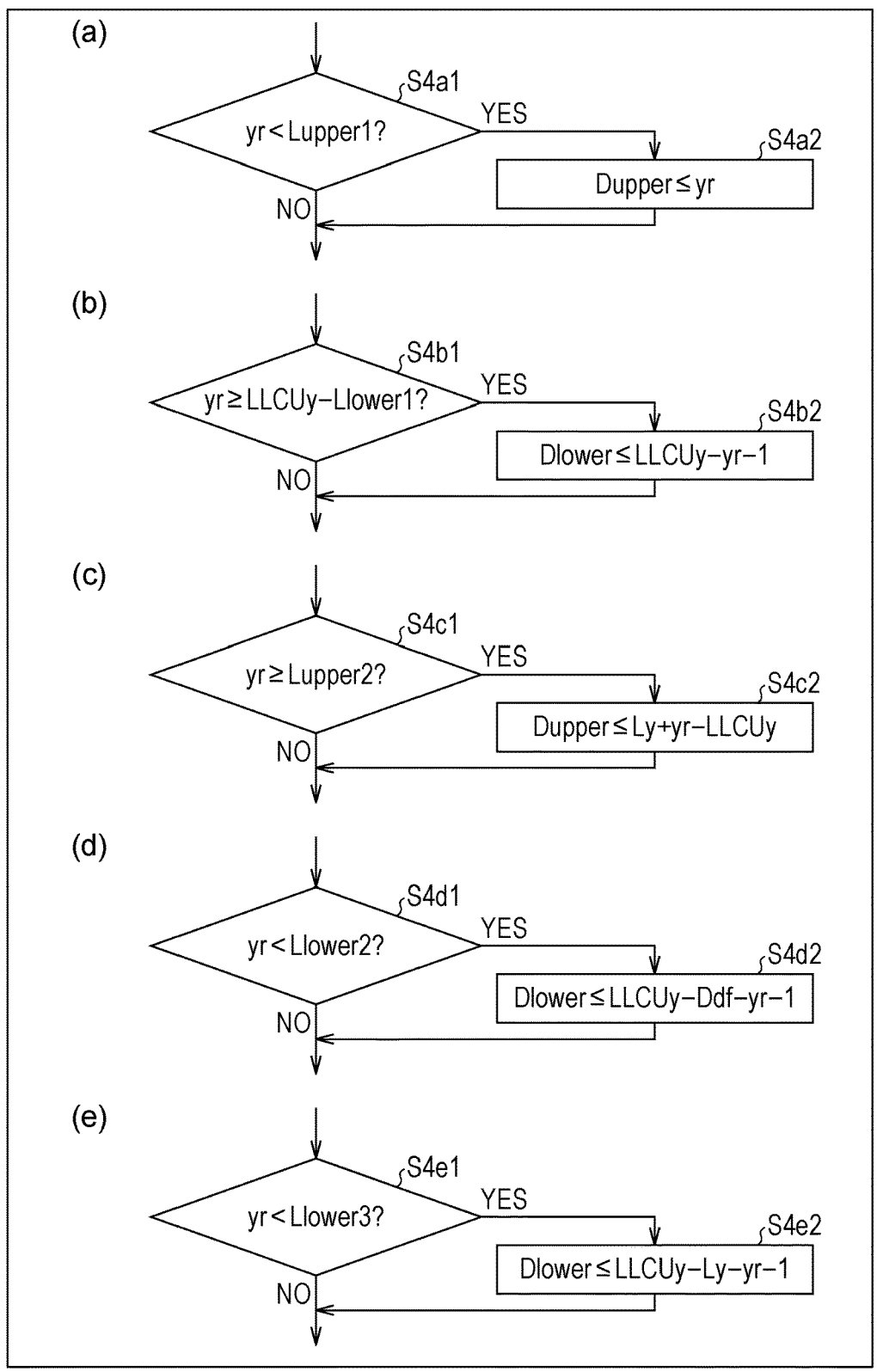
FIG. 8 is a diagram for describing processing for setting a reference region by the adaptive filter according to the first embodiment of the present invention, and (a) to (e) are flowcharts illustrating a flow of each setting example.

Hereinafter, generation processing of the adaptive-filtered decoded image P_ALF will be described with reference to FIG. 7 to FIG. 9. FIG. 7 is a flowchart illustrating a flow of the generation processing of the adaptive-filtered decoded image P_ALF by the adaptive filter 162.

(Step S1)

The adaptive filter 162 initializes any of values of loop variables xx and yy to 0 using the target pixel setting unit 162a, and starts first loop processing wherein an increment value of the loop variable xx which satisfies 0≤xx≤LLCUx−1 is set to 1, and second loop processing wherein an increment value of the loop variable yy which satisfies 0≤yy≤LLCUy−1 is set to 1. Here, (xx, yy) represents coordinates within the ALFU of the target pixel. Also, the LLCUx and LLCUy represent the length in the horizontal direction of the target LCU and the length in the vertical direction of the target LCU, respectively.

(Step S2)

Next, the adaptive filter 162 set the upward reference range Dupper and downward reference range Dlower to Dupper=Dtap Dlower=Dtap with reference to tap count information included in the filter parameters FP using the reference region setting unit 162b.

Now, a specific value of the Dtap is determined according to the number of taps that the tap count information indicates. For example, when the number of taps that the tap count information indicates is five taps, Dtap=2, when the number of taps that the tap count information indicates is seven taps, Dtap=3, and when the number of taps that the tap count information indicates is nine taps, Dtap=4. In general, when the number of taps that the tap count information indicates is N taps, Dtap=(Ntap−1)/2.

(Step S3)

Next, the adaptive filter 162 converts the coordinates of the target pixel from the coordinates within the ALFU to the normalized coordinates within the LCU at the reference region setting unit 162b. Specifically, the normalized coordinates (xr, yr) within the LCU of the target pixel is calculated from the coordinates (xx, yy) within the ALFU of this target pixel as follows.

yr=(yy−Ly)% LLCUy xr=(xx−Lx)% LLCUx (Step S4)

Next, the adaptive filter 162 sets the reference region R according to the values of (xr, yr) using the reference region setting unit 162b.

(Step S5)

Next, the adaptive filter 162 calculates the pixel value of the target pixel with reference to each pixel value of the deblocked decoded image P_DB in the reference region R set in step S1004 using the filter processing unit 162c.

(Step S6)

This step is termination of the first loop and second loop.

The above is the flow of the generation processing of the adaptive-filtered decoded image P_ALF in the target LCU. Here, the reference region R in step S4 is set so as to satisfy at least one restraint of the restraints A to E. Hereinafter, a setting example of the reference region R in step S4 will be described with reference to FIG. 8 and FIG. 9.

Setting Example 1

The reference region setting unit 162b sets the reference region R so as to satisfy the restraint A. Specifically, the reference region setting unit 162b performs, in the above-mentioned step S4, processing illustrated in (a) in FIG. 8, that is, discriminant processing regarding whether or not the normalized Y coordinate yr within the LCU is less than a predetermined threshold Lupper1 (step S4a1), and in the event that the normalized Y coordinate yr within the LCU is less than the predetermined threshold Lupper1, performs processing for setting the reference region R so that the upward reference range Dupper satisfies Dupper≤yr (step S4a2).

The reference region setting unit 162b performs the processing of the present example, and accordingly, the filter processing unit 162c generates the adaptive-filtered decoded image P_ALF without referencing the pixel value on the upper side of the filter processing unit ALFU. Accordingly, the amount of data to be transferred from the frame memory 15 to the internal memory 163, and the amount of data to be transferred from the internal memory 163 to the filter processing unit 162c are reduced.

Note that the processing of the present example may suitably be applied even when the loop filter 16 performs any of the above-mentioned processing example 1 and processing example 2.

Figure 9:
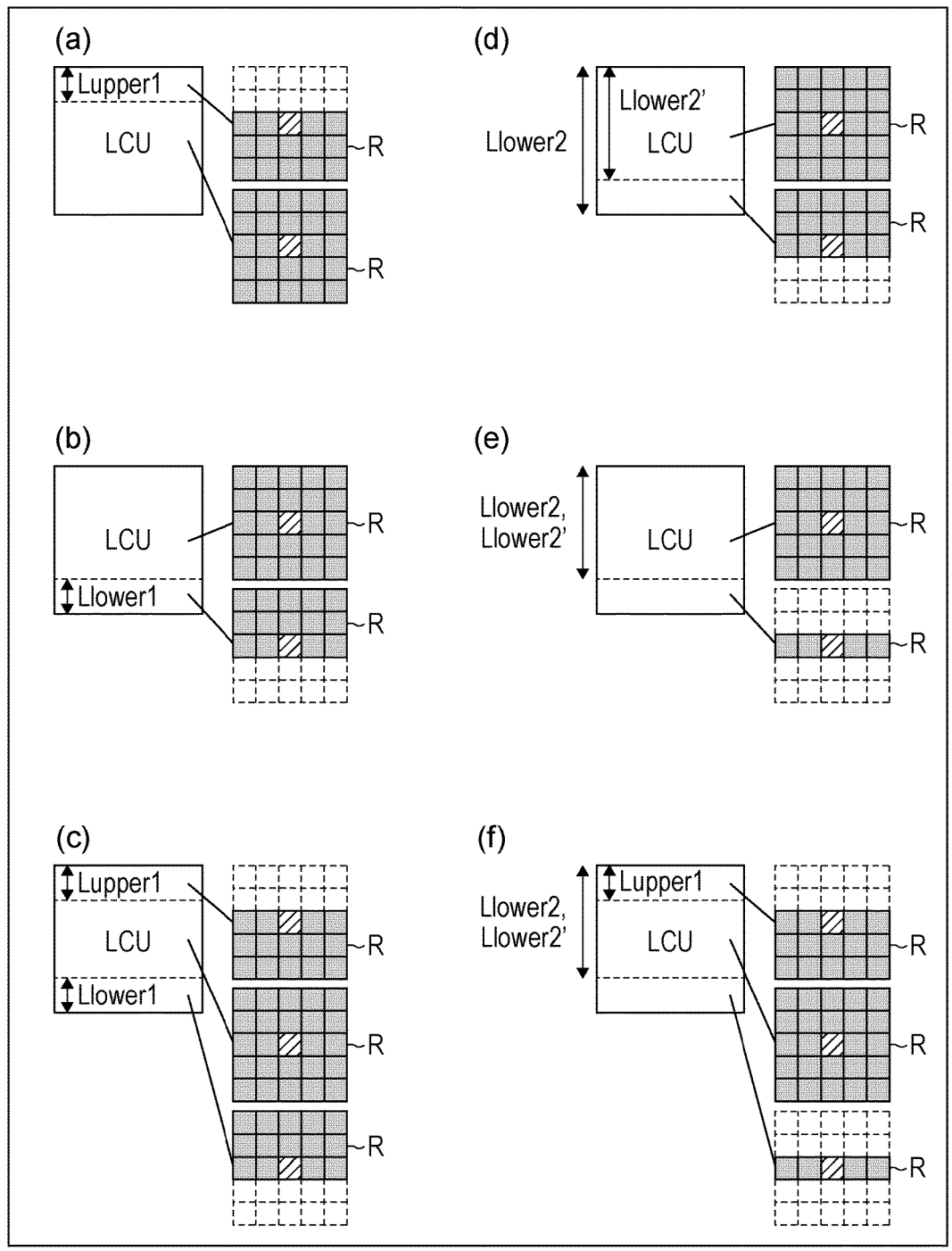
FIG. 9 is a diagram exemplifying a reference region to be set by the adaptive filter according to the first embodiment of the present invention.

(a) in FIG. 9 is a diagram illustrating an example of the reference region R set by the reference region setting unit 162*b* which performs the processing of the present example, with regard to the target LCU. (a) in FIG. 9 illustrates a case where when the normalized Y coordinate yr within the LCU of the target pixel is less than the threshold Lupper1, the upward reference range Dupper is set to 0.

Setting Example 2

The reference region setting unit 162*b* sets the reference region R so as to satisfy the constraint B. Specifically, the reference region setting unit 162*b* performs, in the above-mentioned step S4, processing illustrated in (b) in FIG. 8, that is, discriminant processing regarding whether or not the normalized Y coordinate yr within the LCU is equal to or greater than a predetermined threshold LLCUy−Llower1 (step S4*b*1), and in the event that the normalized Y coordinate yr within the LCU is equal to or greater than a predetermined threshold LLCUy−Llower1, performs processing for setting the reference region R so that the downward reference range Dlower satisfies Dlower≤LLCUy−yr−1 (step S4*b*2).

The reference region setting unit 162*b* performs the processing of the present example, and accordingly, the filter processing unit 162*c* generates the adaptive-filtered decoded image P_ALF without referencing the pixel value on the lower side of the filter processing unit ALFU. Accordingly, the amount of data to be transferred from the frame memory 15 to the internal memory 163, and the amount of data to be transferred from the internal memory 163 to the filter processing unit 162*c* are reduced. Also, the filter processing unit 162*c* can perform filter processing without awaiting until decoding of the LCU on the lower side of the target LCU is completed, and accordingly, processing time is reduced.

Note that the processing of the present example may suitably be applied even when the loop filter 16 performs any of the above-mentioned processing example 1 and processing example 2.

(b) in FIG. 9 is a diagram illustrating an example of the reference region R set by the reference region setting unit 162*b* which performs the processing of the present example, with regard to the target LCU. (b) in FIG. 9 illustrates a case where when the normalized Y coordinate yr within the LCU of the target pixel is equal to or greater than the threshold LLCUy−Llower1, the downward reference range Dlower is set to 0.

Setting Example 3

The reference region setting unit 162*b* sets the reference region R so as to satisfy both of the constraint A and constraint B. Specifically, the reference region setting unit 162*b* performs, in the above-mentioned step S4, both of the processing illustrated in (a) in FIG. 8 (step S4*a*1, step S4*a*2) and the processing illustrated in (b) in FIG. 8 (step S4*b*1, step S4*b*2).

The reference region setting unit 162*b* performs the processing of the present example, and accordingly, the filter processing unit 162*c* generates the adaptive-filtered decoded image P_ALF without referencing the pixel value on the upper side and the pixel value on the lower side of the filter processing unit ALFU. Accordingly, the amount of data to be transferred from the frame memory 15 to the internal memory 163, and the amount of data to be transferred from the internal memory 163 to the filter processing unit 162*c* are reduced. Also, the filter processing unit 162*c* can perform filter processing without awaiting until decoding of the LCU on the lower side of the target LCU is completed, and accordingly, processing time is reduced.

Note that the processing of the present example may suitably be applied even when the loop filter 16 performs any of the above-mentioned processing example 1 and processing example 2.

(c) in FIG. 9 is a diagram illustrating an example of the reference region R set by the reference region setting unit 162*b* which performs the processing of the present example, with regard to the target LCU. (c) in FIG. 9 illustrates a case where when the normalized Y coordinate yr within the LCU of the target pixel is less than a threshold Lupper1, the upward reference range Dupper is set to 0, and when the normalized Y coordinate yr within the LCU of the target pixel is equal to or greater than a threshold LLCUy−Llower1, the downward reference range Dlower is set to 0.

Setting Example 4

The reference region setting unit 162*b* sets the reference region R so as to satisfy the constraint D. Specifically, the reference region setting unit 162*b* performs, in the above-mentioned step S4, processing illustrated in (d) in FIG. 8, that is, discriminant processing regarding whether or not the normalized Y coordinate yr within the LCU is less than a predetermined threshold Llower2 (step S4*d*1), and in the event that the normalized Y coordinate yr within the LCU is less than the predetermined threshold Llower2, performs processing for setting the reference region R so that the downward reference range Dlower satisfies Dlower≤LLCUy−Ddf−yr−1 (step S4*d*2). Here, it is desirable that the threshold Llower2 satisfies Llower2=LLCUy−Ly (this will be applied to the following).

Note that, with the present example, the reference region setting unit 162*b* may be of a configuration so as to discriminate, in step S4*d*1, whether or not the normalized Y coordinate yr within the LCU is equal to or greater than a predetermined threshold Llower2', and also less than a predetermined threshold Llower2, and in the event that the normalized Y coordinate yr within the LCU is equal to or greater than a predetermined threshold Llower2', and also less than a predetermined threshold Llower2, in step S4*d*2 set the reference region R so that the downward reference range Dlower satisfies Dlower≤LLCUy−Ddf−yr−1. Here, it is desirable that the threshold Llower2' satisfies Llower2'=LLCUy−Ly−Dtap.

The processing of the present example can suitably be applied in the event that the loop filter 16 performs the processing in the above-mentioned processing example 2. Accordingly, the reference region setting unit 162*b* performs the processing of the present example, and accordingly, it is sufficient that the loop filter 16 performs transfer of data from the frame memory 15 to the internal memory 163 once regarding each LCU (step S202), and accordingly, the amount of data to be transferred from the frame memory 15 to the internal memory 163 can be reduced. Also, the filter processing unit 162*c* can perform filter processing without awaiting until deblocking regarding the lower edge of the target LCU is completed, and accordingly, the processing time is reduced.

(d) in FIG. 9 is a diagram illustrating an example of the reference region R set by the reference region setting unit 162*b* which performs the processing of the present example, with regard to the target LCU. (d) in FIG. 9 illustrates a case where when the normalized Y coordinate yr within the LCU of the target pixel is equal to or greater than a threshold Llower2', and also less than the threshold Llower2, the downward reference range Dlower is set to 0.

Setting Example 5

The reference region setting unit 162*b* sets the reference region R so as to satisfy both of the constraint C and constraint D. Specifically, the reference region setting unit 162*b* performs, in the above-mentioned step S4, the processing illustrated in (c) in FIG. 8, that is, discriminant processing regarding whether or not the normalized Y coordinate yr within the LCU is equal to or greater than a predetermined threshold Lupper2 (equal to or lower than the virtual boundary line VBLine) (step S4*c*1), and in the event that the normalized Y coordinate yr within the LCU is equal to or greater than a predetermined threshold Lupper2 (in the event of being positioned equal to or lower than the virtual boundary line VBLine), performs processing for setting the reference region R so that the upward reference range Dupper satisfies Dupper≤Ly+yr−LLCUy (step S4*c*2). In this case, a pixel alone of the Y coordinate is equal to or lower than the virtual boundary line VBLine is referenced. Here, it is desirable that the threshold Lupper2 satisfies Lupper2=LLCUy−Ly. Also, the reference region setting 162*b* also performs the processing illustrated in (d) in FIG. 8 (step S4*d*1, step S4*d*2). The above-mentioned discriminant processing may be expressed as dist2VB≥0 by using difference between the virtual boundary line VBLine and the normalized Y coordinate yr within the LCU dist2VB=(y coordinate % LcuHeight)−VBLine.

Note that, with the present example, the reference region setting unit 162*b* may be configured so as to discriminate, in step S4*c*1, whether or not the normalized Y coordinate yr within the LCU is equal to or greater than a predetermined threshold Lupper2, and also less than a predetermined threshold Lupper2', and in the event that the normalized Y coordinate yr within the LCU is equal to or greater than the predetermined threshold Lupper2, and also less than a predetermined threshold Lupper2', in step S4*c*2 set the reference region R so that the upward reference range Dupper satisfies Dupper≤Ly+yr−LLCUy. Here, it is desirable that the threshold Lupper2' satisfies Lupper2'=LLCUy−Ly+Dtap.

The processing of the present example can suitably be applied in the event that the loop filter 16 performs the processing in the above-mentioned processing example 2. Accordingly, the reference region setting unit 162*b* performs the processing of the present example, and accordingly, it is sufficient that the loop filter 16 performs transfer of data from the frame memory 15 to the internal memory 163 once regarding each LCU (step S202), and accordingly, the amount of data to be transferred from the frame memory 15 to the internal memory 163 can be reduced. Also, the filter processing unit 162*c* generates the adaptive-filtered decoded image P_ALF without referencing a pixel value on the upper side of the filter processing unit ALFU. Accordingly, the amount of data to be transferred from the frame memory 15 to the internal memory 163, and the amount of data to be transferred from the internal memory 163 to the filter processing unit 162*c* are reduced. Also, the filter processing unit 162*c* can perform filter processing without awaiting until deblocking regarding the lower edge of the target LCU is completed, and accordingly, processing time is reduced.

(e) in FIG. 9 is a diagram illustrating an example of the reference region R set by the reference region setting unit 162*b* which performs the processing of the present example, with regard to the target LCU. (e) in FIG. 9 illustrates a case where Lupper2=Llower2', but the present embodiment is not restricted to this.

Setting Example 6

The reference region setting unit 162*b* sets the reference region R so as to satisfy all of the constraint A, constraint B, constraint C, and constraint D. Specifically, the reference region setting unit 162*b* performs all of the processing illustrated in (a) to (d) in FIG. 8.

Note that the processing of the present example may suitably be applied even when the loop filter 16 performs any of the above-mentioned processing example 1 and processing example 2.

In the event that the loop filter 16 performs the processing in the above-mentioned processing example 2, the reference region setting unit 162*b* performs the processing of the present example, and accordingly, it is sufficient that the loop filter 16 performs transfer of data from the frame memory 15 to the internal memory 163 once regarding each LCU (step S202), and accordingly, the amount of data to be transferred from the frame memory 15 to the internal memory 163 can be reduced. Also, the filter processing unit 162*c* can perform filter processing without awaiting until deblocking regarding the lower edge of the target LCU is completed, and accordingly, the processing time is reduced.

Also, even when the loop filter 16 performs any processing of the above-mentioned processing example 1 and processing example 2, the reference region setting unit 162*b* performs the processing of the present example, and accordingly, the filter processing unit 162*c* generates the adaptive-filtered decoded image P_ALF without referencing a pixel value on the upper side of the filter processing unit ALFU. Accordingly, the amount of data to be transferred from the frame memory 15 to the internal memory 163, and the amount of data to be transferred from the internal memory 163 to the filter processing unit 162*c* are reduced.

(f) in FIG. 9 is a diagram illustrating an example of the reference region R set by the reference region setting unit 162*b* which performs the processing of the present example, with regard to the target LCU. (f) in FIG. 9 illustrates a case where Lupper2=Llower2', but the present embodiment is not restricted to this.

Setting Example 7

The reference region setting unit 162*b* sets the reference region R so as to satisfy the constraint E. Specifically, the reference region setting unit 162*b* performs, in the above-mentioned step S4, processing illustrated in (e) in FIG. 8, that is, discriminant processing regarding whether or not the normalized Y coordinate yr within the LCU is less than a predetermined threshold Lupper3 (upper than the virtual boundary line VBLine) (step S4*e*1), and in the event that the normalized Y coordinate yr within the LCU is less than the predetermined threshold Lupper3 (in the event of being positioned upper than the virtual boundary line VBLine), performs processing for setting the reference region R so that the downward reference range Dlower satisfies Dlower≤LLCUy−Ly−yr−1 (step S4*e*2). In this case, a pixel alone of which the Y coordinate is upper than the virtual boundary line VBLine is referenced. Here, it is desirable that the threshold Lupper3 satisfies Lupper3=LLCUy−Ly. The above-mentioned discriminant processing may be expressed as dist2VB<0 by using difference between the virtual boundary line VBLine and the normalized Y coordinate yr within the LCU dist2VB=(y coordinate % LcuHeight)−VBLine.
(More Detailed Description Regarding Constraint Imposed on Reference Region)

Hereinafter, the above-mentioned restraints A to E, and other expressions other than the constraints A to E will be described in detail step by step.
(Coordinate System)

First, a coordinate system to be used for expressing the constraints A to E will be described. Note that, with the following description, the first filter processing unit ALFU1 and second filter processing unit ALFU2 are collectively named as "filter processing unit ALFU".

Figure 10:
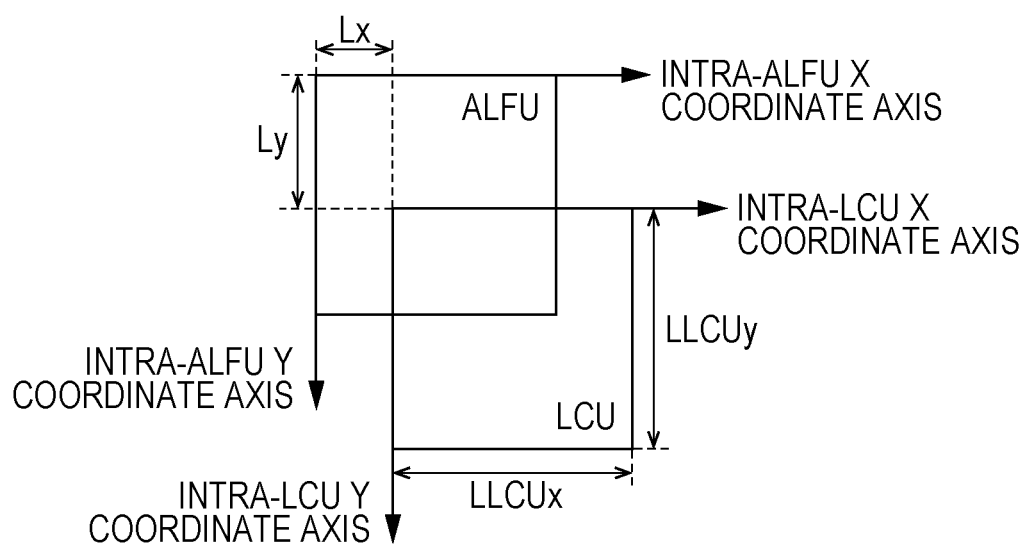
FIG. 10 is a diagram for describing processing by the adaptive filter according to the first embodiment of the present invention, and is a diagram illustrating a position relation between a target LCU and a filter processing unit ALFU corresponding to the target LCU.

FIG. 10 is a diagram illustrating a position relation between the target LCU and the filter processing unit ALFU corresponding to the target LCU. As illustrated in FIG. 10, the coordinates of each pixel in the LCU are expressed as (x, y) using an X coordinate x and a Y coordinate y within the LCU with an upper left pixel within the LCU as the origin. Also, the coordinates of each pixel in the ALFU are expressed as (xx, yy) using an X coordinate xx and a Y coordinate yy within the ALFU with an upper left pixel within the ALFU as the origin. Note that the coordinates (x, y) within the LCU and coordinates (xx, yy) within the ALFU are expressed with a pixel as a unit and with the downstream direction of raster scan as a positive.

As illustrated in FIG. 10, the ALFU is set to a location shifted by Ly on the upstream side of raster scan along the Y axis and by Lx on the upstream side of raster scan along the X axis as compared to the LCU. Accordingly, a relation between the (x, y) and (xx, yy) is expressed as follows.

$$x = xx - Lx$$

$$y = yy - Ly$$

Also, the coordinates of each pixel in the LCU may also be expressed by normalized coordinates (xr, yr) within the LCU defined as follows.

$$xr = x \% \text{LLCU}x$$

$$yr = y \% \text{LLCU}y$$

Here, the symbol % represents remainder operation, LLCUx represents length in the x direction of the target LCU, and LLCUy represents length in the y direction of the target LCU. Also, in the event that the loop filter 16 performs the processing of the above-mentioned processing example 1, that is, in the event that the ALFU is ALFU2, Lx=Ly=0 is satisfied.

Figure 11:
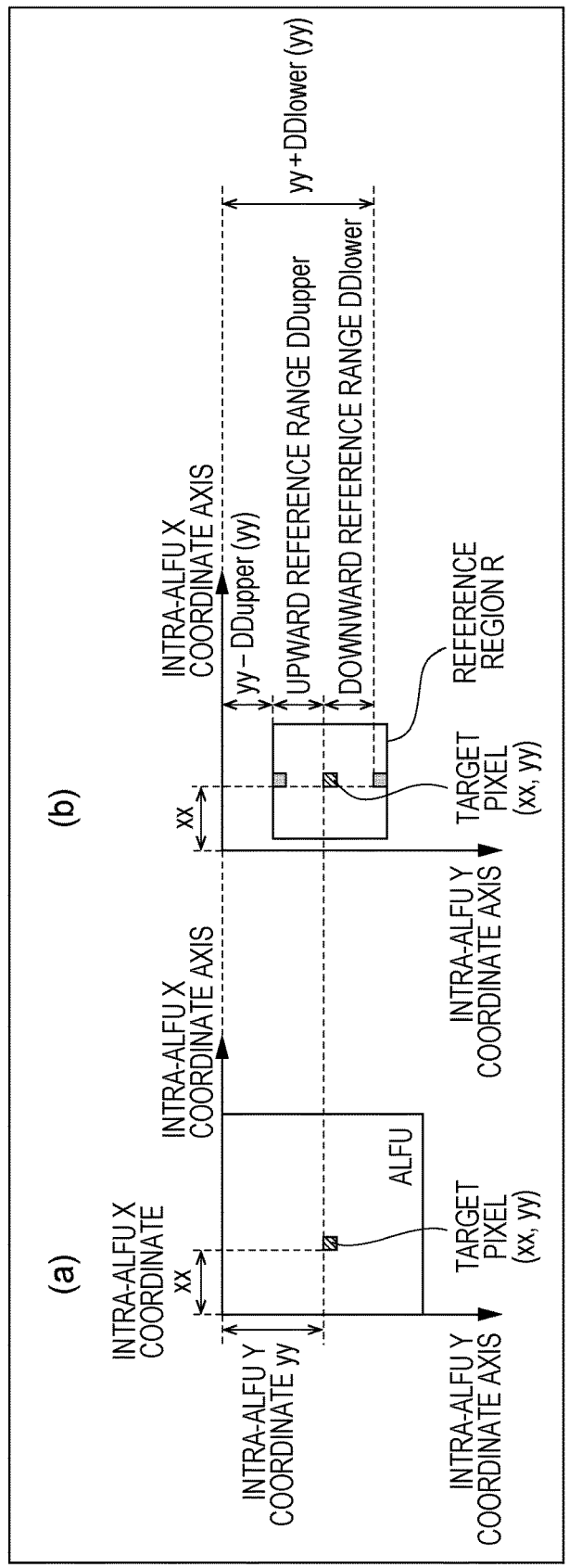
FIG. 11 is a diagram for describing processing by the adaptive filter according to the first embodiment of the present invention, (a) illustrates a target pixel within a filter processing unit ALFU, and (b) illustrates a reference region to be set in the vicinity of a target pixel.

(a) in FIG. 11 is a diagram illustrating a position in the ALFU of the target pixel of which the pixel value is calculated by the adaptive filter 162, and (b) in FIG. 11 is a diagram illustrating the reference region R which is a region made up of a pixel to be referenced by the adaptive filter 162 for calculating the pixel value of the target pixel.

As illustrated in (b) in FIG. 11, the reference region R is set so that distance along the Y axis between the target pixel and a pixel within the reference region R which is a pixel adjacent to the upper edge of the reference region R makes up the upward reference range DDupper, and distance along the Y axis between the target pixel and a pixel within the reference region R which is a pixel adjacent to the lower edge of the reference region R makes up the downward reference range DDlower. Here, specific values of the upward reference range DDupper and downward reference range DDlower are set by the adaptive filter 162 according to the tap count information included in the filter parameters FP and the position of the target pixel. For example, in the event that the tap count information indicates nine taps, a value that the upward reference range DDupper can take is any of 0, 1, 3, and 4. This is also the same as with the downward reference range DDlower.

Note that the upward reference range and downward reference range at the time of coordinates within the ALFU of the target pixel being (xx, yy) are represented as DDupper (yy) and DDlower(yy). Also, the upward reference range and downward reference range at the time of coordinates within the LCU of the target pixel being (x, y) are represented as Dupper(y) and Dlower(y).

(Constraints to be Imposed on Reference Region R by Adaptive Filter 161)

Next, description will be made regarding constraints to be imposed on the upward reference range DDupper and downward reference range DDlower when the adaptive filter 162 sets the reference region R regarding the target pixel. Note that the above-mentioned constraints A to E are restraints which express an upper restraint, a first lower restraint, and a second lower restraint, which will be described below, using normalized coordinates within the LCU. Accordingly, the adaptive filter 162 may also be expressed as a filter configured to set the reference region R by imposing at least one restraint of the upper restraint, first lower restraint, and second lower restraint which will be described below.

(Upper Restraint and First Lower Restraint)

The adaptive filter 162 sets, in the event that the loop filter 161 performs one of the above-mentioned processing example 1 and processing example 2, the reference region R so as to satisfy at least one of the upper restraint and first lower restraint which will be described below.

Upper restraint: The pixel value of a pixel positioned above the ALFU1 is not referenced at the time of calculating the pixel value of the target pixel.

First lower restraint: The pixel value of a pixel positioned below the ALFU1 is not referenced at the time of calculating the pixel value of the target pixel.

The adaptive filter 162 sets the reference region R so as to satisfy at least one of the above-mentioned two restraints, whereby the amount of data to be transferred in the above-mentioned step S106 can be reduced.

Figure 12:
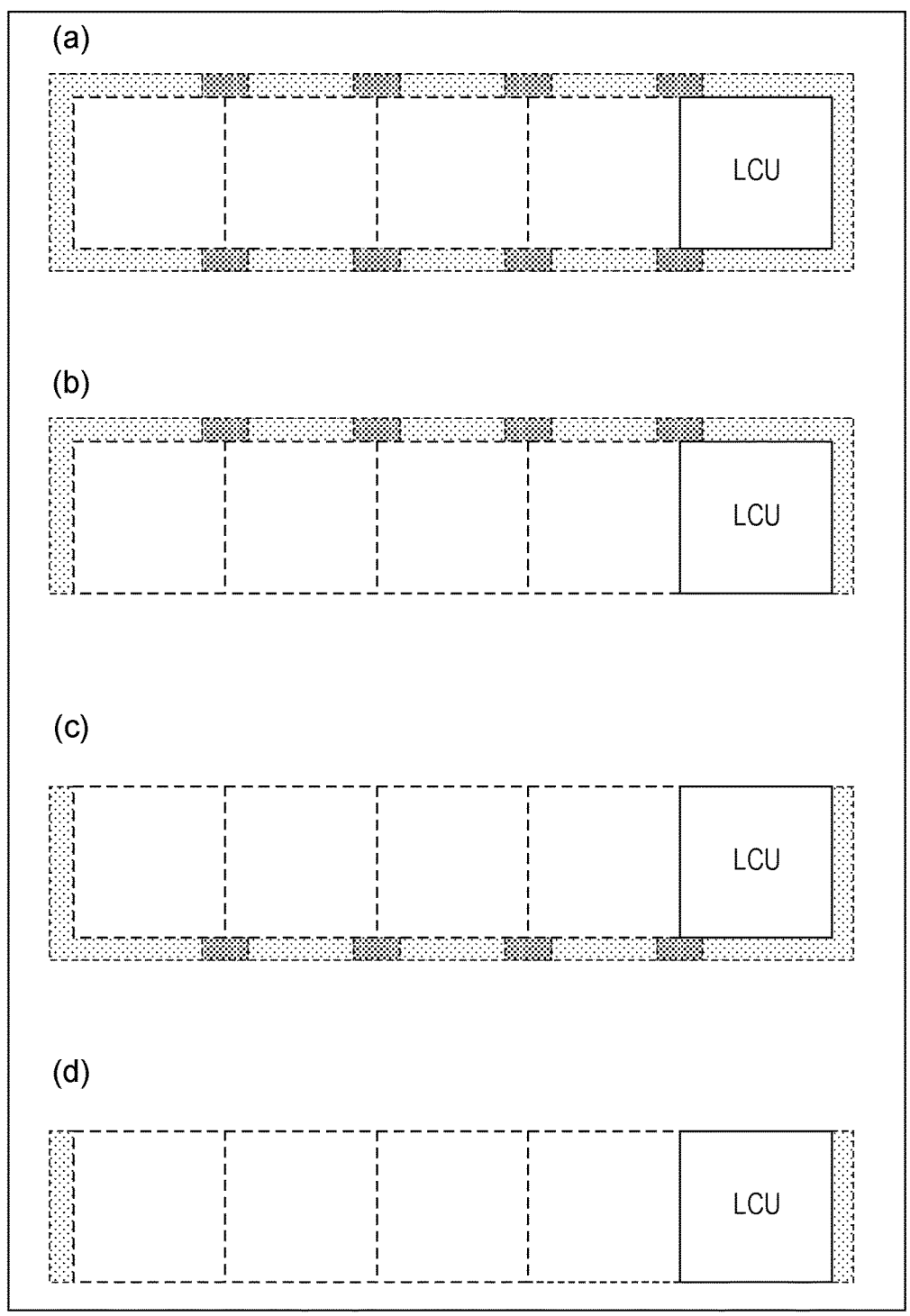
FIG. 12 is a diagram for describing a reduction advantage of the amount of data to be transferred by the adaptive filter according to the first embodiment of the present invention, (a) illustrates a region of a pixel to be transferred at adaptive filter processing according to the related art, and (b) to (d) illustrate a region of a pixel to be transferred in a first processing example according to the present invention.

FIG. 12 is a diagram for describing a reduction effect of the amount of data to be transferred in the case that the adaptive filter 162 which performs the processing of the processing example 1 imposes at least one of the above-mentioned upper restraint and first lower restraint on the reference region R.

(a) in FIG. 12 is a diagram illustrating regions of pixels to be transferred in the adaptive filter processing according to the related art where neither the above-mentioned upper restraint nor the above-mentioned first lower restraint are imposed. As illustrated in (a) in FIG. 12, with the adaptive filter processing according to the related art, there have to be transferred the pixel value of a pixel positioned above the target LCU and the pixel value of a pixel positioned below the target LCU which are pixels in the vicinity of the target LCU.

(b) in FIG. 12 is a diagram illustrating regions of pixels to be transferred in the adaptive filter processing in the event that the adaptive filter 162 imposes the first lower restraint. As illustrated in (b) in FIG. 12, in the event of imposing the first lower restraint, the adaptive filter processing can be performed without transferring the pixel values of pixels positioned below the target LCU.

(c) in FIG. 12 is a diagram illustrating regions of pixels to be transferred in the adaptive filter processing in the event that the adaptive filter 162 imposes the upper restraint. As illustrated in (c) in FIG. 12, in the event of imposing the upper restraint, the adaptive filter processing can be performed without transferring the pixel values of pixels positioned above the target LCU.

(d) in FIG. 12 is a diagram illustrating regions of pixels to be transferred in the adaptive filter processing in the event that the adaptive filter 162 imposes both of the upper restraint and first lower restraint. As illustrated in (d) in FIG. 12, in the event of imposing both of the upper restraint and first lower restraint, the adaptive filter processing can be performed without transferring the pixel values of pixels positioned above and below the target LCU.

(Second Lower Restraint)

The adaptive filter 162 sets, in the event that the loop filter 161 performs the processing illustrated in the above-mentioned processing example 2, the reference region R so as to satisfy a later-described second lower constraint.

Second lower restraint: A region where deblocking in the target LCU has not been completed is not referenced at the time of calculating the pixel value of the target pixel.

The adaptive filter 162 can perform the processing of the processing example 2 without awaiting until deblocking is completed regarding a region where deblocking in the target LCU has not been completed by setting the reference region R so as to satisfy the above-mentioned second lower restraint.

Note that, with the processing example 2 as well, the amount of data to be transferred in the above-mentioned step S202 can be reduced by imposing the above-mentioned upper restraint.

Figure 13:
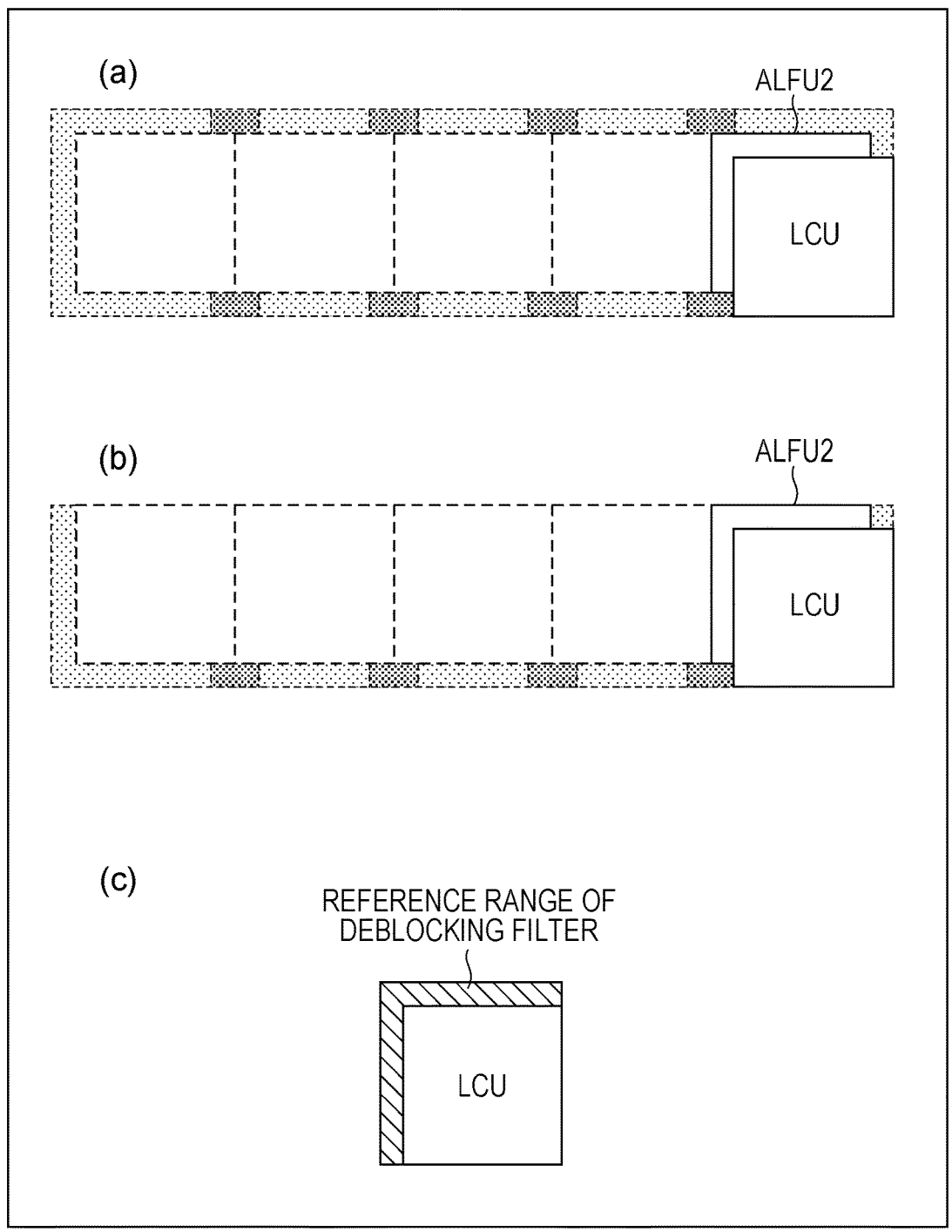
FIG. 13 is a diagram for describing a reduction advantage of the amount of data to be transferred by the adaptive filter according to the first embodiment of the present invention, (a) illustrates a region of a pixel to be transferred at adaptive filter processing according to the related art, and (b) illustrates a region of a pixel to be transferred in a second processing example according to the present invention.

FIG. 13 is a diagram for describing a reduction effect of the amount of data to be transferred in the event that the adaptive filter 162 which performs the processing of the processing example 2 imposes the upper restraint on the reference region R.

(a) in FIG. 13 is a diagram illustrating regions of pixels to be transferred in the adaptive filter processing in the event of imposing neither the upper restraint nor the first lower restraint. Here, as illustrated in (a) in FIG. 13, with the processing example 2, the target LCU and ALFU2 corresponding to the target LCU are set to mutually different positions.

As illustrated in (a) in FIG. 13, in the event that neither the upper restraint nor the first lower restraint are imposed, there have to be transferred the pixel value of a pixel positioned above the target ALFU2 and the pixel value of a pixel positioned below the target ALFU2 which are pixels in the vicinity of the target ALFU2.

(b) in FIG. 13 is a diagram illustrating regions of pixels to be transferred in the adaptive filter processing in the event that the adaptive filter 162 which performs the processing of the processing example 2 imposing the upper restraint. As illustrated in (b) in FIG. 13, in the event of imposing the upper restraint, the adaptive filter processing can be performed without transferring the pixel value of a pixel positioned above the target ALFU2. Note that (c) in FIG. 13 illustrates a reference range of the deblocking filter in the LCU.

(Mathematical Expressions of Upper Restraint, First Lower Restraint, and Second Lower Restraint)

Hereinafter, description will be made regarding mathematical expressions of the upper restraint, first lower restraint, and second lower restraint, with reference to FIG. 14.

Figure 14:
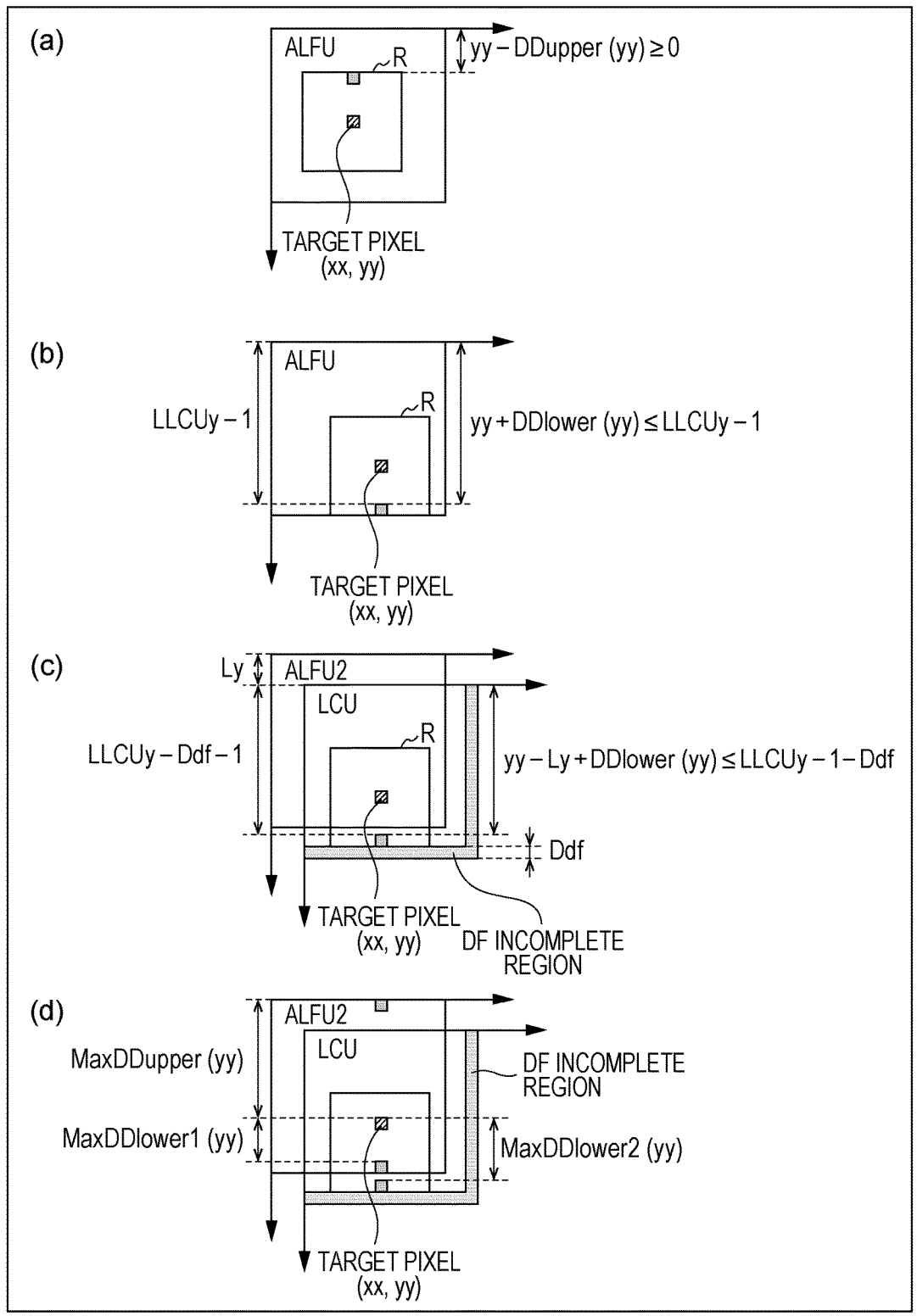
FIG. 14 is a diagram for describing processing by the adaptive filter according to the first embodiment of the present invention, and (a) to (d) are diagrams for describing each constraint to be imposed at the time of setting a reference region.

(a) in FIG. 14 is a diagram for describing restraints to be imposed on the upward reference range DDupper (yy) in the event that the loop filter 161 performs the processing illustrated in the processing example 1. As illustrated in (a) in FIG. 14, in the event that coordinates within the ALFU1 of the target pixel are (xx, yy), the Y coordinate within ALFU1 of the upper edge of the reference region R is expressed as yy−DDupper(yy). The upper restraint can be expressed such that the Y coordinate within the ALFU1 of the upper edge of the reference region R is equal to or greater than 0. Accordingly, the upper restraint can be expressed as follows.

Upper restraint: $DDupper(yy) \leq yy$

Hereinafter, the upper limit value of the DDupper(yy) that satisfies the upper restraint will also be expressed as an upward referable range MaxDDupper(yy). Here, the following relation holds.

$MaxDDupper(yy) = yy$ (b) in FIG. 14 is a diagram for describing restraints to be imposed regarding the downward reference range DDlower (yy) in the event that the loop filter 161 performs the processing illustrated in the processing example 1. As illustrated in (b) in FIG. 14, in the event that coordinates within the ALFU1 of the target pixel are (xx, yy), the Y coordinate within the ALFU1 of the lower edge of the reference region R is expressed as yy+DDlower(yy). The above-mentioned first lower restraint can be expressed such that the Y coordinate within the ALFU1 of the lower edge of the reference region R is equal to or smaller than LLCUy−1. Accordingly, the first lower restraint can be expressed as follows.

First lower restraint: $DDlower(yy) \leq LLCUy - yy - 1$

Hereinafter, the upper limit value of the DDlower(yy) that satisfies the first lower restraint will also be expressed as a first downward referable range MaxDDlower1(yy). Here, the following relation holds.

$MaxDDlower1(yy) = LLCUy - yy - 1$ (c) in FIG. 14 is a diagram for describing restraints to be imposed on the downward reference range DDlower(yy) in the event that the loop filter 161 performs the processing illustrated in the processing example 2. As illustrated in (c) in FIG. 14, in the event that coordinates within the ALFU2 of the target pixel are (xx, yy), the Y coordinate within the LCU of the lower edge of the reference region R is expressed as yy−Ly+DDlower(yy). The above-mentioned second lower restraint can be expressed such that the Y coordinate within the LCU of the lower edge of the reference region R is equal to or smaller than LLCUy−1−Ddf. Here, Ddf represents width in the Y direction of a region where deblocking in the target LCU has not been completed. Accordingly, the second lower restraint can be expressed as follows.

Second lower restraint: $DDlower(yy) \leq LLCUy + Ly - Ddf - yy - 1$

Hereinafter, the upper limit value of the DDlower(yy) that satisfies the second lower restraint may also be expressed as a second downward referable range MaxDDlower2(yy). Here, the following relation holds.

$MaxDDlower2(yy) = LLCUy + Ly - Ddf - yy - 1$ (d) in FIG. 14 illustrates MaxDDupper(yy), MaxDDlower1(yy), and MaxDDlower2(yy) in the event that coordinates within the ALFU2 of the target pixel are (xx, YY).

Note that the upward referable range MaxDDupper, first downward referable range MaxDDlower1, and second downward referable range MaxDDlower2 will collectively be referred to as a referable range.

FIG. 15 is a table illustrating a specific example of the Y coordinate within the ALFU, Y coordinate within the LCU, normalized Y coordinate within the LCU, upward referable range MaxDDupper, first downward referable range MaxDDlower1, and second downward referable range MaxDDlower2. As illustrated in FIG. 15, the referable range depends on Ly that represents positional deviation between the target LCU and the target ALFU. Here, the virtual boundary line VBLine (=LcuHeight−Ly) can be defined from the Ly that represents positional deviation between the target LCU and the target ALFU. With the table in FIG. 15, the virtual boundary line VBLine is equivalent to a case where normalized Y coordinate yr within the LCU is (0−Ly) % LLCU. In FIG. 15, in the event that the normalized Y coordinate yr within the LCU is equal to or smaller than the virtual boundary line VBLine, the upward referable range MaxDDupper is specifically, with (0−Ly) % LLCU, (1−Ly) % LLCU, (2−Ly) % LLCU, and (3−Ly) % LLCU, restricted to 0, 1, 2, and 3. This is equivalent to a case where difference between the virtual boundary line VBLine and the normalized Y coordinate yr within the LCU dist2VB=(y coordinate % LcuHeight)−VBLine is 0, 1, 2, and 3. The restraint of this reference region R is as already described in the restraint C.

Also, in the event that the normalized Y coordinate yr within the LCU is less than the virtual boundary line VBLine, the first downward referable range MaxDDlower1 is specifically, with (LLCU−1−Ly) % LLCUy, (LLCU−2−Ly) % LLCUy, (LLCU−3−Ly) % LLCUy, and (LLCU−4−Ly) % LLCUy, restricted to 0, 1, 2, and 3. This is equivalent to a case where difference between the virtual boundary line VBLine and the normalized Y coordinate yr within the LCU dist2VB is −1, −2, −3, and −4. The restraint of this reference region R is as already described in the restraint E.

(Of Referable Range, Expressions Using Coordinates within LCU)

Hereinafter, of the referable range, expressions using coordinates within the LCU will be described. With the first filter processing unit ALFU1, a relation between the Y coordinate yy within the ALFU1 and the Y coordinate y within the LCU is given by $$y=yy$$

and accordingly, if we express the upward referable range and first downward referable range as MaxDupper_1(y) and MaxDlower1_1(y) respectively in the event that the Y coordinate within the LCU of the target pixel is y, the following holds.

$$\text{Max}Dupper\_1(y)=y \quad (A)$$

$$\text{Max}Dlower1\_1(y)=LLCUy-y-1 \quad (B)$$

On the other hand, with the second filter processing unit ALFU2, relations between the Y coordinate yy within the ALFU2 and the Y coordinate y within the LCU are given by the following.

$$y=yy+LLCUy-Ly(0 \leq yy \leq Ly-1)$$

$$y=yy-Ly(Ly \leq yy \leq LLCUy-1)$$

These relations can also be expressed as follows.

$$yy=y+Ly(0 \leq y \leq LLCUy-Ly-1)$$

$$yy=y+Ly-LLCUy(LLCUy-Ly \leq y \leq LLCUy-1)$$

Accordingly, if we express the upward referable range, first downward referable range, and second downward referable range as MaxDupper_2(y), MaxDlower1_2(y) and MaxDlower2_2(y) respectively in the event that the Y coordinate within the LCU of the target pixel is y,

[Mathematical Expression 2]

$$\text{MaxDupper\_2}(y) = \begin{cases} y+L_y & (0 \leq y \leq LLCU_y - L_y - 1) \\ y+L_y - LLCU_y & (LLCU_y - L_y \leq y \leq LLCU_y - 1) \end{cases} \quad (C)$$

[Mathematical Expression 3]

$$\text{MaxDlower2\_2}(y) = \begin{cases} LLCU_y - Ddf - y - 1 & (0 \leq y \leq LLCU_y - L_y - 1) \\ 2 \times LLCU_y - Ddf - y - 1 & (LLCU_y - L_y \leq y \leq LLCU_y - 1) \end{cases} \quad (D)$$

[Mathematical Expression 4]

$$\text{MaxDlower1\_2}(y) = \begin{cases} LLCU_y - L_y - y - 1 & (0 \leq y \leq LLCU_y - L_y - 1) \\ 2 \times LLCU_y - L_y - y - 1 & (LLCU_y - L_y \leq y \leq LLCU_y - 1) \end{cases} \quad (E)$$

hold.

The mathematical expressions (A), (B), (C), (D), and (E) correspond to the above-mentioned restraint A, restraint B, restraint C, restraint D, and restraint E, respectively. The restraint A and restraint C correspond to the upper restraint regarding the first filter processing unit ALFU1, and the second filter processing unit ALFU2, the restraint B and restraint E correspond to the first lower condition regarding the first filter processing unit ALFU1, and the second filter processing unit ALFU2, and the restraint D corresponds to the second lower condition regarding the second filter processing unit ALFU2.

Now, let us say that the virtual boundary line VBLine is LLCUy−Ly(=LcuHeight−Ly), the mathematical expression (C) corresponding to the restraint C means, in the event that y that indicates the Y coordinate within the LCU is positioned equal to or lower than the virtual boundary line VBLine, that is, in the event of (LLCUy−Ly≤y≤LLCUy−1), to restrict the upward reference range MaxDupper_2(y) to difference between the Y coordinate within the LCU and virtual boundary line (=y+Ly−LLCUy). The difference between the Y coordinate within the LCU and virtual boundary line (=y+Ly−LLCUy) is equivalent to already described dist2VB=(y coordinate % LcuHeight)−VBLine. When the number of taps is nine taps, that is, in the event that the upward reference range when there is no restraint is 4, in the case that the upward reference range MaxDupper_2 (y) is less than 4, the upward reference range is restricted. That is to say, the upward reference range is restricted in the event that difference between the Y coordinate within the LCU and the virtual boundary line dist2VB is 0, 1, 2, or 3. When the number of taps is seven taps (the upward reference range at the time of no restraint is three), in the event that the difference between the Y coordinate within the LCU and the virtual boundary line dist2VB is 0, 1, 2, or 3, the upward reference range is restricted. When the number of taps is five taps (the upward reference range at the time of no restraint is two), in the event that the difference between the Y coordinate within the LCU and the virtual boundary line dist2VB is 0 or 1, the upward reference range is restricted.

The mathematical expression (E) corresponding to the restraint E means, in the event that y that indicates the Y coordinate within the LCU is positioned above the virtual boundary line VBLine (=LcuHeight−Ly), that is, in the event of (0≤y≤LLCUy−1), to restrict the downward reference range MaxDlower2_2(y) to difference between the Y coordinate within the LCU and virtual boundary line (=VBLine−y)−1. The difference between the Y coordinate within the LCU and virtual boundary line (=VBLine−y) is equivalent to a value obtained by inverting the sign of already described dist2VB=(y coordinate % LcuHeight)−VBLine. When the number of taps is nine taps, that is, in the event that the upward reference range when there is no restraint is 4, in the case that the −dist2VB−1 becomes less than 4, the downward reference range is restricted. That is to say, the downward reference range is restricted in the event that difference between the Y coordinate within the LCU and the virtual boundary line dist2VB is −1, −2, −3, or −4. When the number of taps is seven taps (the downward reference range at the time of no restraint is three), in the event that the difference between the Y coordinate within the LCU and the virtual boundary line dist2VB is −1, −2, or −3, the downward reference range is restricted. When the number of taps is five taps (the downward reference range at the time of no restraint is two), in the event that the difference between the Y coordinate within the LCU and the virtual boundary line dist2VB is −1 or −2, the downward reference range is restricted.

(Restraint A)

The mathematical expression (A) is satisfied in the event that the loop filter 16 performs any processing of the processing example 1 and processing example 2, and when the Y coordinate within the LCU of the target pixel is less than a predetermined threshold, by restricting the upward reference range Dupper(y) to equal to or smaller than the Y coordinate within the LCU of the target pixel. In the event of performing any processing of the processing example 1 and processing example 2, the loop filter 16 sets the reference region R so as to satisfy the following restraint A.

Restraint A: The upward reference range Dupper(y) is set to the number of pixels equal to smaller than the Y coordinate within the LCU of the target pixel in the event that the Y coordinate within the LCU of the target pixel is less than a predetermined threshold Lupper1.

Here, as the predetermined threshold Lupper1, a fixed value such as 4 or 8 or the like may be employed, or a variable value may be employed (this will be applied to the following). Also, the upward reference range Dupper (y) in the event that the Y coordinate within the LCU of the target pixel is less than the predetermined threshold Lupper1 may be set so as to depend on the Y coordinate within the LCU of the target pixel, or may be set to, for example, 0 without depending on the Y coordinate within the LCU of the target pixel.

(Restraint B)

The mathematical expression (B) is satisfied in the event that the loop filter 16 performs any processing of the processing example 1 and processing example 2, and when the Y coordinate within the LCU of the target pixel is equal to or greater than a predetermined threshold, by restricting the downward reference range Dlower(y) to equal to or smaller than a value obtained by subtracting the Y coordinate within the LCU of the target pixel from the LLCUy and adding one thereto. In the event of performing any processing of the processing example 1 and processing example 2, the loop filter 16 sets the reference region R so as to satisfy the following restraint B.

Restraint B: The downward reference range Dlower(y) is set to the number of pixels equal to or smaller than LLCUy−(Y coordinate within the LCU of the target pixel) in the event that the Y coordinate within the LCU of the target pixel is equal to or greater than a predetermined threshold LLCUy−Lupper1.

Here, the downward reference range Dlower(y) in the event that the Y coordinate within the LCU of the target pixel is equal to or greater than the predetermined threshold LLCUy−Lupper1 may be set so as to depend on the Y coordinate within the LCU of the target pixel, or may be set to, for example, 0 without depending on the Y coordinate within the LCU of the target pixel.

(Restraint C)

The mathematical expression (C) is satisfied in the event that the loop filter 16 performs the processing of the processing example 2, and when the normalized Y coordinate within the LCU of the target pixel is equal to or greater than a predetermined threshold, by restricting the upward reference range Dupper(y) to equal to or smaller than Ly+(Y coordinate within the LCU of the target pixel)−LLCUy. In the event of performing the processing of the processing example 2, the loop filter 16 sets the reference region R so as to satisfy the following restraint C.

Restraint C: The upward reference range Dupper(y) is set to the number of pixels equal to or smaller than Ly+(normalized Y coordinate within the LCU of the target pixel)−LLCUy in the event that the normalized Y coordinate within the LCU of the target pixel is equal to or greater than a predetermined threshold Lupper2.

Here, the predetermined threshold Lupper2 has to be a value equal to or smaller than LLCUy−Ly (this will be applied to the following). Also, the upward reference range Dupper(y) in the event that the normalized Y coordinate within the LCU of the target pixel is equal to or greater than the predetermined threshold Lupper2 may be set so as to depend on the Y coordinate within the LCU of the target pixel, or may be set to, for example, 0 without depending on the Y coordinate within the LCU of the target pixel.

(Restraint D)

The mathematical expression (D) is satisfied in the event that the loop filter 16 performs the processing of the processing example 2, and when the normalized Y coordinate within the LCU of the target pixel is less than a predetermined threshold, by restricting the downward reference range Dlower(y) to equal to or smaller than LLCUy−Ddf−(normalized Y coordinate within the LCU of the target pixel)−1. In the event of performing the processing of the processing example 2, the loop filter 16 sets the reference region R so as to satisfy the following restraint D.

Restraint D: The downward reference range Dlower(y) is set to the number of pixels equal to or smaller than LLCUy−Ddf−(normalized Y coordinate within the LCU of the target pixel)−1 in the event that the normalized Y coordinate within the LCU of the target pixel is less than a predetermined threshold Llower2.

Here, the downward reference range Dlower(y) in the event that the normalized Y coordinate within the LCU of the target pixel is less than the predetermined threshold Llower2 may be set so as to depend on the Y coordinate within the LCU of the target pixel, or may be set to, for example, 0 without depending on the Y coordinate within the LCU of the target pixel. Also, the threshold Llower2 has to be a value equal to or greater than LLCUy−Ly.

(Restraint E)

The mathematical expression (E) is satisfied in the event that the loop filter 16 performs the processing of the processing example 2, and when the normalized Y coordinate within the LCU of the target pixel is less than a predetermined threshold, by restricting the downward reference range Dlower(y) to equal to or smaller than LLCUy–Ly–(normalized Y coordinate within the LCU of the target pixel)–1. In the event of performing the processing of the processing example 2, the loop filter 16 sets the reference region R so as to satisfy the following restraint E.

Restraint E: The downward reference range Dlower(y) is set to the number of pixels equal to or smaller than LLCUy–Ly–(normalized Y coordinate within the LCU of the target pixel)–1 in the event that the normalized Y coordinate within the LCU of the target pixel is less than a predetermined threshold Llower3.

Here, the threshold Llower3 has to be a value equal to or greater than LLCUy–Ly.

(Specific Example of Referable Range)

FIG. 16 illustrates a specific example of the Y coordinate y within the LCU in the event that LLCUy=32 and Ly=0, the upward referable range MaxDupper_1(y), and first downward referable range MaxDlower1_1(y). As illustrated in FIG. 16, the smaller the Y coordinate within the LCU, the smaller the upward referable range MaxDupper_1(y). Also, the greater the Y coordinate within the LCU, the smaller the first downward referable range MaxDlower1_1(y).

As an example, let us consider a case where the number of taps that the tap count information included in the filter parameters FP is seven. In this case, when there is no restraint, the upward referable range and downward referable range in the reference region R are both three pixels. Accordingly, in the event that the upward referable range MaxDupper_1(y) goes into equal to or smaller than three pixels (in the event that the Y coordinate within the LCU is less than four), the upward reference range is restricted by the above-mentioned restraint A, whereby filter processing can be performed without referencing a pixel value on the upper side of the target LCU (target ALFU1). Also, in the event that the downward referable range MaxDlower1_1(y) goes into equal to or smaller than three pixels (in the event that the Y coordinate within the LCU is less than 32−4=28), the downward reference range is restricted by the above-mentioned restraint B, whereby filter processing can be performed without referencing a pixel value on the lower side of the target LCU (target ALFU1).

FIG. 17 illustrates a specific example of the Y coordinate within the ALFU, Y coordinate within the LCU, and normalized Y coordinate within the LCU in the event that LLCUy=32 and Ly=8, the upward referable range MaxDDupper_2(yy), first downward referable range MaxDlower1(yy), and second downward referable range MaxDlower2(yy). Also, FIG. 18 illustrates a specific example of the normalized Y coordinate within the LCU in the event that LLCUy=32 and Ly=8, the upward referable range MaxDDupper_2(y), first downward referable range MaxDlower1_2(y), and second downward referable range MaxDlower2_2(y).

With the example illustrated in FIG. 18, in the event that the normalized Y coordinate within the LCU is equal to or greater than 24, the upward reference range is restricted by the above-mentioned restraint C. Also, in the event that the normalized Y coordinate within the LCU is less than 24, the second upward reference range is restricted by the above-mentioned restraint D, and the first downward reference range is restricted by the above-mentioned restraint E.

(Example of Another Restraint to be Imposed on Reference Region)

Description has been made so far regarding a configuration wherein the reference region setting unit 162b included in the loop filter 16 restricts at least one of the upward reference range and downward reference range, but the present embodiment is not restricted to this. For example, the reference region setting unit 162b may be configured to set the reference region R by imposing at least one of the following restraints F to H in addition to at least one restraint of the above-mentioned restraints A to E. Also, the reference region setting unit 162b may be configured to set the reference region R by imposing at least one of the following restraints F to H without imposing any of the above-mentioned restraints A to E.

(Restraint F)

In the event that the loop filter 16 performs any processing of the processing example 1 and processing example 2, the reference region setting unit 162b sets the reference region R so as to satisfy the following restraint F.

Restraint F: A rightward reference range Dright is set to the number of pixels equal to or smaller than LLCUx−(X coordinate within the LCU of the target pixel)−1 in the event that the X coordinate within the LCU of the target pixel is equal to or greater than a predetermined threshold LLCUx−Lright1.

The rightward reference range Dright mentioned here specifies distance along the X axis between the target pixel and a pixel within the reference region R which is a pixel adjacent to the right edge of the reference region R (this will be applied to the following). Also, the rightward reference range Dright is represented with a pixel as a unit (this will be applied to the following).

Also, the rightward reference range Dright (x) in the event that the X coordinate within the LCU of the target pixel is equal to or greater than a predetermined threshold LLCUx−Lright1 may be set so as to depend on the X coordinate within the LCU of the target pixel, or may be set to, for example, 0 without depending on the X coordinate within the LCU of the target pixel.

The reference region setting unit 162b sets the reference region R while imposing the restraint F thereon, and accordingly, the filter processing unit 162c generates the adaptive-filtered decoded image P_ALF without referencing a pixel value on the right side of the filter processing unit ALFU. Accordingly, the amount of data to be transferred from the frame memory 15 to the internal memory 163, and the amount of data to be transferred from the internal memory 163 to the filter processing unit 162c are reduced. Also, the filter processing unit 162c can perform filter processing without awaiting until decoding of an LCU on the right side of the target LCU is completed, and accordingly, the processing time is reduced.

(Restraint G)

In the event that the loop filter 16 performs the processing of the processing example 2, the reference region setting unit 162b sets the reference region R so as to satisfy the following restraint G.

Restraint G: A rightward reference range Dright is set to the number of pixels equal to or smaller than LLCUx−Ddf−(normalized X coordinate within the LCU of the target pixel)−1 in the event that the normalized X coordinate within the LCU of the target pixel is less than a predetermined threshold Lright2.

The normalized X coordinate within the LCU mentioned here is defined with (X coordinate within the LCU) % LLCUx in which a symbol "%" that represents remainder operation is used, and takes a value equal to or greater than 0 (this will be applied to the following). Also, let us say that Ddf represents width in the X direction of a region where deblocking by the deblocking filter 161 has not been completed in the target LCU.

Also, the rightward reference range Dright in the event that the normalized X coordinate within the LCU of the target pixel is less than a predetermined threshold Lright2 may be set so as to depend on the X coordinate within the LCU of the target pixel, or may be set to, for example, 0 without depending on the X coordinate within the LCU of the target pixel. Also, the threshold Lright2 has to be a value equal to or greater than LLCUx−Lx.

The reference region setting unit 162b sets the reference region R while imposing the restraint F thereon, whereby the amount of data to be transferred from the frame memory 15 to the internal memory 163 can be reduced. Also, the filter processing unit 162c can perform filter processing without awaiting until deblocking regarding the right edge of the target LCU is completed, and accordingly, the processing time is reduced.

Note that the reference region setting unit 162b may be configured to set the reference region R so that the rightward reference region Dright satisfies Dright≤LLCUx−Ddf−(normalized X coordinate within the LCU of the target pixel)−1 in the event that the normalized X coordinate within the LCU is equal to or greater than a predetermined threshold Lright2' and also less than a predetermined threshold Lright2. Here, it is desirable that the threshold Lright2' satisfies Lright2'=LLCUx−Lx−Dtap.

(Restraint H)

In the event that the loop filter 16 performs the processing of the processing example 2, the reference region setting unit 162b sets the reference region R so as to satisfy the following restraint H.

Restraint H: The rightward reference range Dright is set to the number of pixels equal to or smaller than LLCUx−Lx−(normalized X coordinate within the LCU of the target pixel)−1 in the event that the normalized X coordinate within the LCU of the target pixel is less than a predetermined threshold Lright3.

Here, the threshold Lright3 has to be a value equal to or greater than LLCUx−Lx.

Figure 19:
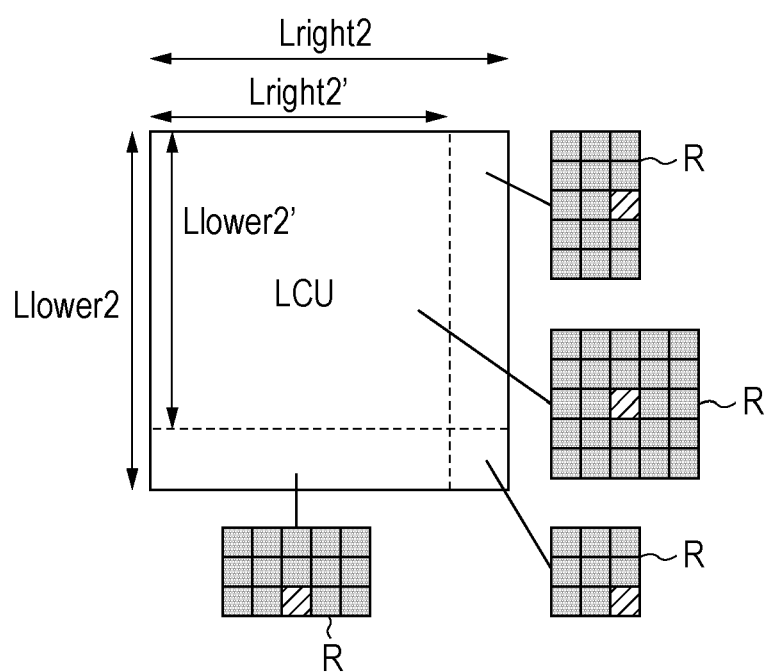
FIG. 19 is a diagram illustrating an example of a reference region to be set by the adaptive filter according to the first embodiment of the present invention.

FIG. 19 illustrates an example of the reference region R set so as to satisfy both the of the restraint D and restraint G.

(Moving Image Encoding Device 2)

Description will be made regarding the configuration of the moving image encoding device 2 according to the present embodiment, with reference to FIG. 20 to FIG. 21. The moving image encoding device 2 is an encoding device which includes H.264/MPEG-4.AVC, technology employed by KTA software which is a codec for joint development in VCEG (Video Coding Expert Group), and technology employed by TMuC (Test Model under Consideration) software which is a succeeding codec thereof at a portion thereof. Hereinafter, the same portion as with an already described portion is denoted with the same reference numeral, and description thereof will be omitted.

Figure 20:
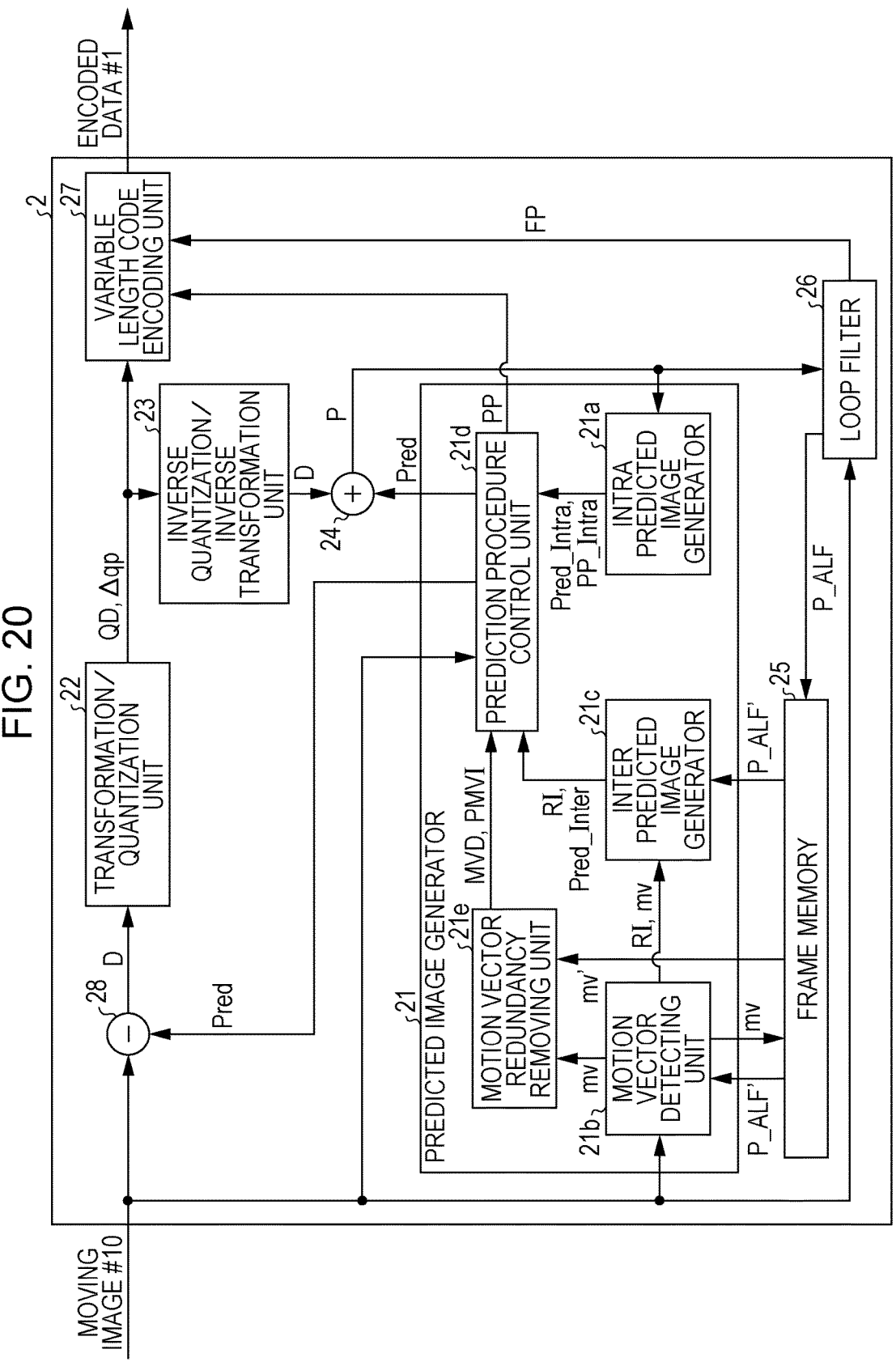
FIG. 20 is a block diagram illustrating a configuration of a moving image encoding device according to the first embodiment of the present invention.

FIG. 20 is a block diagram illustrating the configuration of the moving image encoding device 2. As illustrated in FIG. 20, the moving image encoding device 2 includes a predicted image generator 21, a transformation/quantization unit 22, an inverse quantization/inverse transformation unit 23, an adder 24, frame memory 25, a loop filter 26, a variable length code encoding unit 27, and a subtractor 28. Also, as illustrated in FIG. 20, the predicted image generator 21 includes an intra predicted image generator 21a, a motion vector detecting unit 21b, an inter predicted image generator 21c, a prediction procedure control unit 21d, and a motion vector redundancy removing unit 21e. The moving image encoding device 2 is a device configured to generate encoded data #1 by encoding a moving image #10 (image to be encoded).

(Predicted Image Generator 21)

The predicted image generator 21 recursively divides the LCU to be processed into one or multiple lower-order CUs, further divides each leaf CU into one or multiple partitions, and generates an inter predicted image Pred_Inter using inter-frame prediction or an intra predicted image Pred_Intra using intra-screen prediction for each partition. The generated inter predicted image Pred_Inter and intra predicted image Pred_Intra are supplied to the adder 24 and subtractor 28 as a predicted image Pred.

Note that the predicted image generator 21 omits, with regard to a PU to which the skip mode has been applied, encoding of another parameter belonging to this PU. Also, the following is determined so as to optimize coding efficiency: (1) Mode for dividing the target LCU into lower-order CUs and partitions, (2) Whether to apply the skip mode, and (3) Which of an inter predicted image Pred_Inter, and intra predicted image Pred_Intra is generated for each partition.

(Intra Predicted Image Generator 21a)

The intra predicted image generator 21a generates a predicted image Pred_Intra regarding each partition by intra-screen prediction. Specifically, (1) A prediction mode to be used for intra prediction is selected regarding each partition, and (2) The predicted image Pred_Intra is generated from the decoded image P using the selected prediction mode. The intra predicted image generator 21a supplies the generated intra predicted image Pred_Intra to the prediction procedure control unit 21d.

Also, the intra predicted image generator 21a determines an estimated prediction mode for the target partition from the prediction mode assigned to a partition in the vicinity of the target partition, supplies a flag MPM that indicates whether or not this estimated prediction mode agrees with the prediction mode actually selected regarding the target partition to the variable length code encoding unit 27 via the prediction procedure control unit 21d as a part of the intra prediction parameters PP_Intra, and the variable length code encoding unit 27 includes this flag in the encoded data #1.

Also, in the event that the estimated prediction mode regarding the target partition differs from the prediction mode actually selected regarding the target partition, the intra predicted image generator 21a supplies a residual prediction mode index RIPM that indicates the prediction mode regarding the target partition to the variable length code encoding unit 27 via the prediction procedure control unit 21d as a part of the intra prediction parameters PP_Intra, and the variable length code encoding unit 27 includes this residual prediction mode index in the encoded data #1.

(Motion Vector Detecting Unit 21b)

The motion vector detecting unit 21b detects a motion vector mv relating to each partition. Specifically, the motion vector detecting unit 21b detects the motion vector mv relating to the target partition by (1) selecting the adaptive-filtered decoded image P_ALF' to be used as a reference image, and (2) searching for a region most approximate to the target partition in the selected adaptive-filtered decoded image P_ALF'. Here, the adaptive-filtered decoded image P_ALF' is an image to be obtained by subjecting a decoded image where decoding of the entire frame has already been completed to adaptive filter processing by the loop filter 26, and the motion vector detecting unit 21b can read out the pixel value of a pixel which makes up the adaptive-filtered decoded image P_ALF' from the frame memory 25. The motion vector detecting unit 21b supplies the detected motion vector mv to the inter predicted image generator 21c and motion vector redundancy removing unit 21e along with the reference image index RI for specifying the adaptive-filtered decoded image P_ALF' used as a reference image.

(Inter Predicted Image Generator 21c)

The inter predicted image generator 21c generates a motion compensation image mc regarding each inter prediction partition by inter-frame prediction. Specifically, the inter predicted image generator 21c generates a motion compensation image mc from the adaptive-filtered decoded image P_ALF' specified by the reference image index RI supplied from the motion vector detecting unit 21b using the motion vector mv supplied from the motion vector detecting unit 21b. In the same way as with the motion vector detecting unit 21b, the inter predicted image generator 21c can read out the pixel value of a pixel which makes up the adaptive-filtered decoded image P_ALF' from the frame memory 25. The inter predicted image generator 21c supplies the generated motion compensation image mc (inter predicted image Pred_Inter) to the prediction procedure control unit 21d along with the reference image index RI supplied from the motion vector detecting unit 21b.

(Prediction Procedure Control Unit 21d)

The prediction procedure control unit 21d compares the intra predicted image Pred_Intra and inter predicted image Pred_Inter with the image to be encoded, and selects whether to perform intra prediction or inter prediction. In the event of having selected intra prediction, the prediction procedure control unit 21d supplies the intra predicted image Pred_Intra to the adder 24 and subtractor 28 as the predicted image Pred, and also supplies the intra prediction parameters PP_Intra to be supplied from the intra predicted image generator 21a to the variable length code encoding unit 27. On the other hand, in the event of having selected inter prediction, the prediction procedure control unit 21d supplies the inter predicted image Pred_Inter to the adder 24 and subtractor 28 as the predicted image Pred, and also supplies the reference image index RI, and the estimated motion vector index PMVI and motion vector residual MVD supplied from a later-described motion vector redundancy removing unit 21e to the variable length code encoding unit 27 as the inter prediction parameters PP_Inter.

(Motion Vector Redundancy Removing Unit 21e)

The motion vector redundancy removing unit 21e deletes redundancy in the motion vector mv detected by the motion vector detecting unit 21b. Specifically, the motion vector redundancy removing unit 21e generates a motion vector residual MVD by (1) selecting an estimation method to be used for estimation of the motion vector mv, (2) deriving the estimated motion vector pmv in accordance with the selected estimation method, and (3) subtracting the estimated motion vector pmv from the motion vector mv. The motion vector redundancy removing unit 21e supplies the generated motion vector residual MVD to the prediction procedure control unit 21d along with the estimated motion vector index PMVI that indicates the selected estimation method.

(Transformation/Quantization Unit 22)

The transformation/quantization unit 22 (1) subjects a predicted residual D obtained by subtracting the predicted image Pred from an image to be encoded to DCT transform (Discrete Cosine Transform) for each block (transform unit), (2) quantizes a DCT coefficient obtained by DCT transform, and (3) supplies a quantized predicted residual QD obtained by quantization to the variable length code encoding unit 27 and inverse quantization/inverse transformation unit 23.

Note that the transformation/quantization unit 22 (1) selects a quantization step QP to be used at the time of quantization, for each TU, (2) supplies quantization parameter difference Δqp that indicates the size of the selected quantization step QP to the variable length code encoding unit 28, and (3) supplies the selected quantization step QP to the inverse quantization/inverse transformation unit 23. The quantization parameter difference Δqp mentioned here specifies a difference value to be obtained by subtracting the value of a quantization parameter qp' regarding a TU subjected to DCT transform/quantization immediately before from the value of a quantization parameter qp (e.g., $QP=2^{pq/6}$) regarding a TU to be subjected to DCT transform/quantization.

(Inverse Quantization/Inverse Transformation Unit 23)

The inverse quantization/inverse transformation unit 23 (1) subjects the quantized predicted residual QD to inverse quantization, (2) subjects a DCT coefficient obtained by inverse quantization to inverse DCT (Discrete Cosine Transform), and (3) supplies the predicted residual D obtained by inverse DCT transform to the adder 24. At the time of subjecting the quantized predicted residual QD to inverse quantization, the inverse quantization/inverse transformation unit 23 uses the quantization step QP supplied from the transformation/quantization unit 22. Note that the predicted residual D to be output from the inverse quantization/inverse transformation unit 23 is obtained by adding quantization error to the predicted residual D input to the transformation/quantization unit 22, but common naming is employed here for convenience of description.

(Adder 24)

The adder 24 generates a (local) decoded image P by adding the predicted image Pred selected by the prediction procedure control unit 21d to the predicted residual D generated at the inverse quantization/inverse transformation unit 23. The (local) decoded image P generated at the adder 24 is supplied to the loop filter 26 and also stored in the frame memory 25, and used as a reference image in intra prediction.

(Variable Length Code Encoding Unit 27)

The variable length code encoding unit 27 generates the encoded data #1 by subjecting (1) the quantized predicted residual QD and Δqp supplied from the transformation/quantization unit 22, (2) the quantization parameters PP (inter prediction parameters PP_Inter and intra prediction parameters PP_Intra) supplied from the prediction procedure control unit 21d, and (3) the filter parameters FP supplied from the loop filter 26 to variable length encoding.

Note that, as a specific encoding system according to the variable length code encoding unit 27, there is employed CABAC (Context-based Adaptive Binary Arithmetic Coding) which is one system of arithmetic encoding/decoding or CAVLC (Context-based Adaptive VLC) which is one system of non-arithmetic encoding/decoding.

The variable length code encoding unit 27 determines, for each picture, which coding system of CABAC and CAVLC is employed, and performs encoding using the determined coding system, and also includes coding mode information (entropy_coding_mode_flag) for specifying the determined coding system in a picture header PH of the encoded data #1.

(Subtractor 28)

The subtractor 28 generates the predicted residual D by subtracting the predicted image Pred selected at the prediction procedure control unit 21d from an image to be encoded. The predicted residual D generated at the subtractor 28 is subjected to DCT transform/quantization by the transformation/quantization unit 22.

(Loop Filter 26)

The loop filter 26 has (1) a function serving as a deblocking filter (DF: Deblocking Filter) configured to perform smoothing (deblocking) of an image in the vicinity of a block boundary or partition boundary in the decoded image P, and (2) a function serving as an adaptive filter (ALF: Adaptive Loop Filter) configured to perform adaptive filter processing on an image where the deblocking filter has acted, using the filter parameters FP.

Figure 21:
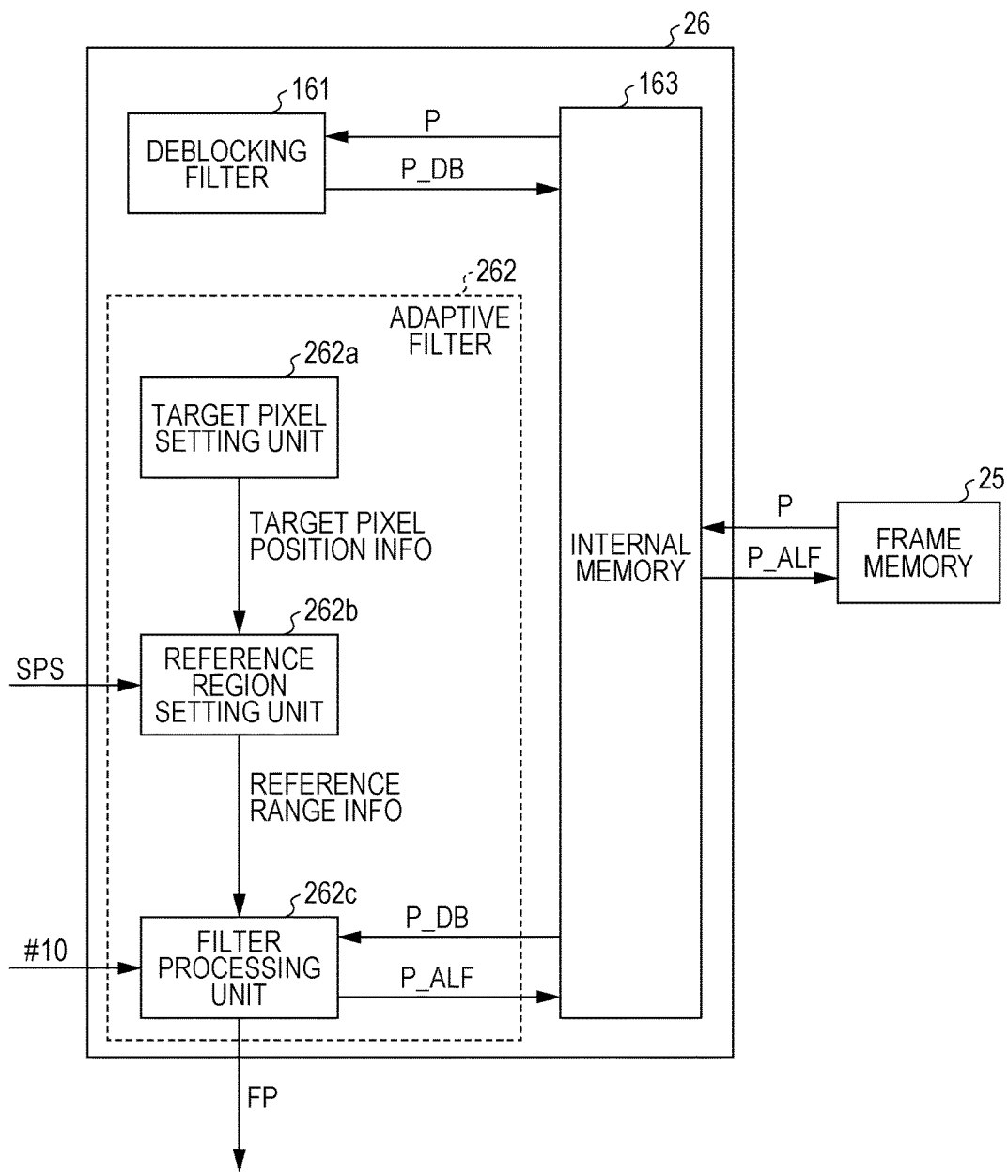
FIG. 21 is a block diagram illustrating a configuration of a loop filter including the moving image encoding device according to the first embodiment of the present invention.

FIG. 21 is a block diagram illustrating the configuration of the loop filter 26. As illustrated in FIG. 21, the loop filter 26 includes a deblocking filter 161, an adaptive filter 262, and internal memory 163.

The configuration and operation of the loop filter 26 are generally the same as with the loop filter 16 included in the moving image decoding device 1. Hereinafter, only a portion different from the loop filter 16 will be described.

(Adaptive Filter 262)

As illustrated in FIG. 21, the adaptive filter 262 includes a target pixel setting unit 262a, a reference region setting unit 262b, and a filter processing unit 262c. The target pixel setting unit 262a has the same configuration as with the target pixel setting unit 162a included in the moving image decoding device 1, and accordingly, description thereof will be omitted.

The reference region setting unit 262b has generally the same configuration as with the reference region setting unit 162b included in the moving image decoding device 1. However, let us say that the reference region setting unit 262b determines tap count Ntap set so as to improve coding efficiency, and references this tap count Ntap instead of "tap count information included in the filter parameters FP" to be referenced by the reference region setting unit 162b. Here, the tap count Ntap represents the previous tap count on which a restraint regarding the reference region is imposed. Also, the tap count information which specifies the tap count Ntap is included in the encoded data #1 as a part of the filter parameters FP.

The filter processing unit 262c determines a filter coefficient a(i, j) and offset o of the filter to act on the deblocked decoded image P_DB so as to reduce error between an image after filtering and an image to be encoded (original image) as small as possible. For example, the filter processing unit 262c determines the filter coefficient a(i, j) and offset o so as to reduce square error E that the following Expression (2) indicates as small as possible.

[Mathematical Expression 5]

$$E = \sum_{x,y} \left[ S_O(x, y) - \left( \sum_{(i,j) \in R} a(i, j) \times S(x+i, y+j) \right) - o \right]^2 \quad (2)$$

Here, S(x, y) represents a pixel value of the deblocked decoded image P_DB, and S0(x, y) represents a pixel value of an image to be encoded. Also, R represents a region to be referenced for calculating the pixel value of the target pixel, and is set by the reference region setting unit 262b.

The filter processing unit 262c generates the adaptive-filtered decoded image P_ALF by performing the filter processing using the thus determined filter coefficient a(i, j) and offset o on the deblocked decoded image P_DB. Also, the filter processing unit 262c includes the thus determined filter coefficient a(i, j) and offset o in the filter parameters FP. Specific filter processing that the filter processing unit 262c performs is the same as the filter processing unit 162c, and accordingly, description will be omitted here.

Second Embodiment

With the first embodiment, description has been made regarding a case where the adaptive filter included in the loop filter 16 acts on a deblocked decoded image, thereby generating the adaptive-filtered decoded image P_ALF. With the present embodiment, description will be made regarding a configuration wherein an adaptive filter included a loop filter acts on the deblocked decoded image P_DB, predicted image P, and predicted residual D, thereby generating the adaptive-filtered decoded image P_ALF. Note that, hereinafter, the same portion as with an already described portion is denoted with the same reference numeral, and description thereof will be omitted.

(Encoded Data #1')

A filter coefficient group to be multiplied on each pixel of each of the deblocked decoded image P_DB, predicted image P, and predicted residual D is included in filter parameters FP' of encoded data #1' according to the present embodiment. Other structures of the encoded data #1' are the same as the structures of the encoded data #1 according to the first embodiment.

Figure 22:
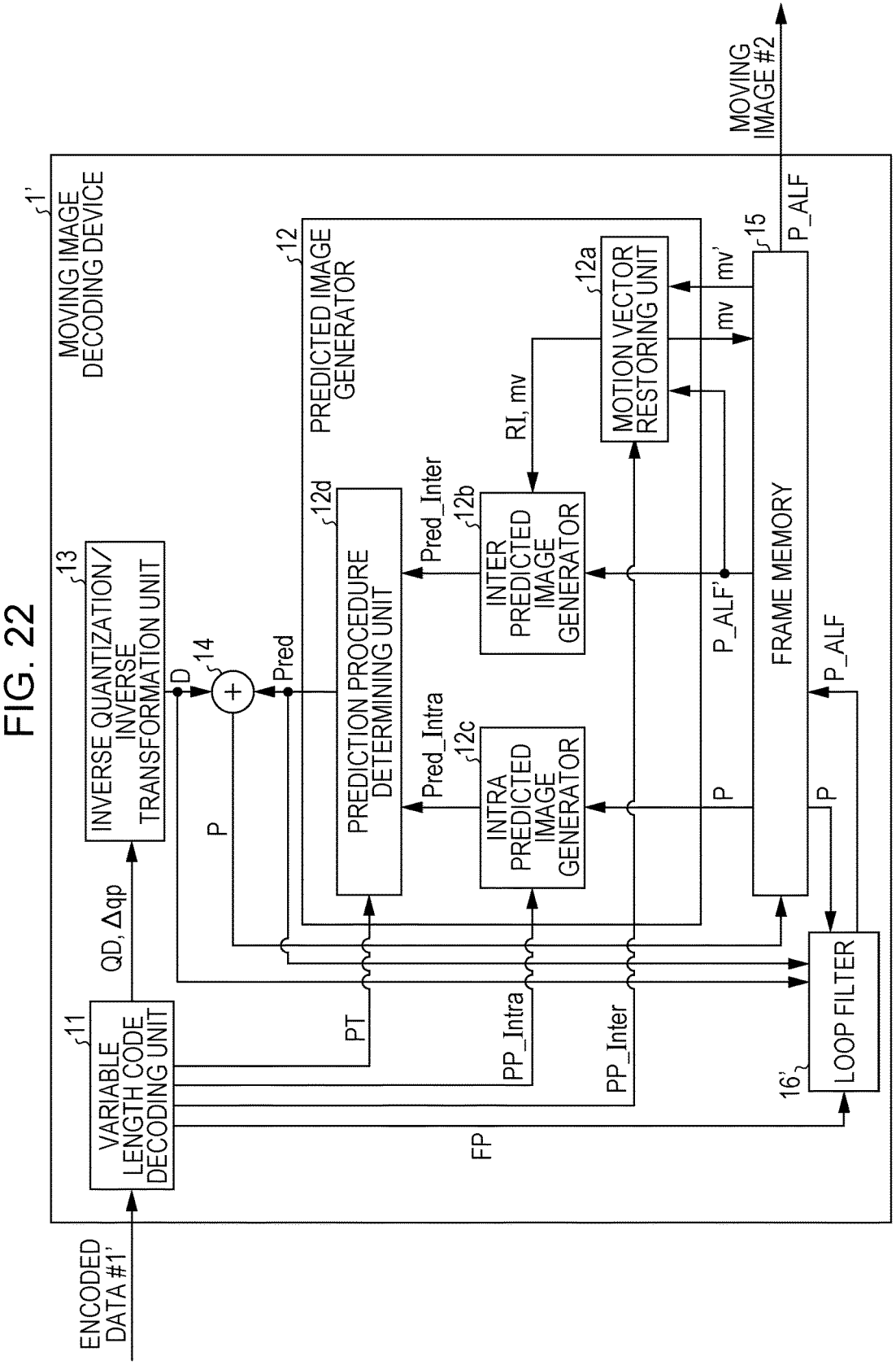
FIG. 22 is a block diagram illustrating a configuration of a moving image decoding device according to a second embodiment of the present invention.

FIG. 22 is a block diagram illustrating the configuration of a moving image decoding device 1' according to the present embodiment. As illustrated in FIG. 22, the moving image decoding device 1' includes a loop filter 16' instead of the loop filter 16 included in the moving image decoding device 1 according to the first embodiment. Also, in addition to the decoded image P, the predicted image Pred and predicted residual D are also supplied to the loop filter 16'. Other configurations are the same as with the moving image decoding device 1.

(Loop Filter 16')

Figure 23:
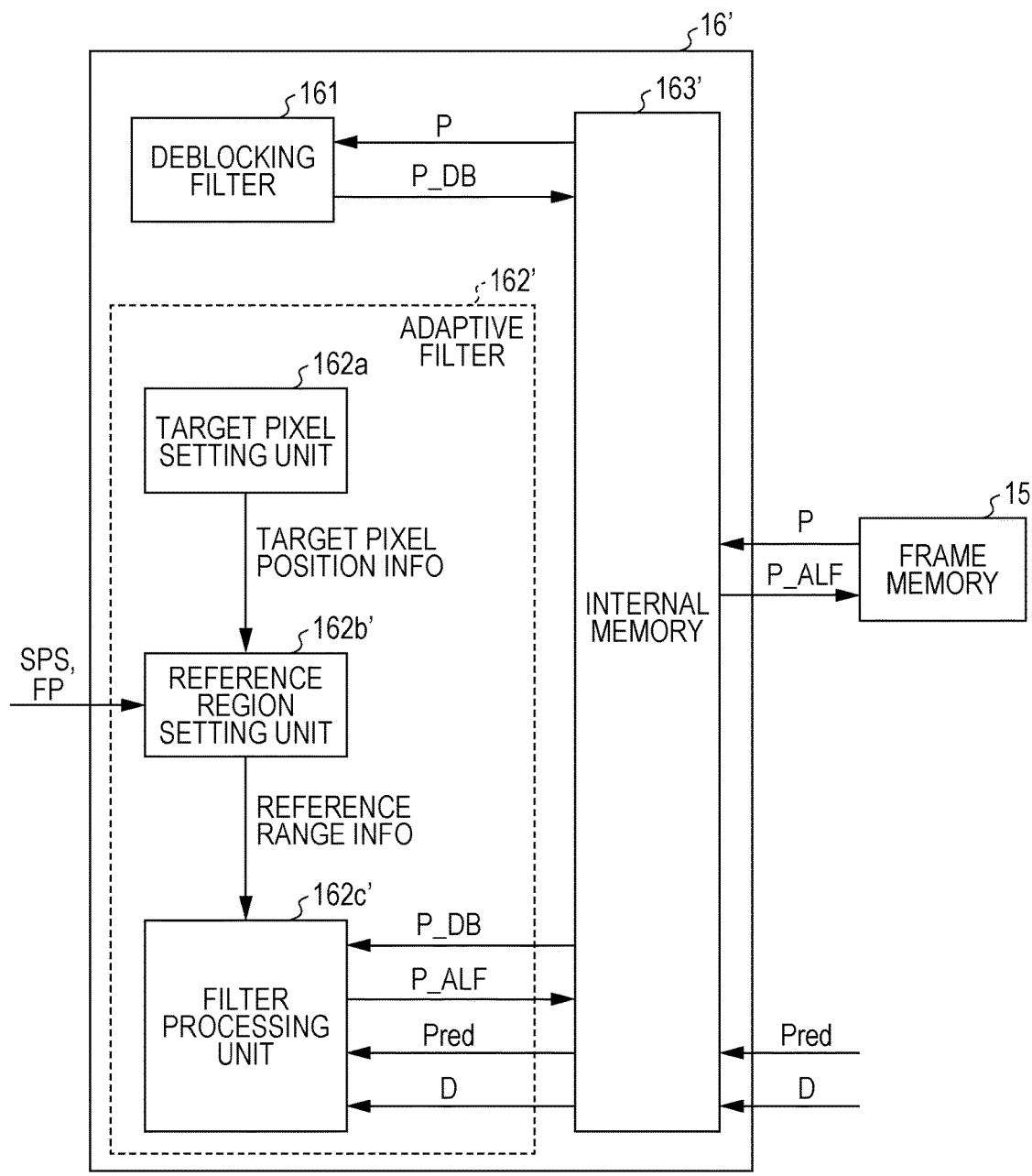
FIG. 23 is a block diagram illustrating a configuration of a loop filter including the moving image decoding device according to the second embodiment of the present invention.

FIG. 23 is a block diagram illustrating the configuration of the loop filter 16'. As illustrated in FIG. 23, the loop filter 16' includes a deblocking filter 161, an adaptive filter 162', and internal memory 163. Also, the adaptive filter 162' includes a target pixel setting unit 162a, a reference region setting unit 162b', and a filter processing unit 162'

With the internal memory 163', the decoded image P, predicted image Pred, predicted residual D, deblocked decoded image P_DB, and adaptive-filtered decoded image P_AFL are stored.

The loop filter 16' performs generally the same processing as with any of the processing example 1 and processing example 2 described in the first embodiment. However, the loop filter 16' references, with the adaptive filter processing, not only the deblocked decoded image P_DB but also the predicted image Pred and predicted residual P_DB.

(Reference Region Setting Unit 162b')

The reference region setting unit 162b' sets, in the vicinity of the target pixel, a reference region RDB regarding the deblocked decoded image P_DB, and a reference region RD regarding the predicted residual D, and a reference region RPred regarding the predicted image Pred.

The reference region setting unit 162b' sets the reference regions so as to satisfy any restraint of restraints I to restraint M listed below.

Restraint I: Any of the reference region RDB, reference region RD, and reference region RPred is set to 1×1 pixels.

High-speed filtering may be performed by imposing this restraint. Also, with regard to any of the deblocked decoded image P_DB, predicted image Pred, and predicted residual P_DB, the adaptive-filtered decoded image P_ALF is calculated without referencing a pixel outside the target LCU, and accordingly, the amount of data to be transferred is reduced. Also, the adaptive filter 162' is configured to reference not only the deblocked decoded image P_DB but also the predicted image Pred and predicted residual P_DB, and accordingly, even when setting the reference regions to 1×1 pixels, coding efficiency does not significantly deteriorate.

Restraint J: Any of the reference region RDB, reference region RD, and reference region RPred is set so that the number of pixels in the vertical direction becomes one pixel.

High-speed filtering may be performed by imposing this restraint. Also, similarly, with regard to any of the deblocked decoded image P_DB, predicted image Pred, and predicted residual P_DB, the adaptive-filtered decoded image P_ALF is calculated without referencing pixels on the upper side and lower side of the target LCU, and accordingly, the amount of data to be transferred is reduced. Also, the adaptive filter 162' is configured to reference not only the deblocked decoded image P_DB but also the predicted image Pred and predicted residual P_DB, and accordingly, even when setting the number of pixels in the vertical direction of each reference region is set to one pixel, coding efficiency does not significantly deteriorate.

Restraint K: Of the reference region RDB, reference region RD, and reference region RPred, the reference region RD and reference region RPred are set to 1×1 pixels.

High-speed filtering may be performed by imposing this restraint. Also, similarly, with regard to any of the predicted image Pred and predicted residual P_DB, the adaptive-filtered decoded image P_ALF is calculated without referencing a pixel outside the target LCU, and accordingly, the amount of data to be transferred is reduced. Also, no restraint is imposed on the reference region RDB, and accordingly, deterioration in coding efficiency is not brought about.

Restraint L: Of the reference region RDB, reference region RD, and reference region RPred, the reference region RD and reference region RPred are set so that the number of pixels in the vertical direction becomes one pixel.

High-speed filtering may be performed by imposing this restraint. Also, similarly, with regard to any of the predicted image Pred and predicted residual P_DB, the adaptive-filtered decoded image P_ALF is calculated without referencing pixels on the upper side and lower side of the target LCU, and accordingly, the amount of data to be transferred is reduced. Also, no restraint is imposed on the reference region RDB, and accordingly, deterioration in coding efficiency is not brought about.

Restraint M: Of the reference region RDB, reference region RD, and reference region RPred, the reference region RD and reference region RPred are set so as to satisfy the restraints A to H described in the first embodiment.

The amount of data to be transferred is reduced by imposing this restraint. Also, no restraint is imposed on the reference region RDB, and accordingly, deterioration in coding efficiency is not brought about.

(Filter Processing Unit 162c')

The filter processing unit 162c' subjects the deblocked decoded image P_DB, predicted residual D, and predicted image Pred stored in the internal memory 163' to filter processing using the filter coefficient group included in the filter parameters FP', thereby generating the adaptive-filtered decoded image P_ALF. More specifically, if we say that a pixel value of the adaptive-filtered decoded image P_ALF is represented as SALF(x', y'), a pixel value of the deblocked decoded image P_DB is represented as SPDB(x, y), a pixel value of the predicted residual D is represented as SD(x, y), and a pixel value of the predicted image Pred is represented as SPred(x, y), the filter processing unit 162c' calculates the pixel value SALF(x', y') by the following Expression (3).

[Mathematical Expression 6]

$$S_{ALF}(x', y') = \left(\sum_{(u,v)\in RDB} a_{PDB}(u, v) \times S_{PDB}(x+u, y+v)\right) + \left(\sum_{(u,v)\in RD} a_D(u, v) \times S_D(x+u, y+v)\right) + \left(\sum_{(u,v)\in RPred} a_{Pred}(u, v) \times S_{Pred}(x+u, y+v)\right) + o \quad (3)$$

Here, the coordinates (x, y) may be the same coordinates as the coordinates (x', y'), or may be different coordinates as long as there is a one-on-one correspondence. Also, aPDB(u, v) represents, of filter coefficients included in the filter parameters FP' of the encoded data #1', a filter coefficient to be multiplied on the pixel value SPDB(x+u, y+v) of the deblocked decoded image P_DB.

Also, aD(u, v) represents, of filter coefficients included in the filter parameters FP' of the encoded data #1', a filter coefficient to be multiplied on the pixel value SD(x+u, y+v) of an image that the predicted residual D indicates. Also, aPred(u, v) represents, of filter coefficients included in the filter parameters FP' of the encoded data #1', a filter coefficient to be multiplied on the pixel value SPred(x+u, y+v) of an image that the predicted image Pred indicates. Also, a specific value of the offset o is specified by the filter parameters FP'.

Also, there are employed the reference region RDB, reference region RD, and reference region RPred, which have been set by the reference region setting unit 162b.

Note that the filter processing unit 162c' may be configured, in the same way as with the filter processing unit 162c in the first embodiment, to allocate a filter coefficient to each pixel included in each reference region so as to have a rotational symmetry property of 180 degrees.

In this manner, the adaptive filter 162 according to the present embodiment references the deblocked decoded image P_DB, predicted residual D, and predicted image Pred, and accordingly, as compared to a configuration wherein only the deblocked decoded image P_DB is referenced, in order to generate a predicted image, a more suitable adaptive-filtered decoded image P_ALF can be generated.

(Moving Image Encoding Device 2')

Hereinafter, a moving image encoding device 2' according to the present embodiment will be described with reference to FIG. 24 to FIG. 25. Hereinafter, the same portion as with an already described portion is denoted with the same reference numeral, and description thereof will be omitted.

Figure 24:
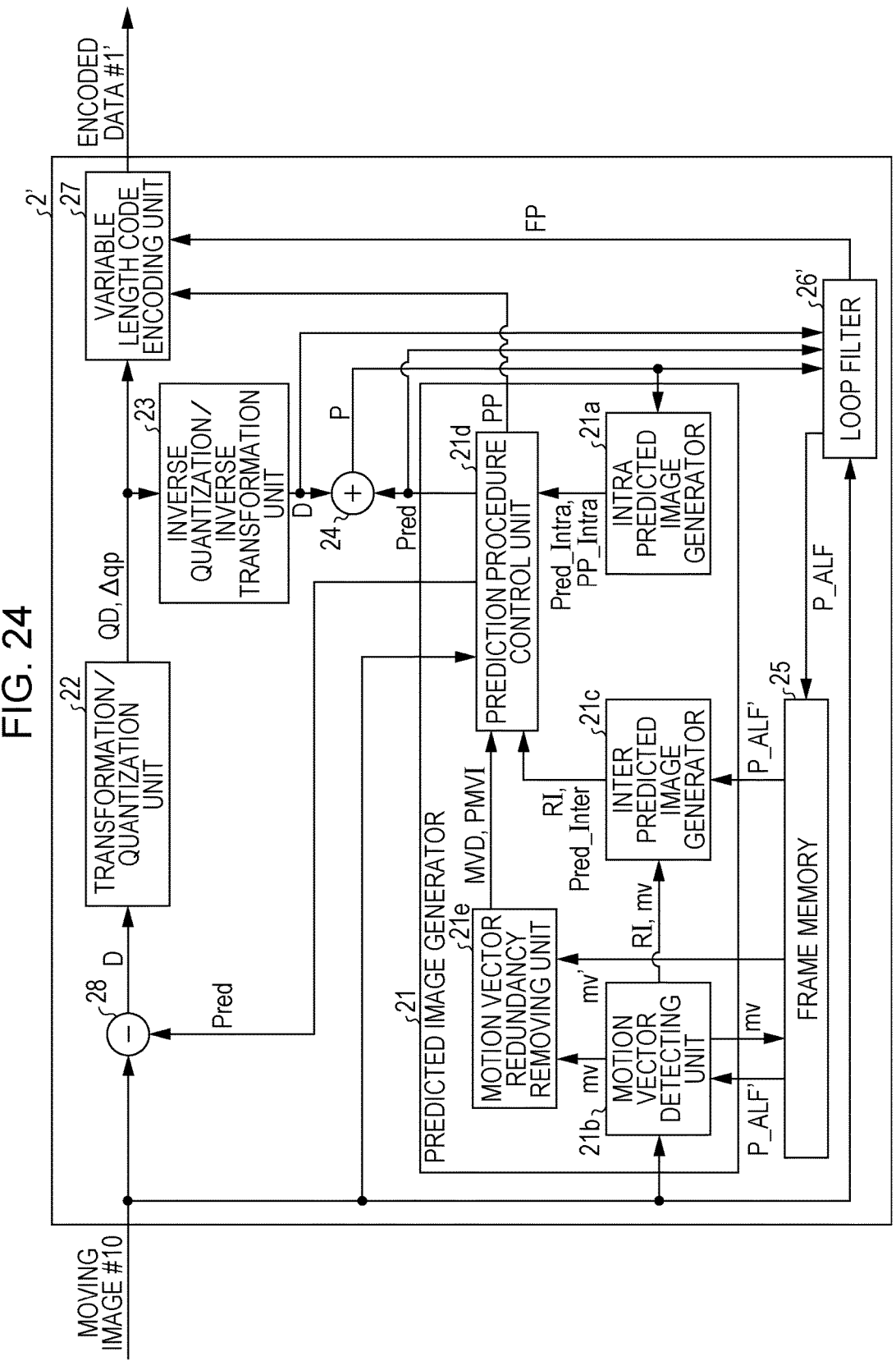
FIG. 24 is a block diagram illustrating a configuration of a moving image encoding device according to the second embodiment of the present invention.

FIG. 24 is a block diagram illustrating the configuration of the moving image encoding device 2' according to the present embodiment. As illustrated in FIG. 24, the moving image encoding device 2' includes a loop filter 26' instead of the loop filter 26 of the moving image encoding device 2 according to the first embodiment. Also, in addition to the decoded image P, the predicted image Pred and predicted residual D are supplied to the loop filter 26'. Other configurations are the same as with the moving image encoding device 2.

(Loop Filter 26')

Figure 25:
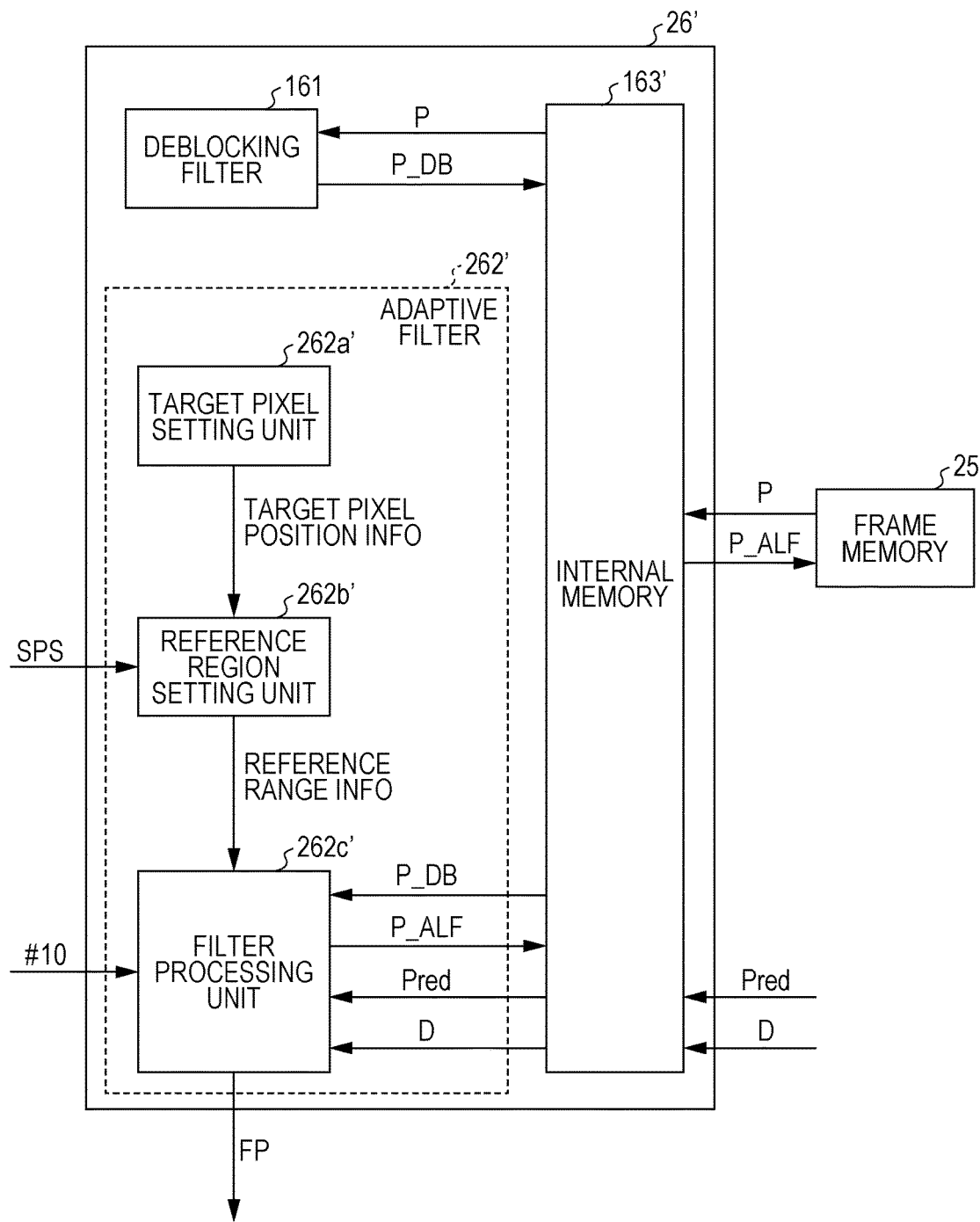
FIG. 25 is a block diagram illustrating a configuration of a loop filter including the moving image encoding device according to the second embodiment of the present invention.

FIG. 25 is a block diagram illustrating the configuration of the loop filter 26'. As illustrated in FIG. 25, the loop filter 26' includes a deblocking filter 161, an adaptive filter 262', and internal memory 163'. Also, the adaptive filter 262' includes a target pixel setting unit 262a', a reference region setting unit 262b', and a filter processing unit 262c'. The target pixel setting unit 262a' and reference region setting unit 262b' have the same configuration as the target pixel setting unit 162a' and reference region setting unit 162b', and accordingly, description thereof will be omitted here.

The filter processing unit 262c' determines a filter coefficient aPDB(u, v) to be multiplied on the pixel value SPDB(x+u, y+v) of the deblocked decoded image P_DB, a filter coefficient aD(u, v) to be multiplied on the pixel value SD(x+u, y+v) of an image that the predicted residual D indicates, a filter coefficient aPred(u, v) to be multiplied on the pixel value SPred(x+u, y+v) of an image that the predicted image Pred indicates, and offset o so as to reduce error between an image after filtering and an image to be encoded (original image). For example, the filter processing unit 262c' determines each filter coefficient and offset so as to reduce square error E' indicated in the following Expression (4).

[Mathematical Expression 7]

$$E' = \sum_{x,y} \left[ \begin{array}{l} S_O(x, y) - \left( \sum_{(u,v) \in RDB} a_{PDB}(u, v) \times S_{PDB}(x+u, y+v) \right) - \\ \left( \sum_{(u,v) \in RD} a_D(u, v) \times S_D(x+u, y+v) \right) - \\ \left( \sum_{(u,v) \in RPred} a_{Pred}(u, v) \times S_{Pred}(x+u, y+v) \right) - o \end{array} \right]^2 \quad (4)$$

Here, there are employed the reference region RDB, reference region RD, and reference region RPred, which have been set by the reference region setting unit 262b.

The filter processing unit 262c' subjects the deblocked decoded image P_DB, predicted residual D, and predicted image Pred to filter processing using the thus determined filter coefficients and offset, thereby generating the adaptive-filtered decoded image P_ALF. Also, the filter processing unit 262c' includes the thus determined filter coefficients and offset in the filter parameters FP'. Specific filter processing that the filter processing unit 262c' performs is the same as with the filter processing unit 162c', and accordingly, description thereof will be omitted here.

Third Embodiment

With the first embodiment and second embodiment, description has been made regarding a loop filter wherein a filter reference region is set so as to satisfy various restraints, thereby reducing the amount of data to be transferred. With the present embodiment, description will be made regarding a configuration wherein at the time of performing the adaptive filter processing regarding the target slice, a pixel value is calculated only regarding the target pixel included in an internal region set in the inside of this target slice. Hereinafter, the same portion as with an already described portion is denoted with the same reference numeral, and description thereof will be omitted. Also, the entire configuration of a moving image decoding device and moving image encoding device according to the present embodiment is the same as the configuration of the moving image decoding device 1 and moving image encoding device 2 according to the first embodiment, and accordingly, description thereof will be omitted. Also, filter parameters to be referenced by a loop filter according to the present embodiment have the same structure as with the filter parameters FP according to the first embodiment.

Figure 26:
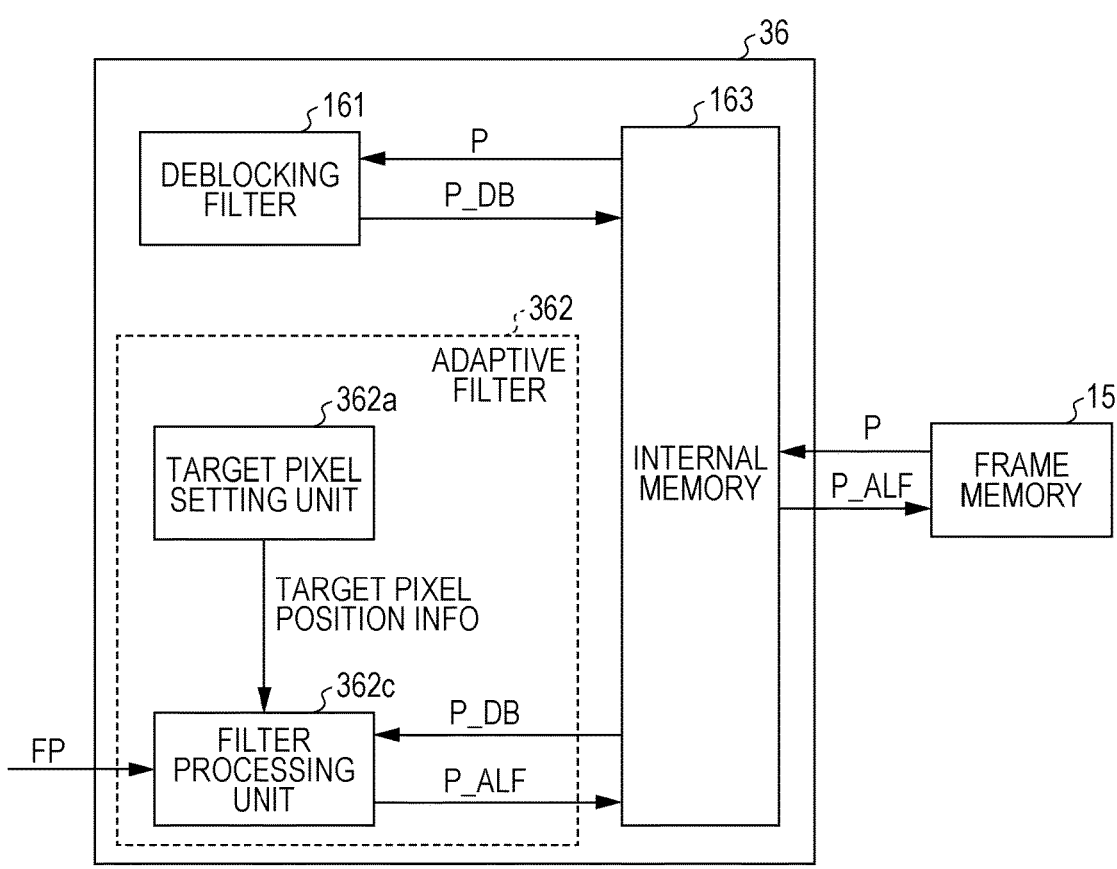
FIG. 26 is a block diagram illustrating a configuration of a loop filter according to a third embodiment of the present invention.

FIG. 26 is a block diagram illustrating the configuration of a loop filter 36. As illustrated in FIG. 26, the loop filter 36 includes a deblocking filter 161, an adaptive filter 362, and internal memory 163. Note that, with the present embodiment, the loop filter 36 may have a configuration not including internal memory. In the case of such a configuration, the deblocking filter 161 reads out each pixel value of the decoded image P from the frame memory 15, and stores the deblocked decoded image P_DB in the frame memory 15. Also, a later-described filter processing unit 362 reads out the deblocked decoded image P_DB from the frame memory 15 and stores the adaptive-filtered decoded image P_ALF in the frame memory 15.

As illustrated in FIG. 26, the loop filter 362 includes a target pixel setting unit 362a and a filter processing unit 362c.

Figure 27:
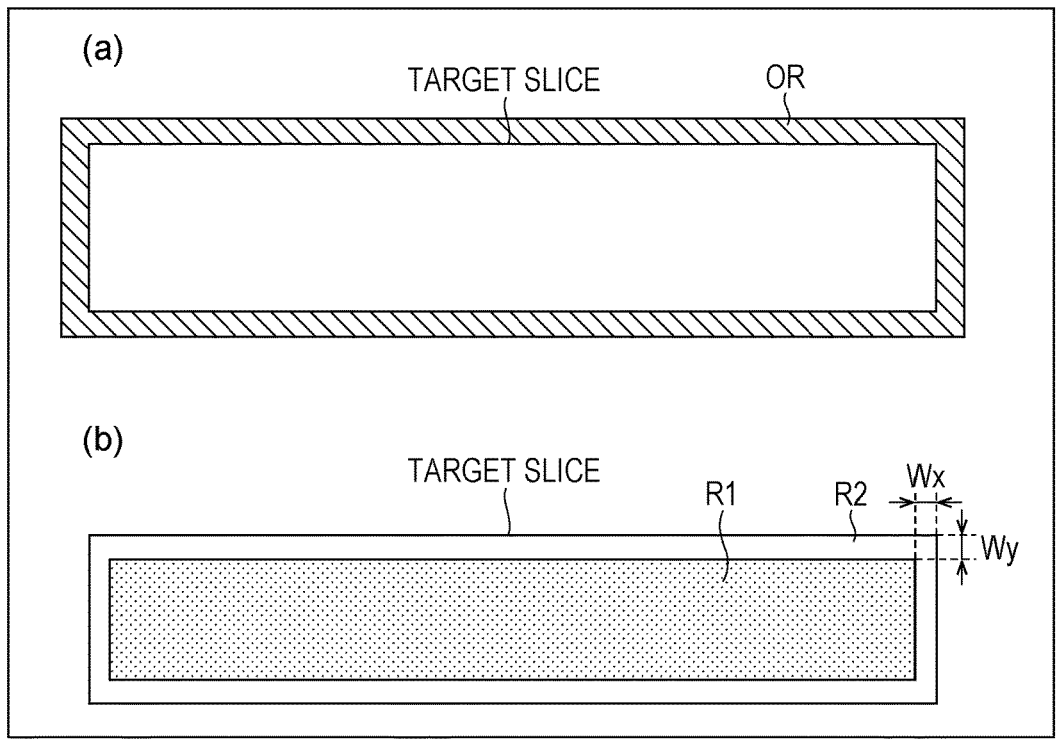
FIG. 27 is a diagram for describing processing by the loop filter according to the third embodiment of the present invention, (a) illustrates an internal region and an adjacent region to be set on a slice by this loop filter, and (b) illustrates a region to be referenced by a loop filter according to the related art.

The target pixel setting unit 362a divides the target slice into an internal region and a peripheral region, and sequentially sets each pixel included in the internal region as the target pixel. (a) in FIG. 27 is a diagram illustrating an internal region R1 and an external region R2 set by the target pixel setting unit 362a. As illustrated in (a) in FIG. 27, a boundary in the vertical direction of the internal region R1 is set to the inner side from a boundary in the vertical direction of the target slice by Wx pixels, and a boundary in the horizontal direction of the internal region R1 is set to the inner side from a boundary in the horizontal direction of the target slice by Wy pixels. Here, specific values of the Wx and Wy are set according to the tap count Ntap specified by the tap count information included in the filter parameters FP. For example, when Ntap=5, Wx=Wy=2, and when Ntap=7, Wx=Wy=3. In general, Wx=Wy=(Ntap−1)/2 holds. Note that when the tap count information is information for independently specifying tap count Ntapx in the horizontal direction and tap count Ntapy in the vertical direction, Wx=(Ntpx−1)/2, and Wy=(Ntapy−1)/2 hold.

The filter processing unit 362c calculates a pixel value regarding the target pixel set by the target pixel setting unit 362a. A method for calculating the target pixel using the filter processing unit 362c is generally the same as with the filter processing unit 162c in the first embodiment. However, as the reference region R in the present embodiment, a region specified by the tap count information included in the filter parameters FP may be employed without change, or a region on which various restraints have been imposed according to the position of the target pixel within the LCU as with the first embodiment may be employed.

(b) in FIG. 27 is a diagram for describing processing by an adaptive filter according to the related art. With the adaptive filter according to the related art, a slice does not have to be divided into an internal region and a peripheral region, and each pixel included in the slice is sequentially set as the target pixel. Accordingly, in the event that the target pixel has been set near a boundary of a slice, there has been caused a case where a filter reference region is set including not only a pixel within the slice but also a pixel outside the slice (pixel included in a region OR in (b) in FIG. 27). The adaptive filter according to the related art has generated a pixel value outside a slice by padding and has used this.

On the other hand, according to the adaptive filter 362 according to the present embodiment, a reference region is not set so as to include a pixel outside a slice, and accordingly, padding as with the related art does not have to be performed. Accordingly, according to the adaptive filter 362 according to the present embodiment, as compared to the adaptive filter according to the related art, throughput can be reduced. Also, filter processing can be performed without awaiting until each pixel in the next slice in processing order, which is a slice adjacent to the target slice, goes into referable, and accordingly, processing time is reduced.

Note that the adaptive filter 362 may also be applied to a moving image encoding device. In this case, the filter processing unit 362c determines a filter coefficient group so as to reduce error between an image after filtering and an image to be encoded. Specific processing by the filter processing unit 362c is generally the same as with the filter processing unit 162c, and accordingly, description thereof will be omitted here.

Fourth Embodiment

With the processing example 2 of the loop filter 16 according to the first embodiment, description has been made regarding a case where the second filter processing unit ALF2 is set so as to have the same as with the target LCU, and so as to have a position different from the target LCU. With the present embodiment, description will be made regarding a case where, with a loop filter configured to perform generally the same operation as with the above-mentioned processing example 2, the filter processing unit ALFU has the same size as with the target LCU, and is set to the same position as with the target LCU, that is, deblocking and adaptive filter processing are performed for each LCU.

The entire configuration of a moving image decoding device and moving image encoding device according to the present embodiment is the same as the configuration of the moving image decoding device 1 and moving image encoding device 2 according to the first embodiment, and accordingly, description thereof will be omitted. The configuration of a loop filter according to the present embodiment is generally the same as with the loop filter 16 according to the first embodiment, but differs in the following point.

Figure 28:
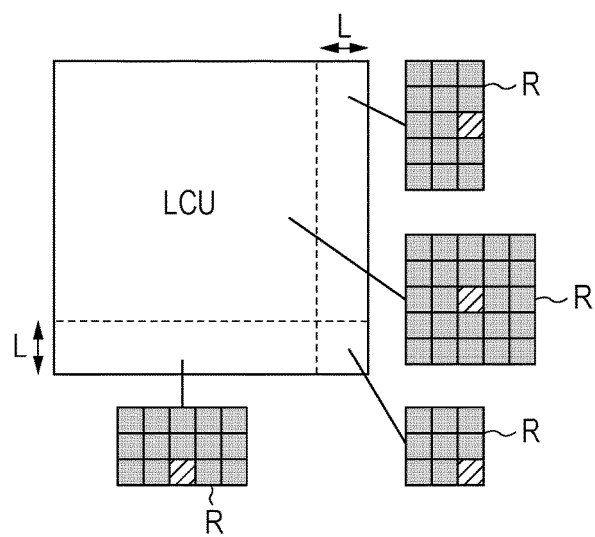
FIG. 28 is a diagram illustrating an example of a reference region to be set by an adaptive filter according to a fourth embodiment of the present invention.
Figure 29:
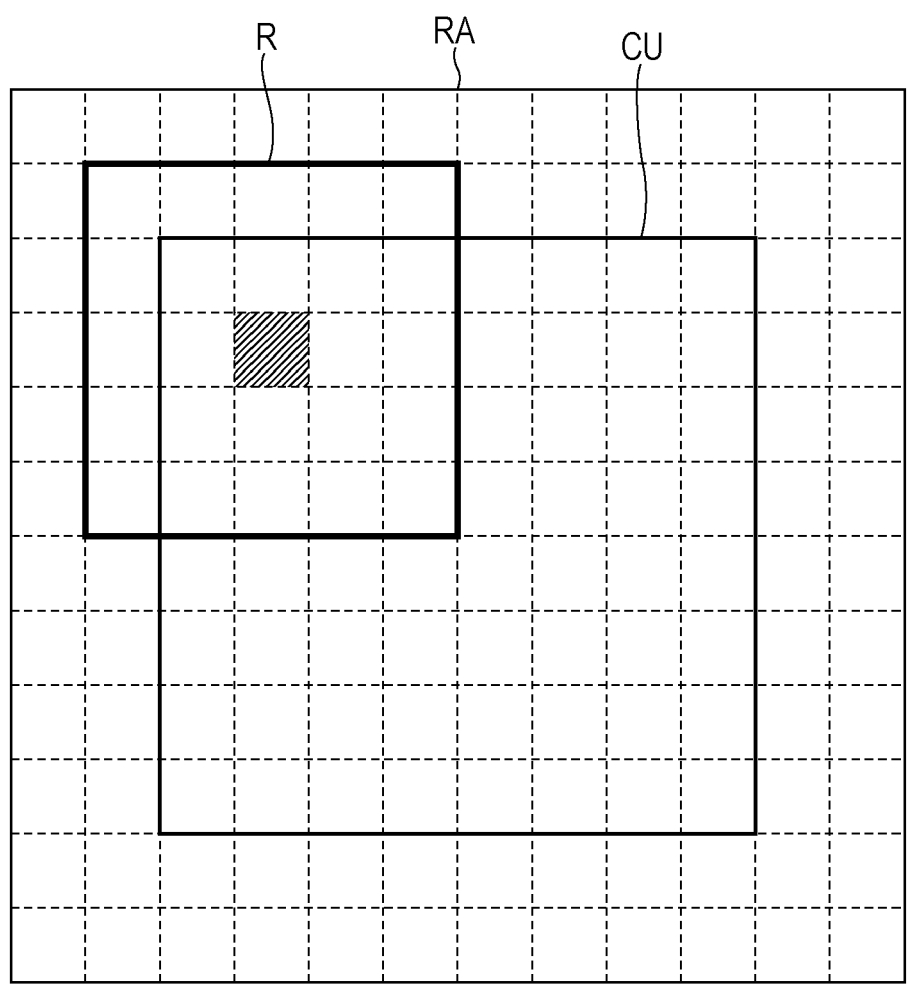
FIG. 29 is a diagram illustrating a reference region R to be set according to a position of a target pixel, and a reference block RA which is a summation group of the reference region R regarding each target pixel included in a target coding unit, with a conventional adaptive filter.

Specifically, a reference region setting unit according to the present embodiment sets, when distance between the target pixel and the right edge of the target LCU is equal to or smaller than L pixels, the reference region R so that distance between the right edge of the reference region R and the target pixel goes into equal to or smaller than the L pixels. Also, when distance between the target pixel and the lower edge of the target LCU is equal to or smaller than the L pixels, the reference region setting unit sets the reference region R so that distance between the lower edge of the reference region R and the target pixel goes into equal to or smaller than the L pixels. Here, a specific value of the L, a value equal to or greater than the above-mentioned Ddf has to be employed. FIG. 28 illustrates an example of the reference region R set by the reference region setting unit according to the present embodiment.

According to such a configuration, even when the adaptive filter performs processing in increments of LCUs, the amount of data to be transferred can be reduced.

Also, instead of the reference region setting unit performing processing as described above, the target pixel setting unit may be configured to set, as the target pixel, only a pixel where at least either distance from the right edge of the target LCU or distance from the lower edge of the target LCU is equal to or greater than the L pixel. Also, a specific value of the L, a value equal to or greater than the above-mentioned Ddf has to be employed. According to such a configuration as well, the amount of data to be transferred can be reduced.

(Application)

The above-mentioned moving image encoding devices and moving image decoding devices may be used by being mounted on various devices configured to perform transmission, reception, recording, or playing of a moving image.

First, description will be made wherein the above-mentioned moving image encoding devices and moving image decoding devices may be used for transmission and reception of a moving image, with reference to FIG. 30.

Figure 30:
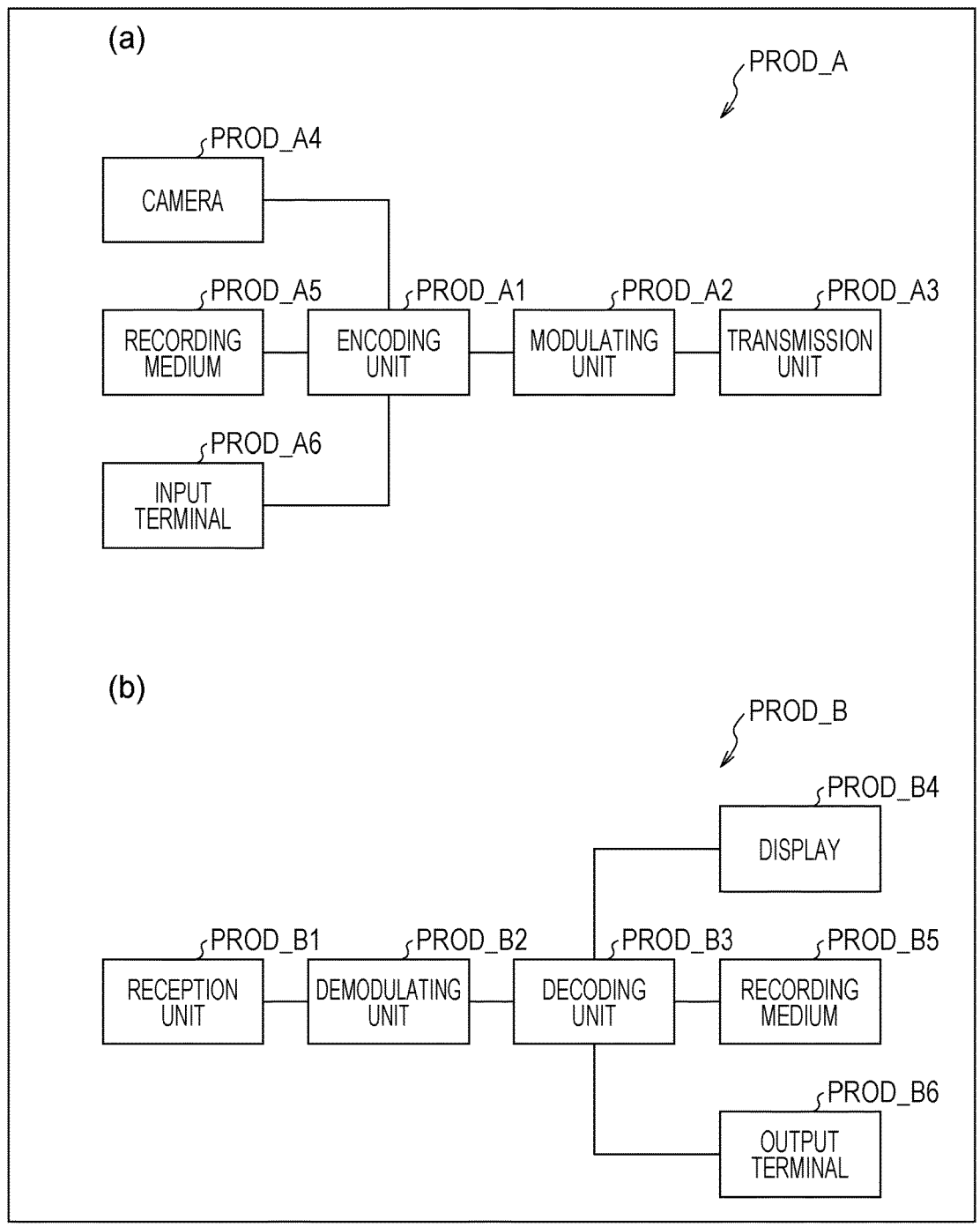
FIG. 30 is a diagram for describing that a moving image decoding device and a moving image encoding device according to an embodiment of the present invention can be used for transmission and reception of a moving image, (a) is a block diagram illustrating a configuration of a transmission device on which the moving image encoding device has been mounted, and (b) is a block diagram illustrating a configuration of a reception device on which the moving image decoding device has been mounted.

(a) in FIG. 30 is a block diagram illustrating the configuration of a transmission device PROD_A on which the moving image encoding device 2 has been mounted. As illustrated in (a) in FIG. 30, the transmission device PROD_A includes an encoding unit PROD_A1 configured to obtain encoded data by encoding a moving image, a modulating unit PROD_A2 configured to obtain a modulation signal by modulating carrier waves using the encoded data obtained by the encoding unit PROD_A1, and a transmission unit PROD_A3 configured to transmit the modulation signal obtained by the modulating unit PROD_A2. The above-mentioned moving image encoding device 2 is employed as this encoding unit PROD_A1.

The transmission device PROD_A may further include, as a supply source of a moving image to be input to the encoding unit PROD_A1, a camera PROD_A4 configured to image a moving image, a recording medium PROD_A5 in which the moving image is recorded, and an input terminal PROD_A6 configured to externally input a moving image. In (a) in FIG. 30, a configuration is exemplified wherein the transmission device PROD_A includes all of these, but a part thereof may be omitted.

Note that the recording medium PROD_A5 may be a medium where a moving image which has not been encoded is recorded, or may be a medium where a moving image encoded with a coding system for recording different from a coding system for transmission is recorded. In the case of the latter, it is desirable to have a decoding unit (not illustrated) configured to decode encoded data read out from the recording medium PROD_A5 in accordance with coding system for recording lie between the recording medium PROD_A5 and the encoding unit PROD_A1.

(b) in FIG. 30 is a block diagram illustrating the configuration of a reception device PROD_B on which the moving image decoding device 1 has been mounted. As illustrated in (b) in FIG. 30, the reception device PROD_B includes a reception unit PROD_B1 configured to receive a modulation signal, a demodulating unit PROD_B2 configured to obtain encoded data by demodulating the modulation signal received by the reception unit PROD_B1, and a decoding unit PROD_B3 configured to obtain a moving image by decoding the encoded data obtained by the demodulating unit PROD_B2. The above-mentioned moving image decoding device 1 is employed as this decoding unit PROD_B3.

The reception device PROD_B may further include, as a supply destination of a moving image that the decoding unit PROD_B3 outputs, a display PROD_B4 configured to display a moving image, a recording medium PROD_B5 configured to record a moving image, and an output terminal PROD_B6 configured to externally output a moving image. In (b) in FIG. 30, a configuration is exemplified wherein the reception device PROD_B includes all of these, but a part thereof may be omitted.

Note that the recording medium PROD_B5 may be a medium where a moving image which has not been encoded is recorded, or may be a medium where a moving image encoded with a coding system for recording different from a coding system for transmission is recorded. In the case of the latter, it is desirable to have an encoding unit (not illustrated) configured to encode a moving image obtained from the decoding unit PROD_B3 in accordance with coding system for recording lie between the decoding unit PROD_B3 and the recording medium PROD_B5.

Note that a transmission medium configured to transmit modulation signals may be wireless or may be a cable. Also, a transmission mode for transmitting modulation signals may be broadcasting (here specifies a transmission mode where no transmission destination has not been determined beforehand), or may be communication (here specifies a transmission mode where no transmission destination has not been determined beforehand). That is to say, transmission of modulation signals may be realized by any of wireless broadcasting, cable broadcasting, wireless communication, and cable communication.

For example, a broadcasting station (broadcasting facilities or the like)/reception station (television receiver or the like) of terrestrial digital broadcasting is an example of the transmission device PROD_A/reception device PROD_B which transmits/receives modulation signals by wireless broadcasting. Also, a broadcasting station (broadcasting facilities or the like)/reception station (television receiver or the like) of cable television broadcasting are an example of the transmission device PROD_A/reception device PROD_B which transmits/receives modulation signals by cable broadcasting.

Also, a server (workstation or the like)/client (television receiver, personal computer, smart phone, or the like) of a VOD (Video On Demand) service or moving image sharing service or the like using the Internet is an example of the transmission device PROD_A/reception device PROD_B which transmits/receives modulation signals by communication (in general, as for a LAN, any of wireless or cable is employed as a transmission medium, and as for a WAN, cable is employed as a transmission medium). Here, the personal computer also includes a desktop PC, laptop PC, and tablet PC. Also, the smart phone also includes a multi-function mobile phone terminal.

Note that a client of the moving image sharing service has not only a function for decoding encoded data downloaded from a server to display on a display but also a function for encoding a moving image imaged by a camera to upload to a server. That is to say, a client of the moving image sharing service serves as both of the transmission device PROD_A and reception device PROD_B.

Next, it will be described with reference to FIG. 31 that the above-mentioned moving image encoding device and moving image decoding device can be used for recording and playing of a moving image.

Figure 31:
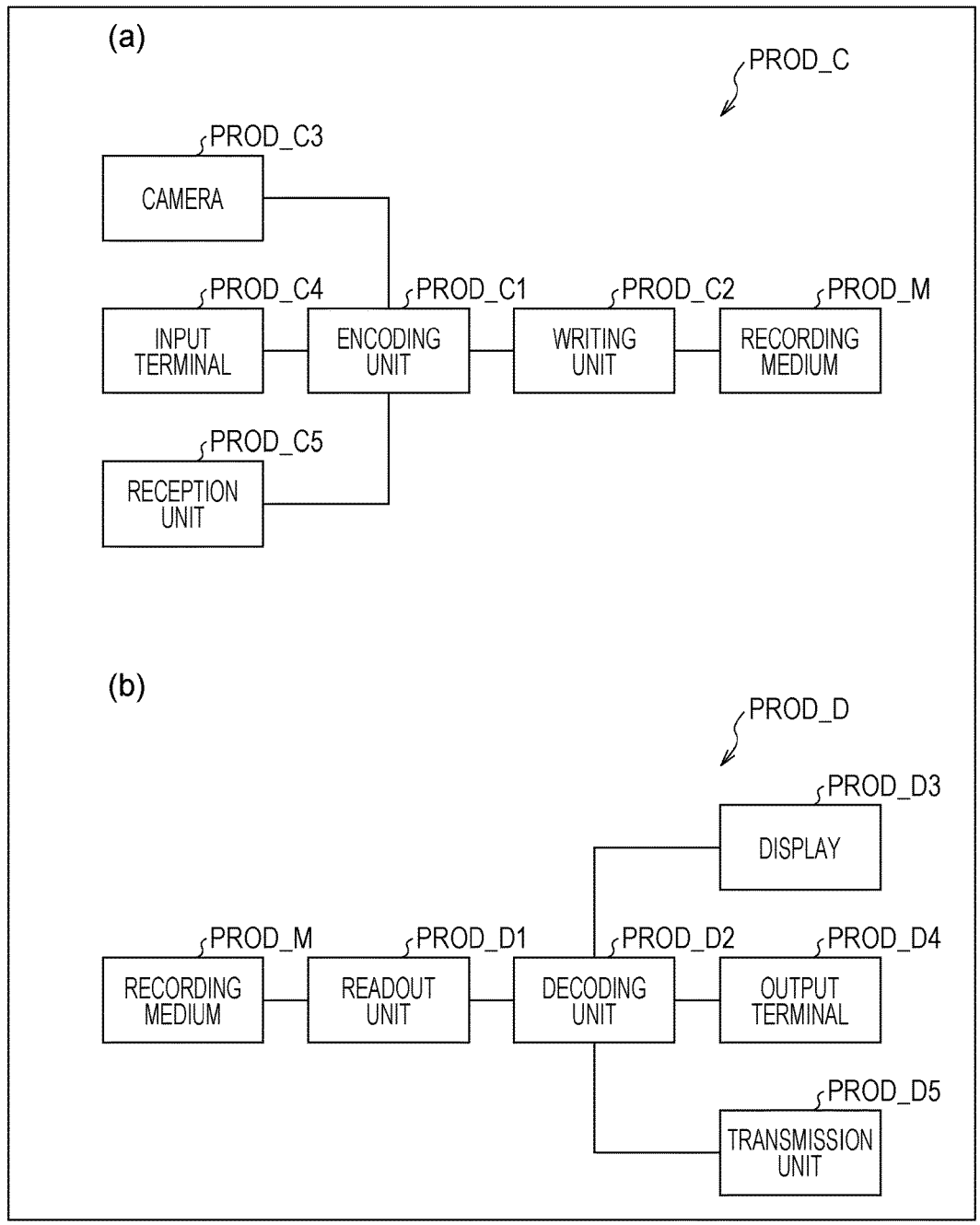
FIG. 31 is a diagram for describing that a moving image decoding device and a moving image encoding device according to an embodiment of the present invention can be used for recording and playing of a moving image, (a) is a block diagram illustrating a configuration of a recording device on which the moving image encoding device has been mounted, and (b) is a block diagram illustrating a configuration of a playing device on which the moving image decoding device has been mounted.

(a) in FIG. 31 is a block diagram illustrating the configuration of a recording device PROD_C on which the above-mentioned moving image encoding device 2 is mounted. As illustrated in (a) in FIG. 31, the recording device PROD_C includes an encoding unit PROD_C1 configured to obtain encoded data by encoding a moving image, and a writing unit PROD_C2 configured to write the encoded data obtained by the encoding unit PROD_C1 in a recoding medium PROD_M. The above-mentioned moving image encoding device 2 is employed as this encoding unit PROD_C1.

Note that the recording medium PROD_M may be (1) a type to be housed in the recording device PROD_C such as an HDD (Hard Disk Drive) or SSD (Solid State Drive) or the like, (2) a type to be connected to the recording device PROD_C such as an SD memory card or USB (Universal Serial Bus) flash memory or the like, or (3) a type to be loaded to a drive device (not illustrated) housed in the recording device PROD_C such as DVD (Digital Versatile Disc) or BD (Blu-ray Disk: registered trademark) or the like.

Also, the recording device PROD_C may further include, as a supply source of a moving image to be input to the encoding unit PROD_C1, a camera PROD_C3 configured to image a moving image, an input terminal PROD_C4 configured to externally input a moving image, and a reception unit PROD_C5 configured to receive a moving image. In (a) in FIG. 31, a configuration is exemplified wherein the recording device PROD_C includes all of these, but a part thereof may be omitted.

Note that the reception unit PROD_C5 may be a unit configured to receive a moving image which has not been encoded, or a unit configured to receive encoded data which has been encoded by a coding system for transmission different from a coding system for recording. In the case of the latter, it is desirable to have a decoding unit for transmission (not illustrated) configured to decode encoded data encoded by a coding system for transmission lie between the reception unit PROD_C5 and the encoding unit PROD_C1.

Examples of such a recording device PROD_C include a DVD recorder, a BD recorder, and an HD (Hard Disk) recorder (in this case, the input terminal PROD_C4 or reception unit PROD_C5 serves a principal supply source of a moving image). Also, examples of such a recording device PROD_C include a camcorder (in this case, the camera PROD_C3 serves a principal supply source of a moving image), a personal computer (in this case, the reception unit PROD_C5 serves a principal supply source of a moving image), and a smart phone (in this case, the camera PROD_C3 or reception unit PROD_C5 serves a principal supply source of a moving image).

(b) in FIG. 31 is a block illustrating the configuration of a playing device PROD_D on which the above-mentioned moving image decoding device 1 is mounted. As illustrated in (b) in FIG. 31, the playing device PROD_D includes a reading unit PROD_D1 configured to read out encoded data written in the recording medium PROD_M, and a decoding unit PROD_D2 configured to obtain a moving image by decoding encoded data read out by the reading unit PROD_D1. The above-mentioned moving image decoding device 1 is employed as this decoding unit PROD_D2.

Note that the recording medium PROD_M may be (1) a type to be housed in the playing device PROD_D such as an HDD or SSD or the like, (2) a type to be connected to the playing device PROD_D such as an SD memory card or USB flash memory or the like, or (3) a type to be loaded to a drive device (not illustrated) housed in the playing device PROD_D such as DVD or BD or the like.

Also, the playing device PROD_D may further include, as a supply destination of a moving image that the decoding unit PROD_D2 outputs, a display PROD_D3 configured to display a moving image, an output terminal PROD_D4 configured to externally output a moving image, and a transmission unit PROD_D5 configured to transmit a moving image. In (b) in FIG. 31, a configuration is exemplified wherein the playing device PROD_D includes all of these, but a part thereof may be omitted.

Note that the transmission unit PROD_D5 may be a unit configured to transmit a moving image which has not been encoded, or a unit configured to transmit encoded data which has been encoded by a coding system for transmission different from a coding system for recording. In the case of the latter, it is desirable to have an encoding unit (not illustrated) configured to encode a moving image using a coding system for transmission to be situated between the decoding unit PROD_D2 and the transmission unit PROD_D5.

Examples of such a playing device PROD_D include a DVD player, a BD player, and an HDD player (in this case, the output terminal PROD_D4 to be connected to a television receiver or the like serves as a principal supply destination of a moving image). Also, examples of such a playing device PROD_D include a television receiver (in this case, the display PROD_D3 serves a principal supply destination of a moving image), a desktop type PC (in this case, the output terminal PROD_D4 or transmission unit PROD_D5 serves a principal supply destination of a moving image), a laptop type or tablet type PC (in this case, the display PROD_D3 or transmission unit PROD_D5 serves a principal supply destination of a moving image), and a smart phone (in this case, the display PROD_D3 or transmission unit PROD_D5 serves a principal supply destination of a moving image).

APPENDIX MATTER 1

The blocks of the above-mentioned moving image decoding device 1, moving image encoding device 2, moving image decoding device 1', and moving image encoding device 2' may be realized using logic circuits formed on an integrated circuit (IC chip) in a hardware manner, or may be realized using a CPU (Central Processing Unit) in a software manner.

In the case of the latter, the above devices include a CPU configured to execute a command of a program configured to execute the functions, and a storage device (recording medium) such as ROM (Read Only Memory) in which this program is stored, RAM (Random Access Memory) configured to load this program, memory in which this program and various types of data are stored, and so forth. An object of the present invention may be achieved by supplying a recording medium in which program code (execution type program, intermediate code program, a source program) of a control program of each of the above-mentioned devices, which is software for realizing the above-mentioned functions, is recorded in a computer-readable manner to each of the above-mentioned devices, and a computer (or CPU or MPU) thereof reading out and executing the program code recorded in the recording medium.

Examples of the above-mentioned recording medium include tapes such a magnetic tape, a cassette tape, or the like, disks including a magnetic disk such as a floppy (registered trademark) disk/hard disk or the like, and an optical disc such as CD-ROM/MO/MD/DVD/CD-R or the like, cards such as an IC card (including a memory card)/optical card or the like, semiconductor memory such as mask ROM/EPROM/flash ROM or the like, and logic circuits such as a PLD (Programmable logic device), FPGA (Field Programmable Gate Array), or the like.

Also, an arrangement may be made wherein each of the above-mentioned devices is configured so as to be connected to a communication network, and the above-mentioned program code is supplied via the communication network. This communication network is not particularly restricted as long as program code can be transmitted. For example, there are available the Internet, intranet, extranet, LAN, ISDN, VAN, CATV communication network, virtual private network (Virtual Private Network), telephone network, mobile communications network, a satellite communication network, and so forth. Also, a transmission medium which makes up this communication network is also not restricted to a medium having a particular configuration nor a particular type medium as long as program code can be transmitted using a medium. For example, there are available cable such as IEEE1394, USB, power line carrier, cable TV circuit, telephone line, ADSL (Asymmetric Digital Subscriber Line) circuit, or the like, infrared radiation such as IrDA or remote control, and wireless such as Bluetooth (registered trademark), IEEE802.11 wireless, HDR (High Data Rate), NFC (Near Field Communication), DLNA (Digital Living Network Alliance), portable telephone network, satellite circuit, terrestrial digital network, or the like.

APPENDIX MATTER 2

As described above, an image filter device includes: filter means configured to generate an output image by acting on an input image made up of a plurality of unit regions; and reference region modifying means configured to reduce a reference region to be referenced for the filter means calculating a pixel value of each target pixel to a size according to a position of this target pixel in a unit region including this target pixel.

In the event that the image filter device is employed for a decoding device configured to generate a decoded image by decoding encoded data, or an encoding device configured to generate encoded data by encoding an image to be encoded, a predicted image with high prediction precision can be generated by referencing an output image of the image filter device, and accordingly, coding efficiency improves.

Also, according to the image filter device thus configured, the filter means reduces a reference region to be referenced for calculating a pixel value of each target pixel to a size according to the position of this target pixel in a unit region including this target pixel, and accordingly, the number of pixels to be referenced for generating an output image can be reduced while maintaining high coding efficiency. Accordingly, according to the image filter device thus configured, the amount of data to be transferred at the time of filter processing can be reduced while maintaining high coding efficiency.

Note that the unit region may be, for example, the largest coding unit LCU, or may be a coding unit CU obtained by dividing the largest coding unit LCU, or may be another region.

Also, it is desirable that the reference region modifying means include first setting means configured to set, when distance DU between an upstream edge of a unit region including a target pixel, and this target pixel is less than a predetermined threshold, a position of an upstream edge of a reference region regarding this target pixel so as to suppress distance with this target pixel to the DU or shorter, and second setting means configured to set, when distance DL between a downstream edge of a unit region including a target pixel, and this target pixel is less than a predetermined threshold, a position of a downstream edge of a reference region regarding this target pixel so as to suppress distance with this target pixel to the DL or shorter.

The first setting means set, when distance DU between an upstream edge of a unit region including a target pixel, and this target pixel is less than a predetermined threshold, a position of an upstream edge of a reference region regarding this target pixel so as to suppress distance with this target pixel to the DU or shorter, and accordingly, the filter means calculate the pixel value of the target pixel without referencing the pixel value of a pixel positioned on more upstream side than the upstream edge of the unit region. Also, the second setting means set, when distance DL between a downstream edge of a unit region including a target pixel, and this target pixel is less than a predetermined threshold, a position of a downstream edge of a reference region regarding this target pixel so as to suppress distance with this target pixel to the DL or shorter, and accordingly, the filter means calculate the pixel value of the target pixel without referencing the pixel value of a pixel positioned on more downstream side than the downstream edge of the unit region. Accordingly, according to the above configuration, the amount of data to be transferred at the time of filter processing can be reduced.

Also, the first setting means have to set the number of taps of the reference region to a predetermined value when distance DU between an upstream edge of a unit region including a target pixel, and this target pixel is less than a predetermined threshold, and similarly, the second setting means have to set the number of taps of the reference region to a predetermined value when distance DL between a downstream edge of a unit region including a target pixel, and this target pixel is less than a predetermined threshold, and accordingly, high coding efficiency can be maintained.

Note that the above-mentioned upstream edge specifies one of the upper edge and left edge when the processing is performed in raster scan order, and specifies one of the lower edge and right edge when the processing is performed in inverse order of raster scan. Similarly, the above-mentioned downstream edge specifies one of the lower edge and right edge when the processing is performed in raster scan order, and specifies one of the upper edge and left edge when the processing is performed in inverse order of raster scan (this will be applied to the following).

Also, it is desirable that the image filter device according to the present invention further includes smoothing means configured to smooth a pixel value of a pixel where of the unit regions, distance from at least one of two edges on the upstream side in processing order is equal to or shorter than DB, with the filter means generating an output image for each output unit to be obtained by shifting each of the plurality of unit regions on the upstream side in processing order, and with the reference region modifying means including first setting means configured to set, when a target pixel is positioned on the downstream side of a downstream edge in output unit corresponding to a unit region including this target pixel, a position of an upstream edge of a reference region regarding this target pixel so as to suppress distance with this target pixel to be equal or shorter than distance between this target pixel and a downstream edge of this output unit, second setting means configured to set, when a target pixel is positioned on the upstream side of a downstream edge in output unit corresponding to a unit region including this target pixel, a position of a downstream edge of a reference region regarding this target pixel so as to suppress distance with this target pixel to be equal or shorter than distance between this target pixel and a downstream edge of this output unit, or third setting means configured to set, when a target pixel is positioned on the upstream side of a downstream edge in output unit corresponding to a unit region including this target pixel, a position of a downstream edge of a reference region regarding this target pixel so as to suppress distance with this target pixel to be equal or shorter than distance to be obtained by subtracting the DB from distance between this target pixel and a downstream edge of this unit region.

The first setting means set, when a target pixel is positioned on the downstream side of a downstream edge in output unit corresponding to a unit region including this target pixel, a position of an upstream edge of a reference region regarding this target pixel so as to suppress distance with this target pixel to be equal or shorter than distance between this target pixel and a downstream edge of this output unit, and accordingly, the filter means calculate the pixel value of the target pixel without referencing the pixel value of a pixel on more upstream side than an upstream edge of an output unit including the target pixel. Also, the second setting means set, when a target pixel is positioned on the upstream side of a downstream edge in output unit corresponding to a unit region including this target pixel, a position of a downstream edge of a reference region regarding this target pixel so as to suppress distance with this target pixel to be equal or shorter than distance between this target pixel and a downstream edge of this output unit, and accordingly, the filter means calculate the pixel value of the target pixel without referencing the pixel value of a pixel on more downstream side than an downstream edge of an output unit including the target pixel. Accordingly, according to the above-mentioned configuration, the amount of data to be transferred at the time of filter processing can be reduced.

Also, the third setting means set, when a target pixel is positioned on the upstream side of a downstream edge in output unit corresponding to a unit region including this target pixel, a position of a downstream edge of a reference region regarding this target pixel so as to suppress distance with this target pixel to be equal or shorter than distance to be obtained by subtracting the DB from distance between this target pixel and a downstream edge of this unit region, and accordingly, the filter means calculate the pixel value of the target pixel without referencing a pixel value in a region where smoothing by the smoothing means has not been completed. Accordingly, according to the above-mentioned configuration, the amount of data to be transferred at the time of filter processing can be reduced, and also filter processing can be performed without waiting until the smoothing means act on two edges on the downstream side of the target unit region, and accordingly, processing time can be reduced.

Note that the above "the downstream side of a downstream edge" specifies, in the event that the processing is performed in raster scan order, one of "the lower side of a lower edge" and "the right side of a right edge", and in the event that the processing is performed in inverse order of raster scan, specifies one of "the upper side of an upper edge" and "the left side of a left edge".

Also, the above "the upstream side of a downstream edge" specifies, in the event that the processing is performed in raster scan order, one of "the upper side of a lower edge" and "the left side of a right edge", and in the event that the processing is performed in inverse order of raster scan, specifies one of "the lower side of an upper edge" and "the right side of a left edge".

Also, it is desirable that the input image is a predicted image.

According to the above-mentioned configuration, the amount of data to be transferred at the time of performing filter processing on a predicted image can be reduced. Note that, in the event that the above-mentioned image filter device is employed as a decoding device configured to generate a decoded image by decoding encoded data, or an encoding device configured to generate encoded data by encoding an image to be encoded, the above-mentioned predicted image specifies a predicted image to be obtained by referencing a decoded image, for example.

Also, it is desirable that the input image is a residual image.

According to the above-mentioned configuration, the amount of data to be transferred at the time of performing filter processing on a residual image can be reduced. Note that, in the event that the above-mentioned image filter device is employed as a decoding device configured to generate a decoded image by decoding encoded data, the above-mentioned residual data specifies, for example, residual data to be obtained by decoding encoded data, and in the event that the above-mentioned image filter device is employed as an encoding device configured to generate encoded data by encoding an image to be encoded, the residual image specifies a difference image between an image to be encoded and a predicted image.

Also, an image filter device according to the present invention includes: filter means configured to generate an output image for each unit region by acting on an input image made up of a plurality of unit regions; and smoothing means configured to smooth a pixel value of a pixel where of the unit regions, distance from at least one of two edges on the upstream side in processing order is equal to or shorter than DB; with the filter means acting on a target unit region after the smoothing means act on two edges on the upstream side of a target unit region before acting on two edges on the upstream side of the next unit region in processing order.

With the image filter device thus configured, the smoothing means act on a target unit region which the smoothing means have acted on two edges on the upstream side before acting on two edges on the upstream side of the next unit region in processing order. Accordingly, according to the above-mentioned configuration, for example, after a target unit region and a peripheral image thereof are obtained from the frame memory, and stored in the local memory, the smoothing processing by the smoothing means and the filter processing by the filter means are consecutively performed on the image stored in the local memory. Therefore, according to the above-mentioned configuration, with both of the smoothing processing and filter processing, the amount of data to be transferred can be reduced as compared to the configuration according to the related art.

Also, the above-mentioned image filter device further includes reference region modifying means configured to reduce a reference region to be referenced for the filter means calculating a pixel value of each target pixel to a size according to a position of this target pixel in a unit region including this target pixel, including first setting means configured to set, when distance between a target pixel and a horizontal edge on the downstream side of a unit region including this target pixel is equal to or shorter than DB, a position of a horizontal edge on the downstream side of a reference region regarding this target pixel so as to suppress distance with this target pixel to be equal or shorter than DB, or second setting means configured to set, when distance between a target pixel and a vertical edge on the downstream side of a unit region including this target pixel is equal to or shorter than DB, a position of a vertical edge on the downstream side of a reference region regarding this target pixel so as to suppress distance with this target pixel to be equal or shorter than DB.

The first setting means set, when distance between a target pixel and a horizontal edge on the downstream side of a unit region including this target pixel is equal to or shorter than DB, a position of a horizontal edge on the downstream side of a reference region regarding this target pixel so as to suppress distance with this target pixel to be equal or shorter than the DB, and accordingly, the filter means calculate the pixel value of a target pixel without referencing the pixel value of a pixel positioned on the downstream side of a horizontal edge on the downstream side of the unit region. Also, the second setting means set, when distance between a target pixel and a vertical edge on the downstream side of a unit region including this target pixel is equal to or shorter than the DB, a position of a vertical edge on the downstream side of a reference region regarding this target pixel so as to suppress distance with this target pixel to be equal or shorter than the DB, and accordingly, the filter means calculate the pixel value of a target pixel without referencing the pixel value of a pixel positioned on the downstream side of a vertical edge on the downstream side of the unit region. Accordingly, according to the above-mentioned configuration, the amount of data to be transferred can further be reduced.

Also, it is desirable that the above-mentioned image filter device further include target pixel restricting means configured to restrict each target pixel from which the filter means calculate a pixel value to a pixel where distance from at least one of two edges on the downstream side of a unit region including this target pixel is equal to or longer than a predetermined threshold.

According to the above-mentioned configuration, the position of a target pixel is restricted to a position where distance from at least one of two edges on the downstream side of a unit region including this target pixel is equal to or longer than a predetermined threshold, and accordingly, the number of pixels that the filter means reference is reduced. Accordingly, according to the above-mentioned configuration, the amount of data to be transferred at the time of filter processing can be reduced.

Also, an image filter device according to the present invention includes: smoothing means configured to smooth a pixel value of a pixel positioned near at least one of two edges on the upstream side in processing order of each unit region regarding a decoded image to be obtained by adding a predicted image to be generated for each unit region and a residual image; calculating means including first filter means configured to act on an output image from the smoothing means, second filter means configured to act on the predicted image, and third filter means configured to act on the residual image, configured to add and output output images from the first to third filter means; and reference region setting means configured to set a reference region which the first to third filter means reference for calculating a pixel value of each target pixel, and to set the number of pixels in the vertical direction of a reference region to 1.

According to the above-mentioned image filter device, an output image is generated with reference to a decoded image subjected to smoothing processing by the smoothing means, a predicted image, and a residual image. Accordingly, a decoding device including the above-mentioned image filter device, and an encoding device including the above-mentioned image filter device generate a predicted image with reference to the output image of the image filter device, whereby coding efficiency improves. Also, the number of pixels in the vertical direction of the reference region is set to 1, and accordingly, the throughput of filter processing, and the amount of data to be transferred are reduced.

Also, an image filter device according to the present invention includes: filter means configured to generate an output image by acting on an input image made up of one or a plurality of slices; filter means configured to calculate a pixel value of a target pixel in the output image from each pixel value of the input image in a reference region set in the vicinity of this target pixel; and target pixel restricting means configured to restrict a position of a target pixel to a position where the entire reference region including this target pixel is included in a slice including this target pixel.

According to the above-mentioned image filter device, an output image in a target slice is generated with reference to only a pixel value within the target slice. In other words, an output image in a target slice is generated without referencing a pixel outside the target slice. Accordingly, according to the above-mentioned configuration, throughput for generating an output image is reduced. Also, according to the above-mentioned configuration, filter processing can be performed without awaiting until each pixel of the next slice in processing order goes into be referable, which is a slice adjacent to the target slice, and accordingly, processing time is reduced.

Also, a decoding device causes the above-mentioned image filter device to act on a decoded image, which is a decoding device including the above-mentioned image filter device, and an encoding device causes the above-mentioned image filter device to act on a local decoded image, which is an encoding device including the above-mentioned image filter device are also included in the category of the present invention. Also, a data structure of encoded data including a filter coefficient group to be referenced by the above-mentioned image filter is also included in the category of the present invention.

The present invention is not restricted to the above-mentioned embodiments, various modifications may be made within the scope indicated in Claims, and an embodiment to be obtained by combining technical means disclosed in different embodiments as appropriate is also included in the technical range of the present invention.

INDUSTRIAL APPLICABILITY

The present invention may suitably be employed for an image filter device configured to perform filtering on images. Also, the present invention may suitably be employed for a decoding device configured to decode encoded data, and an encoding device configured to generate encoded data.

REFERENCE SIGNS LIST 1 moving image decoding device (decoding device)
12 predicted image generator
15 frame memory
16 loop filter (image filter device)
161 deblocking filter (smoothing means)
162 adaptive filter
162a target pixel setting unit
162b reference region setting unit (reference region modifying means)
162c filter processing unit (filter means)
163 internal memory
2 moving image encoding device (encoding device)
21 predicted image generator
25 frame memory
26 loop filter (image filter device)
262 adaptive filter
262a target pixel setting unit
262b reference region setting unit (reference region modifying means)
262c filter processing unit (filter means)

The invention claimed is:

1. An image filter device comprising:
a deblocking filter that performs deblocking on first target pixels in side boundaries of a unit region and generates a deblocked image including the unit region;
filter circuitry that performs adaptive filtering on second target pixels in the unit region of the deblocked image, wherein the second target pixels are all pixels included in the unit region; and
reference region setting circuitry that sets a reference region to be referenced by the filter circuitry to calculate a pixel value of one of the second target pixels according to a position of the one of the second target pixels in the unit region;
wherein the reference region setting circuitry includes:
first setting circuitry that sets a position of an upstream edge of the reference region lower than or equal to a virtual boundary line, which separates the unit region into an upstream side and a downstream side, when the one of the second target pixels is on the downstream side, and
second setting circuitry that sets a position of a downstream edge of the reference region higher than the virtual boundary line, which separates the unit region into the upstream side and the downstream side, when the one of the second target pixels is on the upstream side; wherein
the deblocking filter, the filter circuitry, and the reference region setting circuitry are implemented by one or more processors.

2. The image filter device according to claim 1, wherein the first setting circuitry sets, when the one of the second target pixels is on the downstream side, the position of the upstream edge of the reference region to restrict a distance between the upstream edge of the reference region and the one of the second target pixels shorter than or equal to a distance between the one of the second target pixels and the virtual boundary line; and
the second setting circuitry sets, when the one of the second target pixels is on the upstream side, the position of the downstream edge of the reference region to restrict a distance between the downstream edge of the reference region and the one of the second target pixels shorter than or equal to the distance between the one of the second target pixels and the virtual boundary line.

3. A decoding device comprising:
the image filter device according to claim 1, causing the image filter device to act on a decoded image.

4. A decoding device comprising:
the image filter device according to claim 2, causing the image filter device to act on a decoded image.

* * * * *